United States Patent
Kurokawa et al.

(10) Patent No.: US 10,137,964 B2
(45) Date of Patent: Nov. 27, 2018

(54) ELECTRICAL BICYCLE OPERATING SYSTEM, ELECTRICAL DERAILLEUR, AND ELECTRICAL SEATPOST ASSEMBLY

(71) Applicant: SHIMANO INC., Sakai (JP)

(72) Inventors: Yuta Kurokawa, Sakai (JP); Atsushi Komatsu, Sakai (JP)

(73) Assignee: SHIMANO INC., Sakai (JP)

( * ) Notice: Subject to any disclaimer, the term of this patent is extended or adjusted under 35 U.S.C. 154(b) by 163 days.

(21) Appl. No.: 14/996,274

(22) Filed: Jan. 15, 2016

(65) Prior Publication Data

US 2017/0203814 A1  Jul. 20, 2017

(51) Int. Cl.

| B62M 6/45 | (2010.01) |
|---|---|
| B62M 25/08 | (2006.01) |
| B62K 23/00 | (2006.01) |
| B62M 9/122 | (2010.01) |
| B62M 9/132 | (2010.01) |
| B62K 19/36 | (2006.01) |
| B62K 23/06 | (2006.01) |
| B62J 1/08 | (2006.01) |

(52) U.S. Cl.
CPC ............ *B62M 25/08* (2013.01); *B62K 19/36* (2013.01); *B62K 23/00* (2013.01); *B62K 23/06* (2013.01); *B62M 9/122* (2013.01); *B62M 9/132* (2013.01); *B62J 2001/085* (2013.01)

(58) Field of Classification Search
CPC ...... B62M 25/08; B62M 9/122; B62M 9/132; B62K 23/00; B62K 23/06; B62K 19/36
See application file for complete search history.

(56) References Cited

U.S. PATENT DOCUMENTS

| 8,886,417 | B2 | 11/2014 | Jordan | |
|---|---|---|---|---|
| 2012/0253601 | A1* | 10/2012 | Ichida | B60G 13/00 701/37 |
| 2012/0253606 | A1 | 10/2012 | Takamoto et al. | |
| 2013/0061705 | A1* | 3/2013 | Jordan | B62M 25/08 74/473.13 |
| 2015/0033896 | A1 | 2/2015 | Jordan | |

FOREIGN PATENT DOCUMENTS

CN  102730143  10/2012

\* cited by examiner

*Primary Examiner* — Alan D Hutchinson
(74) *Attorney, Agent, or Firm* — Mori & Ward, LLP

(57) ABSTRACT

An electrical bicycle operating system comprises a first switch to generate a first transmission control signal, a second switch to generate a second transmission control signal, and a control unit to electrically operate at least one of an electrical bicycle seatpost assembly, an electrical suspension, and a driving unit configured to output an assist force when both the first switch and the second switch are operated concurrently.

18 Claims, 58 Drawing Sheets

| SHIFT-MAP INFORMATION | | | FRONT SPROCKET | |
|---|---|---|---|---|
| | | | 39 | 53 |
| | | | LOW | TOP |
| REAR SPROCKET | 28 | 1st | 1.39 | 1.89 |
| | 25 | 2nd | 1.56 | 2.12 |
| | 23 | 3rd | 1.70 | 2.30 |
| | 21 | 4th | 1.86 | 2.52 |
| | 19 | 5th | 2.05 | 2.79 |
| | 17 | 6th | 2.29 | 3.12 |
| | 15 | 7th | 2.60 | 3.53 |
| | 14 | 8th | 2.79 | 3.79 |
| | 13 | 9th | 3.00 | 4.08 |
| | 12 | 10th | 3.25 | 4.42 |
| | 11 | 11th | 3.55 | 4.82 |

*FIG. 52*

ELECTRICAL BICYCLE OPERATING SYSTEM, ELECTRICAL DERAILLEUR, AND ELECTRICAL SEATPOST ASSEMBLY

BACKGROUND OF THE INVENTION

Field of the Invention

The present invention relates to an electrical bicycle operating system, an electrical derailleur, and an electrical seatpost assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an electric bicycle component configured to be electrically operated. Such electric components are configured to be operated via an electrical bicycle operating system.

SUMMARY OF THE INVENTION

In accordance with a first aspect of the present invention, an electrical bicycle operating system comprises a first switch to generate a first transmission control signal, a second switch to generate a second transmission control signal, and a control unit to electrically operate at least one of an electrical bicycle seatpost assembly, an electrical suspension, and a driving unit configured to output an assist force when both the first switch and the second switch are operated concurrently.

With the electrical bicycle operating system according to the first aspect, it is possible to operate, using the first switch and the second switch, at least one of the electrical bicycle seatpost assembly, the electrical suspension, and the driving unit in addition to other electric components operated in response to the first transmission control signal and the second transmission control signal. This can simplify the configuration of the electrical bicycle operating system.

In accordance with a second aspect of the present invention, the electrical bicycle operating system according to the first aspect is configured so that the control unit generates a third signal to operate the at least one of the electrical bicycle seatpost assembly, the electrical suspension, and the driving unit when both the first switch and the second switch are operated concurrently.

With the electrical bicycle operating system according to the second aspect, it is possible to operate the at least one of the electrical bicycle seatpost assembly, the electrical suspension, and the driving unit using the third signal different from the first transmission control signal and the second transmission control signal. Thus, the at least one of the electrical bicycle seatpost assembly, the electrical suspension, and the driving unit can easily recognize the third signal.

In accordance with a third aspect of the present invention, the electrical bicycle operating system according to the second aspect is configured so that the first switch does not output the first transmission control signal when both the first switch and the second switch are operated concurrently.

With the electrical bicycle operating system according to the third aspect, it is possible to reduce power presumption of the electrical bicycle operating system compared with a case where the first transmission control signal is output when both the first switch and the second switch are operated concurrently.

In accordance with a fourth aspect of the present invention, the electrical bicycle operating system according to the second or third aspect is configured so that the second switch does not output the second transmission control signal when both the first switch and the second switch are operated concurrently.

With the electrical bicycle operating system according to the fourth aspect, it is possible to reduce power presumption of the electrical bicycle operating system compared with a case where the second transmission control signal is output when both the first switch and the second switch are operated concurrently.

In accordance with a fifth aspect of the present invention, the electrical bicycle operating system according to the third or fourth aspect is configured so that the second switch does not output the second transmission control signal when both the first switch and the second switch are operated concurrently.

With the electrical bicycle operating system according to the fifth aspect, it is possible to reduce power presumption of the electrical bicycle operating system compared with a case where the second transmission control signal is output when both the first switch and the second switch are operated concurrently.

In accordance with a sixth aspect of the present invention, the electrical bicycle operating system according to any one of the second to fifth aspects is configured so that the control unit generates the third signal when the control unit receives both the first transmission control signal and the second transmission control signal concurrently.

With the electrical bicycle operating system according to the sixth aspect, it is possible to determine that both the first switch and the second switch are operated concurrently based on the first transmission control signal and the second transmission control signal. In other words, the configuration of the first switch can be simplified since the first switch outputs the first transmission control signal in response to operation of the first switch. Similarly, the configuration of the second switch can be simplified since the second switch outputs the second transmission control signal in response to operation of the second switch.

In accordance with a seventh aspect of the present invention, the electrical bicycle operating system according to any one of the second to sixth aspects is configured so that the control unit generates the third signal to operate only the electrical bicycle seatpost assembly when both the first switch and the second switch are operated concurrently.

With the electrical bicycle operating system according to the seventh aspect, it is possible to simplify the third signal.

In accordance with an eighth aspect of the present invention, the electrical bicycle operating system according to any one of the second to seventh aspects is configured so that the control unit generates the third signal having a third width corresponding to a time period during which both the first switch and the second switch are operated concurrently.

With the electrical bicycle operating system according to the eighth aspect, it is possible to vary the third width of the third signal in accordance with the time period during which both the first switch and the second switch are operated concurrently. Thus, it is possible to utilize the variable third width of the third signal to operate the at least one of the electrical bicycle seatpost assembly, the electrical suspension, and the driving unit, improving operability of the electrical bicycle operating system.

In accordance with a ninth aspect of the present invention, the electrical bicycle operating system according to the eighth aspect is configured so that the first switch generates the first transmission control signal having a first width corresponding to a time period during which the first switch is operated. The second switch generates the second transmission control signal having a second width corresponding to a time period during which the second switch is operated. The control unit generates the third signal having the third width corresponding to a time period during which the control unit receives both the first transmission control signal and the second transmission control signal.

With the electrical bicycle operating system according to the ninth aspect, it is possible to vary the first width of the first transmission control signal, the second width of the second transmission control signal, and the third width of the third signal. Thus, it is possible to utilize the variable first width of the first transmission control signal, the variable second width of the second transmission control signal, and the variable third width of the third signal, improving operability of the electrical bicycle operating system.

In accordance with a tenth aspect of the present invention, the electrical bicycle operating system according to any one of the second to ninth aspects is configured so that the control unit generates the third signal when the control unit receives one of the first transmission control signal and the second transmission control signal within an operation time lag after receipt of the other of the first transmission control signal and the second transmission control signal.

With the electrical bicycle operating system according to the tenth aspect, it is possible to absorb a time lag occurring between receipt of the first transmission control signal and receipt of the second transmission control signal.

In accordance with an eleventh aspect of the present invention, the electrical bicycle operating system according to the tenth aspect is configured so that the control unit is configured to operate an electrical bicycle shifting device to perform one of upshifting and downshifting in response to the first transmission control signal when the control unit does not receive the second transmission control signal within the operation time lag after receipt of the first transmission control signal. The control unit is configured to operate the electrical bicycle shifting device to perform the other of upshifting and downshifting in response to the second transmission control signal when the control unit does not receive the first transmission control signal within the operation time lag after receipt of the second transmission control signal. The control unit is configured to keep a shift position of the electrical bicycle shifting device when the control unit receives one of the first transmission control signal and the second transmission control signal within the operation time lag after receipt of the other of the first transmission control signal and the second transmission control signal.

With the electrical bicycle operating system according to the eleventh aspect, it is possible to prevent the electrical bicycle shifting device from operating in response to both receipt of the first transmission control signal and receipt of the second transmission control signal.

In accordance with a twelfth aspect of the present invention, the electrical bicycle operating system according to the tenth aspect is configured so that the control unit is configured to continuously generate the third signal having a constant width regardless of a width of each of the first transmission control signal and the second transmission control signal in response to both the first transmission control signal and the second transmission control signal.

With the electrical bicycle operating system according to the twelfth aspect, it is possible to utilize the constant width of the third signal to operate the at least one of the electrical bicycle seatpost assembly, the electrical suspension, and the driving unit.

In accordance with a thirteenth aspect of the present invention, the electrical bicycle operating system according to any one of the second to twelfth aspects is configured so that the control unit is configured to generate the third signal to perform a first operation of the at least one of the electrical bicycle seatpost assembly, the electrical suspension, and the driving unit. The control unit is configured to generate a fourth signal to perform a second operation of the at least one of the electrical bicycle seatpost assembly, the electrical suspension, and the driving unit, the second operation being different from the first operation.

With the electrical bicycle operating system according to the thirteenth aspect, it is possible to reduce power consumption of the electrical bicycle operating system compared with a case where the third signal has a continuous width defining the first operation and the second operation of the at least one of the electrical bicycle seatpost assembly, the electrical suspension, and the driving unit.

In accordance with a fourteenth aspect of the present invention, the electrical bicycle operating system according to any one of the first to thirteenth aspects is configured so that the control unit is configured to generate a third signal to operate the at least one of the electrical bicycle seatpost assembly, the electrical suspension, and the driving unit when the control unit receives both the first transmission control signal and the second transmission control signal during more than an operation time period.

With the electrical bicycle operating system according to the fourteenth aspect, it is possible to prevent unintentional operation of the at least one of the electrical bicycle seatpost assembly, the electrical suspension, and the driving unit due to improper operation of the first switch and the second switch.

In accordance with a fifteenth aspect of the present invention, the electrical bicycle operating system according to any one of the eleventh to fourteenth aspects is configured so that the control unit is configured to operate the electrical bicycle shifting device to upshift in response to the first transmission control signal. The control unit is configured to operate the electrical bicycle shifting device to downshift in response to the second transmission control signal.

With the electrical bicycle operating system according to the fifteenth aspect, it is possible to control the electrical bicycle shifting device to upshift and downshift using the first switch and the second switch.

In accordance with a sixteenth aspect of the present invention, the electrical bicycle operating system according to any one of the eleventh to fifteenth aspects is configured so that the control unit is configured to operate an electrical rear derailleur provided as the electrical bicycle shifting device in response to one of the first transmission control signal and the second transmission control signal.

With the electrical bicycle operating system according to the sixteenth aspect, it is possible to control the electrical rear derailleur using the first switch and the second switch.

In accordance with a seventeenth aspect of the present invention, the electrical bicycle operating system according to the sixteenth aspect is configured so that the control unit is integrally provided with the electrical rear derailleur as a single unit.

With the electrical bicycle operating system according to the seventeenth aspect, it is possible to reduce an installation space for the control unit compared with a case where the control unit is separately provided from the electrical rear derailleur.

In accordance with an eighteenth aspect of the present invention, the electrical bicycle operating system according to any one of the first to seventeenth aspects is configured so that the first switch is mounted to one of a right part and a left part of a handlebar. The second switch is mounted to the other of the right part and the left part of the handlebar.

With the electrical bicycle operating system according to the eighteenth aspect, it is possible to improve operability of the first switch and the second switch.

In accordance with a nineteenth aspect of the present invention, an electrical derailleur comprises a control unit to generate a control signal to operate at least one of an electrical bicycle seatpost assembly, an electrical suspension, and a driving unit.

With the electrical bicycle operating system according to the nineteenth aspect, it is possible to an installation space for the control unit compared with a case where the control unit is separately provided from the electrical derailleur.

In accordance with a twentieth aspect of the present invention, the electrical bicycle operating system according to the nineteenth aspect is configured so that the control unit wirelessly transmits the control signal.

With the electrical bicycle operating system according to the twentieth aspect, it is possible to omit a cable to transmit the control signal, saving weight of a bicycle.

In accordance with a twenty-first aspect of the present invention, the electrical bicycle operating system according to the nineteenth or twentieth aspect is configured so that the control unit transmits the control signal in response to receipt of a transmission control signal transmitted from a shift switch.

With the electrical bicycle operating system according to the twenty-first aspect, it is possible to operate the at least one of the electrical bicycle seatpost assembly, the electrical suspension, and the driving unit using the shift switch, improving operability of the electrical bicycle operating system.

In accordance with a twenty-second aspect of the present invention, the electrical bicycle operating system according to any one of the nineteenth to twenty-first aspects is configured so that the control unit keeps a shift position of the electrical derailleur when the control unit receives both an upshift signal and a downshift signal concurrently.

With the electrical bicycle operating system according to the twenty-second aspect, it is possible to prevent unintentional operation of the electrical derailleur caused by improper input of the upshift signal and the downshift signal.

In accordance with a twenty-third aspect of the present invention, the electrical bicycle operating system according to any one of the nineteenth to twenty-second aspects further comprises a base, a chain guide, and a motor unit to move the chain guide relative to the base. The control unit is operatively connected to the motor unit.

With the electrical bicycle operating system according to the twenty-third aspect, it is possible to operate the chain guide and the motor unit via the control unit.

In accordance with a twenty-fourth aspect of the present invention, the electrical bicycle operating system according to the twenty-third aspect is configured so that the control unit is provided to one of the motor unit and the base.

With the electrical bicycle operating system according to the twenty-fourth aspect, it is possible to reduce an installation space for the control unit compared with a case where the control unit is provided to neither the motor unit nor the base.

In accordance with a twenty-fifth aspect of the present invention, an electrical seatpost assembly comprises an electrical actuation unit and a control unit. The control unit is configured to control the electrical actuation unit when the control unit concurrently receives both a first transmission control signal to perform upshifting of an electrical bicycle shifting device and a second transmission control signal to perform downshifting of the electrical bicycle shifting device.

With the electrical bicycle operating system according to the twenty-fifth aspect, it is possible to electrically operate the electrical seatpost assembly using the first transmission control signal and the second transmission control signal.

In accordance with a twenty-sixth aspect of the present invention, an electrical bicycle operating system comprises a first switch, a second switch, and a control unit to generate an operation signal to operate a bicycle component when both the first switch and the second switch are operated concurrently. The control unit selects one of an electrical bicycle seatpost assembly, an electrical suspension, a driving unit, and an electrical bicycle shifting device as the bicycle component in accordance with a user input.

With the electrical bicycle operating system according to the twenty-sixth aspect, it is possible to automatically continuously change the shift position of the electrical bicycle shifting device in response to operation of the first switch and the second switch. This improves operability of the electrical bicycle operating system.

In accordance with a twenty-seventh aspect of the present invention, an electrical bicycle operating system comprises a first switch, a second switch, and a control unit to control an electrical bicycle shifting device to continuously change a shift position of the electrical bicycle shifting device by at least two shift stages when both the first switch and the second switch are operated concurrently.

With the electrical bicycle operating system according to the twenty-seventh aspect, it is possible to increase a bicycle component which can be operated using the first switch and the second switch. This improves convenience of the electrical bicycle operating system.

In accordance with a twenty-eighth aspect of the present invention, the electrical bicycle operating system according to the twenty-seventh aspect is configured so that the control unit controls the electrical bicycle shifting device to continuously upshift by the at least two shift stages when both the first switch and the second switch are operated concurrently.

With the electrical bicycle operating system according to the twenty-eighth aspect, it is possible to quickly increase a speed of a bicycle using concurrent operation of the first switch and the second switch.

In accordance with a twenty-ninth aspect of the present invention, the electrical bicycle operating system according to the twenty-seventh or twenty-eighth aspect is configured so that the control unit controls a rear derailleur provided as the electrical bicycle shifting device to continuously change a rear shift position of the rear derailleur by the at least two shift stages when both the first switch and the second switch are operated concurrently.

With the electrical bicycle operating system according to the twenty-ninth aspect, it is possible to quickly increase a speed of a bicycle using concurrent operation of the first switch and the second switch.

In accordance with a thirtieth aspect of the present invention, the electrical bicycle operating system according to any one of the twenty-seventh to twenty-ninth aspects is configured so that the control unit sets a predetermined number of shift stages as the at least two shift stages in accordance with a user input. The control unit controls the electrical bicycle shifting device to continuously change the shift position by the predetermined number of shift stages when both the first switch and the second switch are operated concurrently.

With the electrical bicycle operating system according to the thirtieth aspect, it is possible to change the predetermined number of shift stages in accordance with specification of the electrical bicycle shifting device.

In accordance with a thirty-first aspect of the present invention, the electrical bicycle operating system according to any one of the twenty-seventh to thirtieth aspects is configured so that the first switch includes a first upshift switch and a first downshift switch. The control unit controls a rear derailleur provided as the electrical bicycle shifting device to upshift when the first upshift switch is operated without operation of the second switch. The control unit controls the rear derailleur to downshift when the first downshift switch is operated without operation of the second switch.

With the electrical bicycle operating system according to the thirty-first aspect, it is possible to control the rear derailleur to upshift and downshift in addition to continuously changing the rear shift position of the rear derailleur.

In accordance with a thirty-second aspect of the present invention, the electrical bicycle operating system according to the thirty-first aspect is configured so that the control unit controls the rear derailleur to continuously change a rear shift position of the rear derailleur by the at least two shift stages when both the second switch and one of the first upshift switch and the first downshift switch are operated concurrently.

With the electrical bicycle operating system according to the thirty-second aspect, it is possible to control the rear derailleur to upshift, to downshift, and to continuously change the rear shift position of the rear derailleur using the first upshift switch, the first downshift switch, and the second switch.

In accordance with a thirty-third aspect of the present invention, the electrical bicycle operating system according to the thirty-second aspect is configured so that the second switch includes a second upshift switch and a second downshift switch. The control unit controls a front derailleur provided as the electrical bicycle shifting device to upshift when the second upshift switch is operated without operation of the first switch. The control unit controls the front derailleur to downshift when the second downshift switch is operated without operation of the first switch.

With the electrical bicycle operating system according to the thirty-third aspect, it is possible to perform upshifting and downshifting of the front derailleur in addition to the rear derailleur.

In accordance with a thirty-fourth aspect of the present invention, the electrical bicycle operating system according to the thirty-third aspect is configured so that the control unit controls the rear derailleur to continuously change the rear shift position by the at least two shift stages when both one of the first upshift switch and the first downshift switch and one of the second upshift switch and the second downshift switch are operated concurrently.

With the electrical bicycle operating system according to the thirty-fourth aspect, it is possible to control the rear derailleur and the front derailleur using the first upshift switch, the first downshift switch, the second upshift switch, and the second downshift switch.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 52 shows shift-map information of the electrical bicycle operating system illustrated in FIG. 49.

DESCRIPTION OF THE EMBODIMENTS

Figure 1:
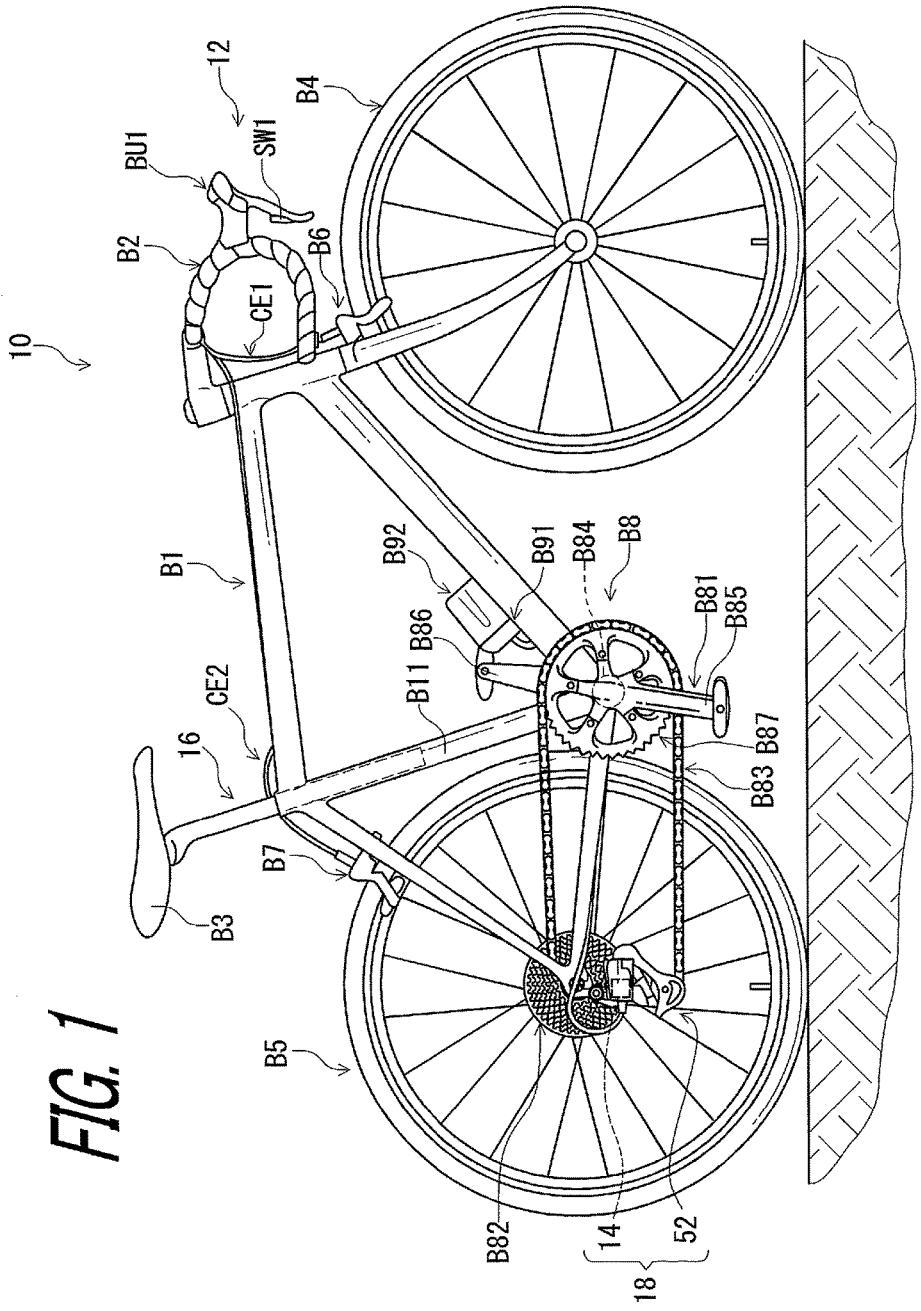
FIG. 1 is a side elevational view of a bicycle including an electrical bicycle operating system in accordance with a first embodiment.

The embodiments will now be described with reference to the accompanying drawings, wherein like reference numerals designate corresponding or identical elements throughout the various drawings.

First Embodiment

Figure 2:
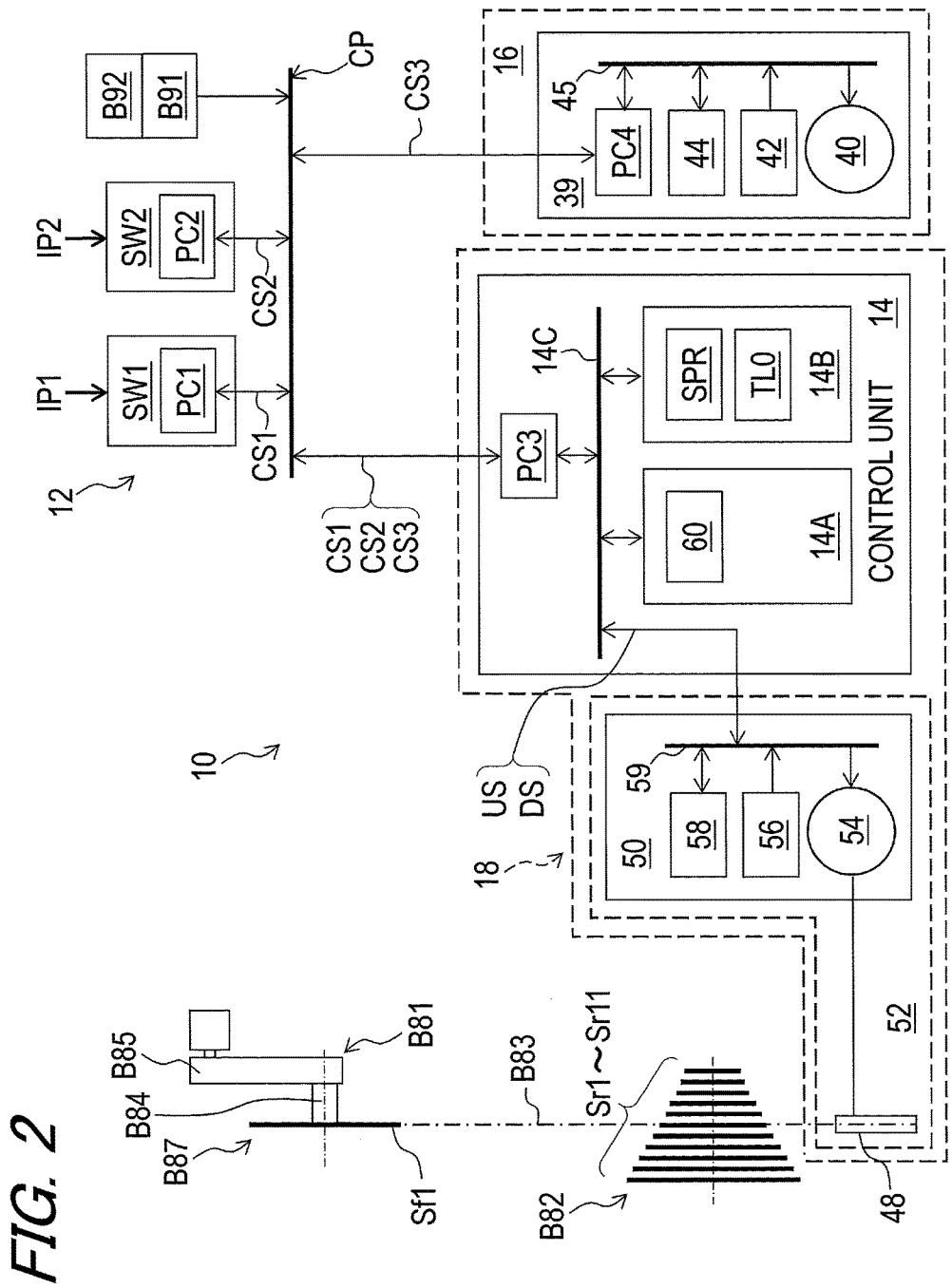
FIG. 2 is a block diagram of the bicycle illustrated in FIG. 1.

Referring initially to FIGS. 1 and 2, a bicycle 10 includes an electrical bicycle operating system 12 in accordance with a first embodiment. As seen in FIG. 1, the bicycle 10 includes a bicycle frame B1, a handlebar B2, a saddle B3, a front wheel B4, a rear wheel B5, a front brake B6, a rear brake B7, and a drive train B8. The drive train B8 converts the rider's pedaling force into a driving force. The bicycle frame B1, the handlebar B2, the saddle B3, the front wheel B4, the rear wheel B5, the front brake B6, and the rear brake B7 include structures which have been well known in the bicycle field. Thus, they will not be described/illustrated in detail here for the sake of brevity.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle B3 of the bicycle 10 with facing the handlebar B2. Accordingly, these terms, as utilized to describe the electrical bicycle operating system 12, should be interpreted relative to the bicycle 10 equipped with the electrical bicycle operating system 12 as used in an upright riding position on a horizontal surface.

The drive train B8 includes a bicycle crank B81, a rear sprocket B82, and a bicycle chain B83. The bicycle crank B81 is rotatably mounted on the bicycle frame B1. The bicycle crank B81 includes a crank axle B84, a right crank arm B85, a left crank arm B86, and a front sprocket B87. The right crank arm B85 and the left crank arm B86 are coupled to respective ends of the crank axle B84. The front sprocket B87 is coupled to the crank axle B84 via the right crank arm B85. The bicycle chain B83 is arranged on the front sprocket B87 and the rear sprocket B82 so as to extend therebetween.

As seen in FIG. 2, the front sprocket B87 includes a front sprocket wheel Sf1. The rear sprocket B82 includes first to eleventh rear sprocket wheels Sr1 to Sr11. A total number of teeth of the first rear sprocket wheel Sr1 is smaller than a total number of teeth of the eleventh rear sprocket wheel Sr11. The first rear sprocket wheel Sr1 corresponds to low gear. The eleventh rear sprocket wheel Sr11 corresponds to top gear. In this embodiment, each of the first to eleventh rear sprocket wheels Sr1 to Sr11 has a different total number of teeth. A total number of the rear sprocket wheels Sr1 to Sr11 are not limited to this embodiment. The rear sprocket B82 can include less than ten or more than twelve rear sprocket wheels. The front sprocket B87 can includes a plurality of front sprocket wheels.

As seen in FIG. 2, the electrical bicycle operating system comprises a first switch SW1, a second switch SW2, and a control unit 14. The first switch SW1 generates a first transmission control signal CS1. The second switch SW2 generates a second transmission control signal CS2. The control unit 14 electrically operates at least one of an electrical bicycle seatpost assembly, an electrical suspension, and a driving unit when both the first switch SW1 and the second switch SW2 are operated concurrently. The driving unit outputs an assist force.

In this embodiment, the bicycle 10 includes an electrical bicycle seatpost assembly 16 in accordance with the first embodiment. As seen in FIG. 1, the electrical bicycle seatpost assembly 16 is mounted to a seat tube B11 of the bicycle frame B1. The saddle B3 is secured to an upper end of the electrical bicycle seatpost assembly 16. The bicycle 10 includes an electrical derailleur 18 in accordance with the first embodiment. While the electrical derailleur 18 comprises the control unit 14 in this embodiment, the control unit 14 can be arranged to other positions.

The control unit 14 electrically operates the electrical bicycle seatpost assembly 16. However, the control unit 14 electrically can be configured to operate at least one of the electrical suspension and the driving unit when both the first switch SW1 and the second switch SW2 are operated concurrently instead of or in addition to the electrical bicycle seatpost assembly 16.

As seen in FIG. 2, the control unit 14 is constituted as a microcomputer and includes a processor 14A and a storage device 14B. The processor 14A includes a central processing unit (CPU) and a memory controller. The storage device 14B includes a read only memory (ROM) and a random access memory (RAM). The storage device 14B can be also referred to as the memory 14B. The ROM includes a non-transitory computer-readable storage medium. The RAM includes a transitory computer-readable storage medium. The storage device 14B includes storage areas each having an address in the ROM and the RAM. The processor 14A controls the storage device 14B to store data in the storage areas of the storage device 14B and reads data from the storage areas of the storage device 14B.

At least one program is stored in the storage device 14B (e.g., the ROM). The at least one program is read into the processor 14A, and thereby functions of the control unit 14 are performed. The processor 14A and the storage device 14B are mounted on a substrate (not shown) and are connected with each other via a bus 14C.

The first switch SW1 is configured to receive a first user input IP1 and is configured to generate the first transmission control signal CS1 in response to the first user input IP1. The second switch SW2 is configured to receive a second user input IP2 and is configured to generate the second transmission control signal CS2 in response to the second user input IP2. Examples of the first user input IP1 and the second user input IP2 include pushing a switch and operating a member.

Figure 3:
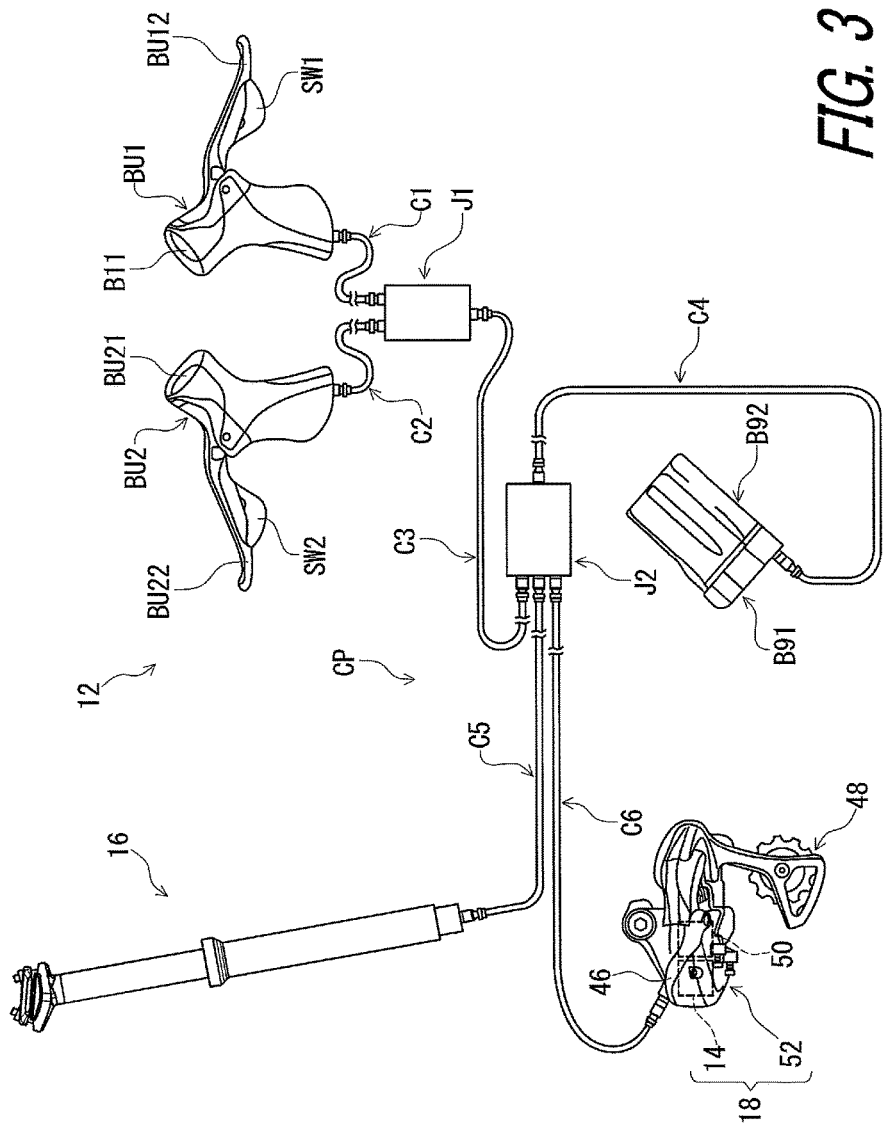
FIG. 3 is a schematic diagram showing one exemplary configuration of an electric communication path of the bicycle illustrated in FIG. 1.

As seen in FIG. 3, the bicycle 10 includes a first brake operating unit BU1 and a second brake operating unit BU2. The first brake operating unit BU1 is operatively coupled to the front brake B6 via a connecting element CE1 (FIG. 1) such as a mechanical control cable or a hydraulic hose. The second brake operating unit BU2 is operatively coupled to the rear brake B7 via a connecting element CE2 (FIG. 1) such as a mechanical control cable or a hydraulic hose.

The first brake operating unit BU1 includes a first bracket BU11 and a first brake lever BU12 pivotally coupled to the first bracket BU11 The second brake operating unit BU2 includes a second bracket BU21 and a second brake lever BU22 pivotally coupled to the second bracket BU21.

Figure 4:
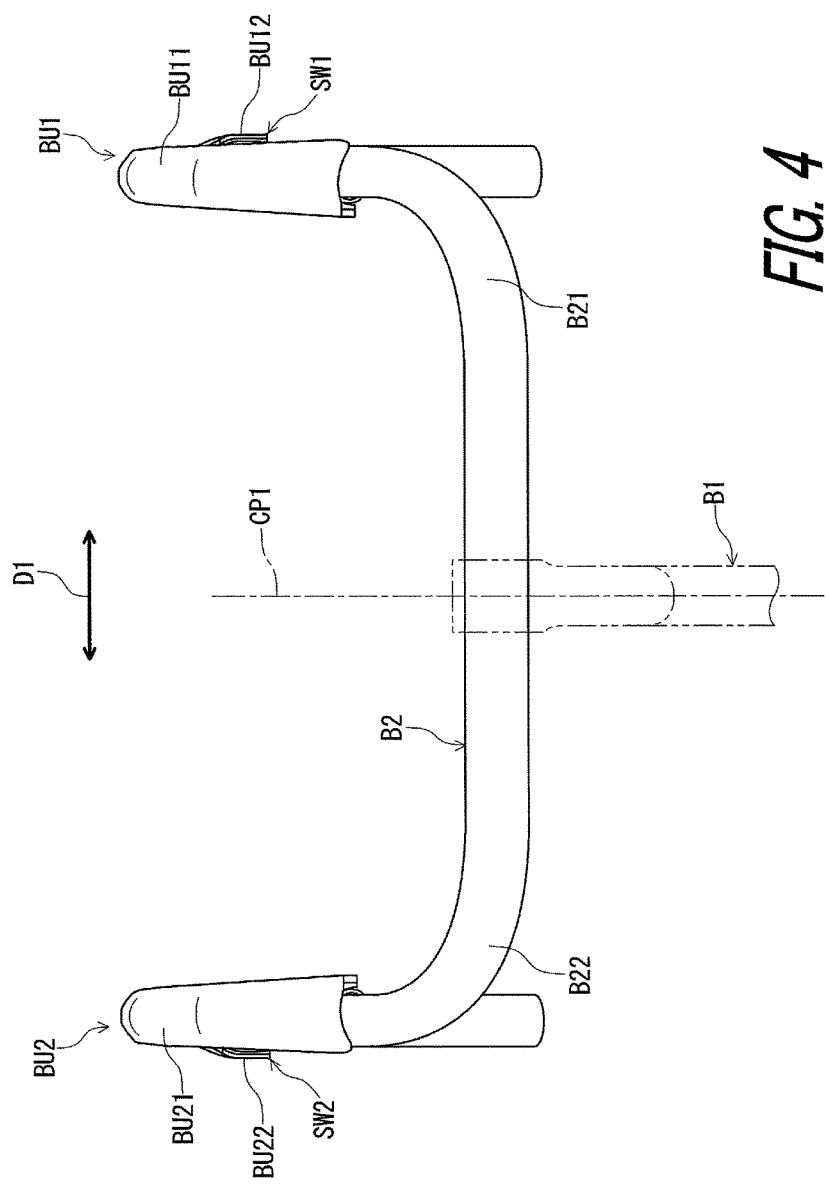
FIG. 4 is a plan view of a handlebar with a first brake operating unit and a second brake operating unit of the bicycle illustrated in FIG. 1.

As seen in FIG. 4, the first bracket BU11 is secured to the handlebar B2. The second bracket BU21 is secured to the handlebar B2. In this embodiment, the first bracket BU11 is secured to a right part B21 of the handlebar B2. The second bracket BU21 is secured to a left part B22 of the handlebar B2.

The first brake operating unit BU1 and the second brake operating unit BU2 include structures which have been well known in the bicycle field. Thus, they will not be described and/or illustrated in detail here for the sake of brevity.

In the illustrated embodiment, as seen in FIG. 3, the first switch SW1 is mounted to the first brake operating unit BU1. The second switch SW2 is mounted to the second brake operating unit BU2. Specifically, the first switch SW1 is mounted to the first brake lever BU12. The second switch SW2 is mounted to the second brake lever BU22. However, the first switch SW1 can be mounted to other parts of the first brake operating unit BU1 or the handlebar B2. The second switch SW2 can be mounted to other parts of the second brake operating unit BU2 or the handlebar B2.

As seen in FIG. 4, the first switch SW1 is mounted to one of the right part B21 and the left part B22 of the handlebar B2. The second switch SW2 is mounted to the other of the right part B21 and the left part B22 of the handlebar B2. In this embodiment, the first switch SW1 is mounted to the right part B21 of the handlebar B2. The second switch SW2 is mounted to the left part B22 of the handlebar B2. However, the first switch SW1 can be mounted to the left part B22 of the handlebar B2, and the second switch SW2 can be mounted to the right part B21 of the handlebar B2. Furthermore, at least one of the first switch SW1 and the second switch SW2 can be mounted to other parts of the bicycle 10.

The right part B21 of the handlebar B2 is provided on a right side of a transverse center plane CP1 of the bicycle 10. The left part B22 of the handlebar B2 is provided on a left side of the transverse center plane CP1 of the bicycle 10. The transverse center plane CP1 is defined at a center of the bicycle frame B1 in a transverse direction D1 of the bicycle 10.

As seen in FIG. 1, the bicycle 10 includes a battery holder B91 and a battery B92. The battery holder B91 is mounted to the bicycle frame B1 and is configured to detachably receive the battery B92. The battery B92 is electrically connected to the battery holder B91 in a state where the battery B92 is mounted to the battery holder B91. Examples of the battery B92 include a primary battery (e.g., a dry-cell battery) and a secondary battery (e.g., a rechargeable battery such as a rechargeable lithium-ion battery).

As seen in FIGS. 2 and 3, the bicycle 10 includes an electric communication path CP to establish communication among the electrical bicycle operating system 12, the electrical bicycle seatpost assembly 16, the electrical derailleur 18, and the battery holder B91 using power line communication technology.

Power line communication (PLC) carries data on a conductor that is also used simultaneously for electric power transmission or electric power distribution to electric components. In this embodiment, the electric power is supplied from the battery B92 to the electrical bicycle operating system 12, the electrical bicycle seatpost assembly 16, and the electrical derailleur 18 via the battery holder B91 and the electric communication path CP. Furthermore, the electrical bicycle operating system 12, the electrical bicycle seatpost assembly 16, and the electrical derailleur 18 send and receive control signals via the electric communication path CP using the PLC.

As seen in FIG. 3, the electric communication path CP includes a first junction J1, a second junction J2, and first to sixth cables C1 to C6. Each of the first to sixth cables C1 to C6 includes electric connectors at both ends thereof. The first switch SW1 is electrically connected to the first junction J1 via the first cable C1. The second switch SW2 is electrically connected to the first junction J1 via the second cable C2. The first junction J1 is electrically connected to the second electric wiring junction J2 via the third cable C3. The second junction J2 is electrically connected to the battery holder B91 via the fourth cable C4. The second junction J2 is electrically connected to the electrical bicycle seatpost assembly 16 via the fifth cable C5. The second junction J2 is electrically connected to the electrical derailleur 18 via the sixth cable C6.

Each of the first to sixth cables C1 to C6 includes a ground line and a voltage line that are detachably connected to a serial bus that is formed by communication interfaces and the first and second junctions J1 and J2. Electric power is supplied from the battery B92 to the electrical bicycle operating system 12, the electrical bicycle seatpost assembly 16, and the electrical derailleur 18 via the voltage line. In this embodiment, the electrical bicycle operating system 12, the electrical bicycle seatpost assembly 16, and the electrical derailleur 18 can all communicate with each other through the voltage line using the power line communication technology.

The PLC uses unique identifying information such as a unique identifier that is assigned to each of the first switch SW1, the second switch SW2, the control unit 14, the electrical bicycle seatpost assembly 16, and the electrical derailleur 18. Each of the control unit 14, the first switch SW1, the second switch SW2, the electrical bicycle seatpost assembly 16, and the electrical rear derailleur 52 includes a PLC controller in which the unique identifying information is stored. Based on the unique identifying information, each of the first switch SW1, the second switch SW2, the control unit 14, the electrical bicycle seatpost assembly 16, and the electrical rear derailleur 52 can recognize control signals which are necessary for itself among control signals transmitted via the electric communication path CP. For example, the control unit 14 can recognize information signals transmitted from the first switch SW1, the second switch SW2, the electrical bicycle seatpost assembly 16, and the electrical rear derailleur 52 via the electric communication path CP. Instead of using the PLC technology, however, separate signal wires can be provided for transmitting data in addition to the ground wire and the voltage wire if needed and/or desired. Furthermore, wireless technology can be used to transmit control signals between these electric components. The configuration of the electric communication path CP is not limited to the above configuration illustrated in FIG. 3.

As seen in FIG. 2, the first switch SW1 includes a first PLC controller PC1 connected to the processor 14A and the storage device 14B via the bus 14C. The second switch SW2 includes a second PLC controller PC2. For example, each of the first PLC controller PC1 and the second PLC controller PC2 includes a filter circuit and a voltage regulator circuit. The first PLC controller PC1 is configured to separate input signals to a power source voltage and control signals. The first PLC controller PC1 is configured to regulate the power source voltage to a level at which the first switch SW1 can properly operate. The first PLC controller PC1 is further configured to superimpose the first transmission control signal CS1 on the power source voltage applied to the electric communication path CP from the battery B92.

The second PLC controller PC2 has substantially the same configuration as that of the first PLC controller PC1. Specifically, the second PLC controller PC2 is configured to separate input signals to the power source voltage and control signals. The second PLC controller PC2 is configured to regulate the power source voltage to a level at which the second switch SW2 can properly operate. The second PLC controller PC2 is further configured to superimpose the second transmission control signal CS2 on the power source voltage applied to the electric communication path CP from the battery B92.

The control unit 14 includes a third PLC controller PC3. The third PLC controller PC3 has substantially the same configuration as that of the first PLC controller PC1. Specifically, the third PLC controller PC3 is configured to separate input signals to the power source voltage, the first transmission control signal CS1, and the second transmission control signal CS2. The third PLC controller PC3 is configured to regulate the power source voltage to a level at which the processor 14A and the storage device 14B can properly operate. The third PLC controller PC3 is further configured to superimpose a third signal CS3 (described later) on the power source voltage. The third signal CS3 can be also referred to as a control signal CS3.

The electrical bicycle seatpost assembly 16 includes a fourth PLC controller PC4. The fourth PLC controller PC4 has substantially the same configuration as that of the first PLC controller PC1. The fourth PLC controller PC4 is configured to separate input signals to the power source voltage and the third signal CS3. The fourth PLC controller PC4 is configured to regulate the power source voltage to a level at which electric components of the electrical bicycle seatpost assembly 16 can properly operate. The fourth PLC controller PC4 is further configured to superimpose control signals on the power source voltage.

Figure 5:
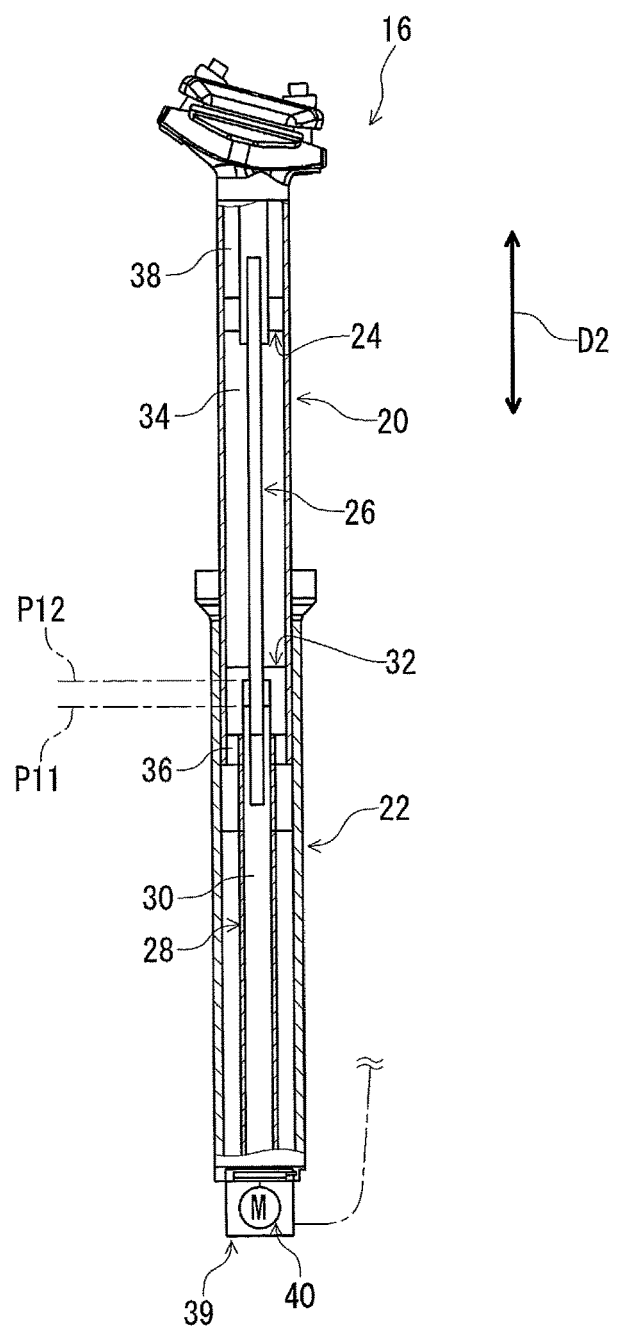
FIG. 5 is a cross-sectional view of an electrical bicycle seatpost assembly of the bicycle illustrated in FIG. 1.

As seen in FIG. 5, the electrical bicycle seatpost assembly 16 includes a first tube 20, a second tube 22, a floating piston 24, a rod 26, a guide member 28, a flow control part 30, and a valve unit 32. The first tube 20 and the second tube 22 are telescopically arranged, with the amount of insertion of the first tube 20 into the second tube 22 being adjustable. The second tube 22 is secured to the seat tube B11 (FIG. 1) by a conventional clamping arrangement (not shown) provided on an upper end of the seat tube B11.

The valve unit 32 divides an interior bore of the first tube 20 into a first fluid chamber 34 and a second fluid chamber 36. The flow control part 30 is provided in the guide member 28 to move relative to the valve unit 32 between a closed position P11 and an open position P12 in a telescopic direction D2. The flow control part 30 is biased by a biasing element (not shown) toward the closed position P11.

The valve unit 32 is closed when the flow control part 30 is positioned at the closed position P11. The valve unit 32 is open when the flow control part 30 is positioned at the open position P12. The valve unit 32 is coupled to the second tube 22 via the guide member 28 to move together relative to the first tube 20. The first fluid chamber 34 is disposed between the valve unit 32 and the floating piston 24. The second fluid chamber 36 is disposed between the valve unit 32 and a lower end of the first tube 20. The flow control part 30 cooperates with the guide member 28 and the valve unit 32 to control flow of fluid between the first fluid chamber 34 and the second fluid chamber 36 to change a position of the first tube 20 relative to the second tube 22.

When the valve unit 32 is closed, the first tube 20 is positioned relative to the second tube 22 in the telescopic direction D2. When the valve unit 32 is open, the first tube 20 is movable relative to the second tube 22 in the telescopic direction D2. The floating piston 24 is disposed in the interior bore of the first tube 20 and forms a gas chamber 38 disposed between the floating piston 24 and an upper end of the first tube 20. The shorter total length of the electrical bicycle seatpost assembly 16 increases an inner pressure of the gas chamber 38. The electrical bicycle seatpost assembly 16 includes structures which have been known in the bicycle field, they will not be described and/or illustrated in detail here for the sake of brevity.

As seen in FIG. 5, the electrical bicycle seatpost assembly 16 comprises the electrical actuation unit 39. The electrical actuation unit 39 is connected to the control unit 14 via the electric communication path CP. The electrical actuation unit 39 moves the flow control part 30 from the closed position P11 to the open position P12 in response to the third signal CS3 transmitted from the control unit 14. The electrical actuation unit 39 keeps the flow control part 30 at the open position P12 while receiving the third signal CS3 from the control unit 14. The electrical actuation unit 39 keeps the flow control part 30 at the closed position P11 when the electrical actuation unit 39 does not receive the third signal CS3 from the control unit 14.

The electrical actuation unit 39 includes a valve actuator 40, a valve position sensor 42, and an actuator driver 44. The valve actuator 40, the valve position sensor 42, the actuator driver 44, and the fourth PLC controller PC4 are connected with each other via a bus 45. The valve actuator 40 is mechanically coupled to the flow control part 30 to move the flow control part 30 between the closed position P11 and the open position P12. In this embodiment, the valve actuator 40 includes a direct current (DC) motor. The valve actuator 40 includes a rotational shaft (not shown) to output a rotational force. The rotational shaft is coupled to the flow control part 30 via a gear reducer (not shown). Other examples of the valve actuator 40 include a stepper motor, an alternating current (AC) motor, and an electromagnetic solenoid.

The valve position sensor 42 is configured to sense a valve position of the flow control part 30 via the valve actuator 40. In this embodiment, the valve position sensor 42 is a contact rotational position sensor such as a potentiometer. The valve position sensor 42 is configured to sense an absolute rotational position of the rotational shaft of the valve actuator 40 as the valve position of the flow control part 30. Other examples of the valve position sensor 42 include a non-contact rotational position sensor such as an optical sensor (e.g., a rotary encoder) and a magnetic sensor (e.g., a hall sensor).

The valve position sensor 42 is electrically connected to the actuator driver 44. The actuator driver 44 is configured to control the valve actuator 40 based on the third signal CS3 and the position sensed by the valve position sensor 42. Specifically, the actuator driver 44 is electrically connected to the valve actuator 40. The actuator driver 44 is configured to control a rotational direction and a rotational speed of the rotational shaft based on the valve position and the third signal CS3 transmitted from the control unit 14. Furthermore, the actuator driver 44 is configured to stop rotation of the rotational shaft to position the flow control part 30 at one of the closed position P11 and the open position P12 based on the valve position and the third signal CS3 transmitted from the control unit 14.

The actuator driver 44 controls the valve actuator 40 to keep the flow control part 30 at the closed position P11 while the actuator driver 44 does not receive the third signal CS3. The actuator driver 44 controls the valve actuator 40 to move the flow control part 30 from the closed position P11 to the open position P12 while the actuator driver 44 receives the third signal CS3. For example, the actuator driver 44 includes an electric circuit configured to perform the above functions of the actuator driver 44.

As seen in FIG. 3, the electrical derailleur 18 further comprises a base 46, a chain guide 48, and a motor unit 50. The motor unit 50 moves the chain guide 48 relative to the base 46. The control unit 14 is operatively connected to the motor unit 50. In the illustrated embodiment, the electrical derailleur 18 includes an electrical rear derailleur 52 and the control unit 14. However, the electrical derailleur 18 can include an electrical front derailleur and the control unit 14. In this embodiment, the electrical rear derailleur 52 includes the base 46, the chain guide 48, and the motor unit 50.

As seen in FIG. 2, the chain guide 48 guides the bicycle chain B83 in the transverse direction D1 (FIG. 4) of the bicycle 10 between the low to top gear positions of the rear sprocket B82. The position of the chain guide 48 corresponds to the shift position of the electrical rear derailleur 52.

The motor unit 50 includes a motor 54, a shift position sensor 56, and a motor driver 58. The motor 54, the shift position sensor 56, the motor driver 58, and the fifth PLC controller PC5 are connected with each other via a bus 59. The motor 54 is mechanically coupled to the chain guide 48. The motor 54 is configured to move the chain guide 48 to shift the bicycle chain B83 relative to the rear sprocket B82. In this embodiment, the motor 54 includes a DC motor. The motor 54 includes a rotational shaft (not shown) to output a rotational force. The rotational shaft is coupled to the chain guide 48 via a gear reducer (not shown). Other examples of the motor 54 include a stepper motor and an AC motor.

The electrical derailleur 18 has a plurality of available shift positions as the shift position of the electrical rear derailleur 52. In this embodiment, the electrical derailleur 18 has eleven available shift positions respectively corresponding to the first to eleventh rear sprocket wheels Sr1 to Sr11.

The shift position sensor 56 is configured to sense a position of the motor 54 as the shift position of the electrical derailleur 18. In this embodiment, the shift position sensor 56 is a contact rotational position sensor such as a potentiometer. The shift position sensor 56 is configured to sense an absolute rotational position of the rotational shaft of the motor 54 as the shift position of the electrical derailleur 18. Other examples of the shift position sensor 56 include a non-contact rotational position sensor such as an optical sensor (e.g., a rotary encoder) and a magnetic sensor (e.g., a hall sensor).

The shift position sensor 56 is electrically connected to the motor driver 58. The motor driver 58 is configured to control the motor 54 based on the front shift position sensed by the shift position sensor 56. Specifically, the motor driver 58 is electrically connected to the motor 54. The motor driver 58 is configured to control a rotational direction and a rotational speed of the rotational shaft based on the shift position and each of the first and second transmission control signals CS1 and CS2. Furthermore, the motor driver 58 is configured to stop rotation of the rotational shaft to position the chain guide 48 at one of the low to top gear positions based on the shift position and each of the first and second transmission control signals CS1 and CS2. The motor driver 58 transmits the shift position sensed by the shift position sensor 56 to the control unit 14. The control unit 14 stores the shift position transmitted from the motor driver 58 as a latest rear shift position SPR. For example, the motor driver 58 includes an electric circuit configured to perform the above functions of the motor driver 58.

In this embodiment, the control unit 14 is integrally provided with the electrical rear derailleur 52 as a single unit. Specifically, the control unit 14 is provided to one of the motor unit 50 and the base 46. The control unit 14 is provided to the base 46. The base 46 includes an internal space. The motor unit 50 and the control unit 14 are provided in the internal space of the base 46. However, the control unit 14 can be provided to the motor unit 50 as a single unit. The bus 14C of the control unit 14 is connected to the bus 59 of the motor unit 50 of the electrical rear derailleur 52.

As seen in FIG. 2, the control unit 14 is configured to operate the electrical rear derailleur 52 provided as the electrical bicycle shifting device in response to one of the first transmission control signal CS1 and the second transmission control signal CS2. The control unit 14 is configured to operate the electrical bicycle shifting device 52 to upshift in response to the first transmission control signal CS1. The control unit 14 is configured to operate the electrical bicycle shifting device 52 to downshift in response to the second transmission control signal CS2.

In this embodiment, the first transmission control signal CS1 can be also referred to as an upshift signal CS1. The second transmission control signal CS2 can be also referred to as a downshift signal CS2. However, the control unit 14 can be configured to operate the electrical bicycle shifting device 52 to downshift in response to the first transmission control signal CS1. The control unit 14 can be configured to operate the electrical bicycle shifting device 52 to upshift in response to the second transmission control signal CS2.

The control unit 14 is configured to control the motor unit 50 to move the chain guide 48 relative to the base 46 in an upshift direction in response to the first transmission control signal CS1. The control unit 14 is configured to control the motor unit 50 to move the chain guide 48 relative to the base 46 in a downshift direction in response to the second transmission control signal CS2.

In the present application, upshifting of the electrical derailleur 18 (the electrical rear derailleur 52 or the electrical bicycle shifting device 52) occurs when the bicycle chain B83 is shifted by the electrical derailleur 18 from a larger sprocket to a neighboring smaller sprocket. Downshifting of the electrical derailleur 18 occurs when the bicycle chain B83 is shifted by the electrical derailleur 18 from a smaller sprocket to a neighboring larger sprocket.

The control unit 14 generates the control signal CS3 to operate at least one of the electrical bicycle seatpost assembly 16, an electrical suspension, and a driving unit. The control unit 14 transmits the control signal CS3 in response to receipt of a transmission control signal transmitted from a shift switch. In this embodiment, each of the first transmission control signal CS1 and the second transmission control signal CS2 can be also referred to as the transmission control signal. Each of the first switch SW1 and the second switch SW2 can be also referred to as the shift switch. The control unit 14 transmits the control signal CS3 in response to receipt of the first transmission control signal CS1 transmitted from the first switch SW1.

Figure 6:
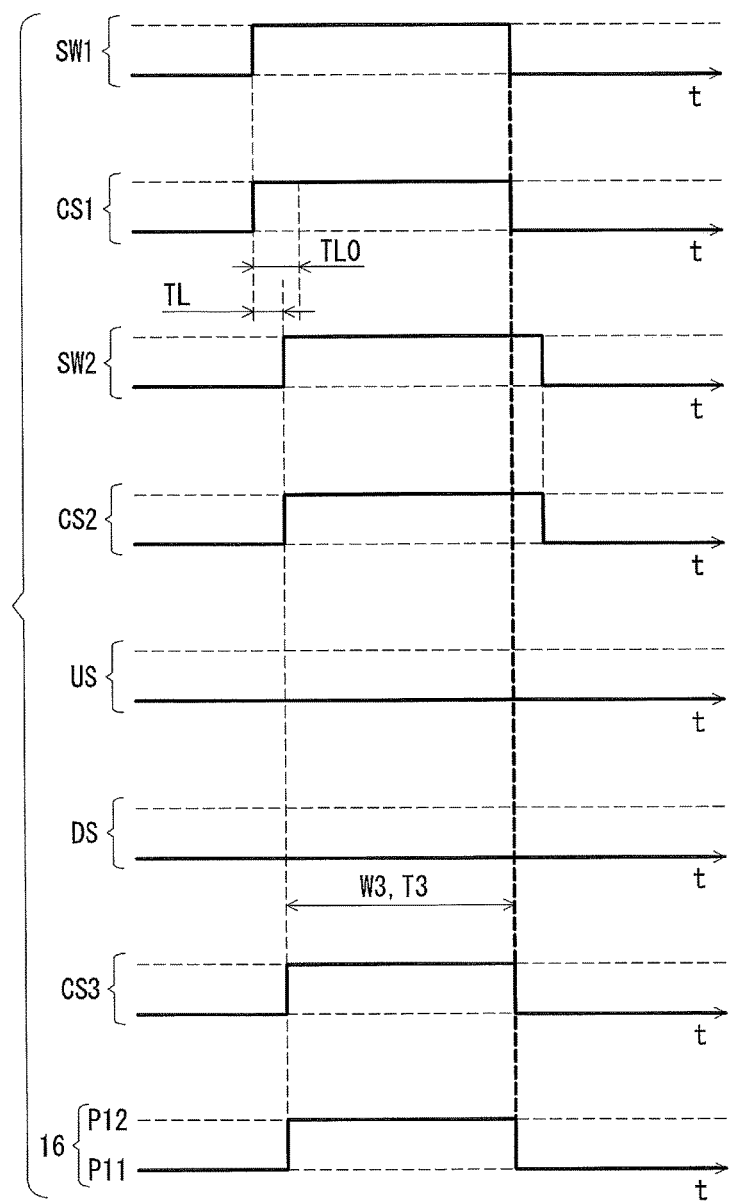
FIGS. 6 to 9 are timing charts of the electrical bicycle operating system illustrated in FIG. 2.
Figure 7:
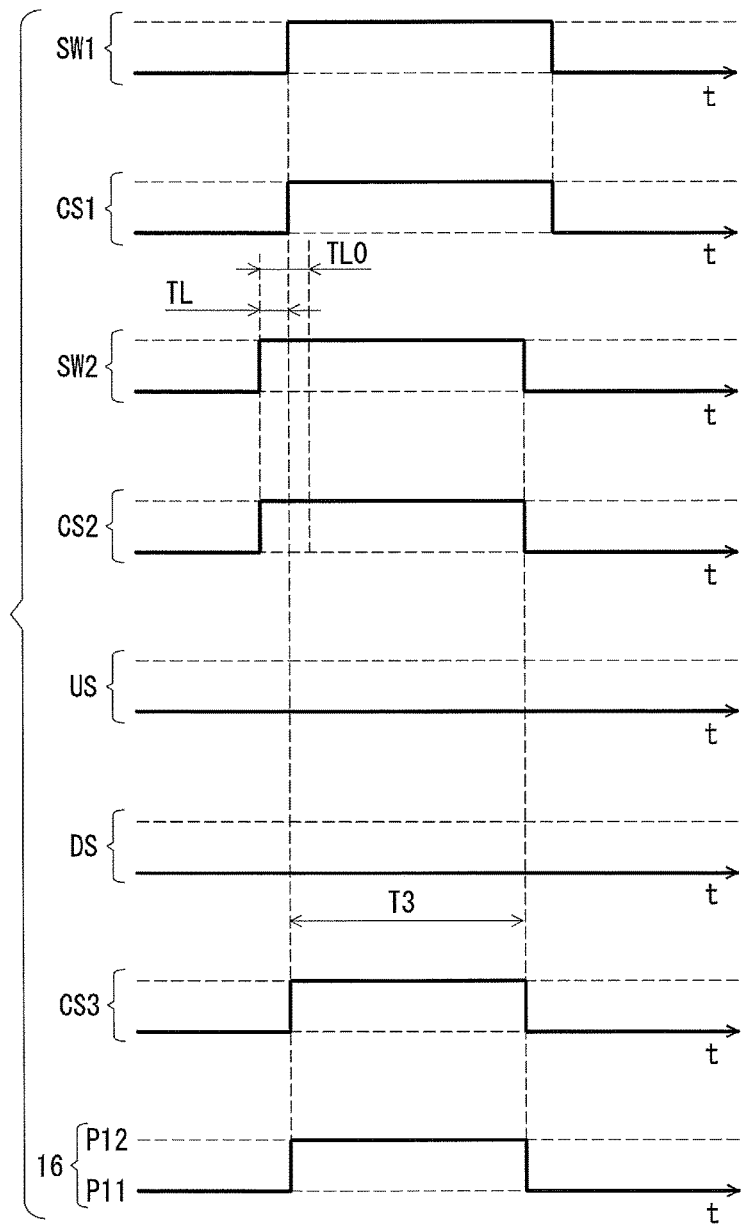

As seen in FIGS. 6 and 7, the control unit 14 generates the third signal CS3 to operate the at least one of the electrical bicycle seatpost assembly 16, the electrical suspension, and the driving unit when both the first switch SW1 and the second switch SW2 are operated concurrently. In this embodiment, the control unit 14 generates the third signal CS3 to operate only the electrical bicycle seatpost assembly 16 when both the first switch SW1 and the second switch SW2 are operated concurrently. However, the control unit 14 generates the third signal CS3 to operate at least one of the electrical suspension and the driving unit when both the first switch SW1 and the second switch SW2 are operated concurrently instead of or in addition to the electrical bicycle seatpost assembly 16.

The control unit 14 generates the third signal CS3 when the control unit 14 receives both the first transmission control signal CS1 and the second transmission control signal CS2 concurrently. In this embodiment, the control unit 14 generates the third signal CS3 when the control unit 14 receives one of the first transmission control signal CS1 and the second transmission control signal CS2 within an operation time lag TL0 after receipt of the other of the first transmission control signal CS1 and the second transmission control signal CS2. Namely, the phrase "when the control unit 14 receives both the first transmission control signal CS1 and the second transmission control signal CS2 concurrently" can include a case where a time lag occurs between receipt of the first transmission control signal CS1 and receipt of the second transmission control signal CS2 in addition to a case where no time lag occurs between receipt of the first transmission control signal CS1 and receipt of the second transmission control signal CS2. For example, one second may be admitted as the time lag. In a case where the operation time lag TL0 is zero, the control unit 14 receives completely concurrently both the first transmission control signal CS1 and the second transmission control signal CS2. The control unit 14 stores the operation time lag TL0 in the memory 14B.

As seen in FIG. 6, the control unit 14 generates the third signal CS3 when the control unit 14 receives the second transmission control signal CS2 within the operation time lag TL0 after receipt of the first transmission control signal CS1.

As seen in FIG. 7, the control unit 14 generates the third signal CS3 when the control unit 14 receives the first transmission control signal CS1 within the operation time lag TL0 after receipt of the second transmission control signal CS2.

Figure 8:
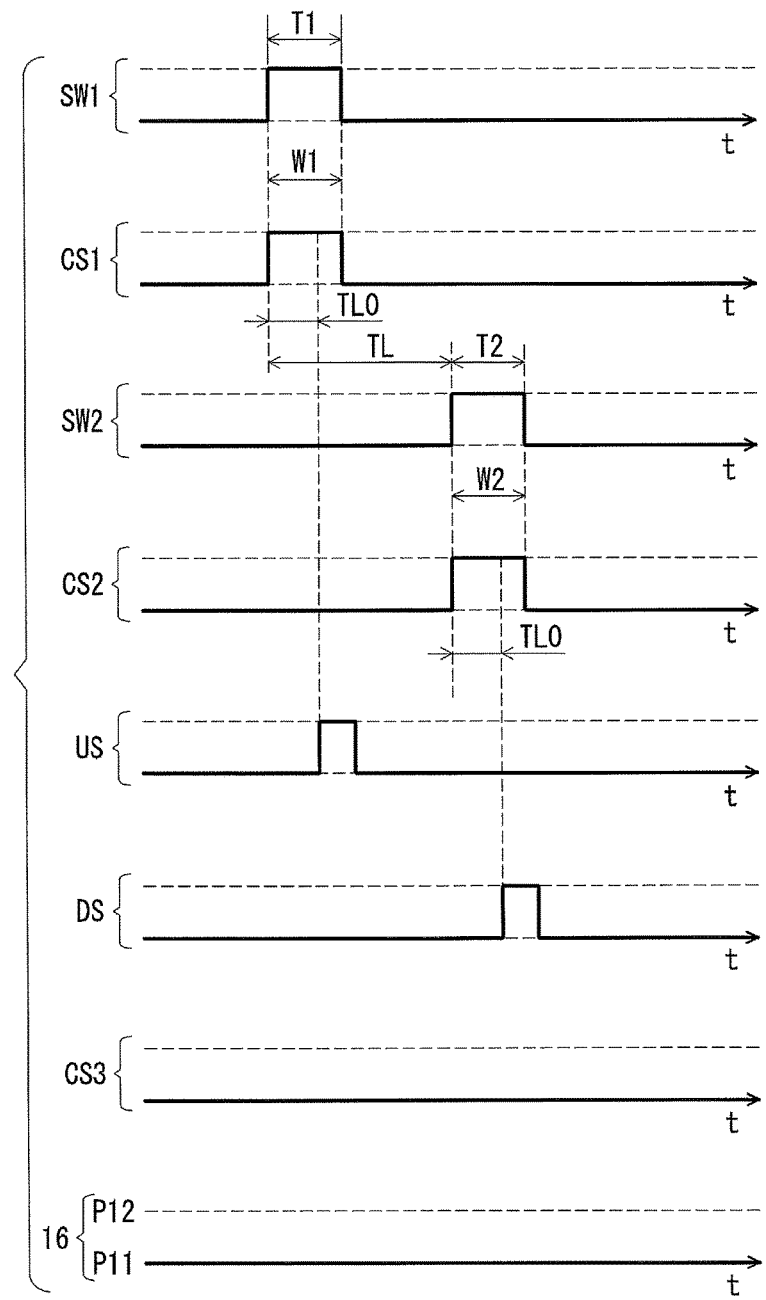

As seen in FIG. 8, the control unit 14 is configured to operate the electrical bicycle shifting device 52 to perform one of upshifting and downshifting in response to the first transmission control signal CS1 when the control unit 14 does not receive the second transmission control signal CS2 within the operation time lag TL0 after receipt of the first transmission control signal CS1.

In this embodiment, the control unit 14 generates an upshift command signal US to perform upshifting in the electrical rear derailleur 52 when the control unit 14 does not receive the second transmission control signal CS2 within the operation time lag TL0 after receipt of the first transmission control signal CS1. The electrical rear derailleur 52 upshifts in response to the upshift command signal US.

Figure 9:
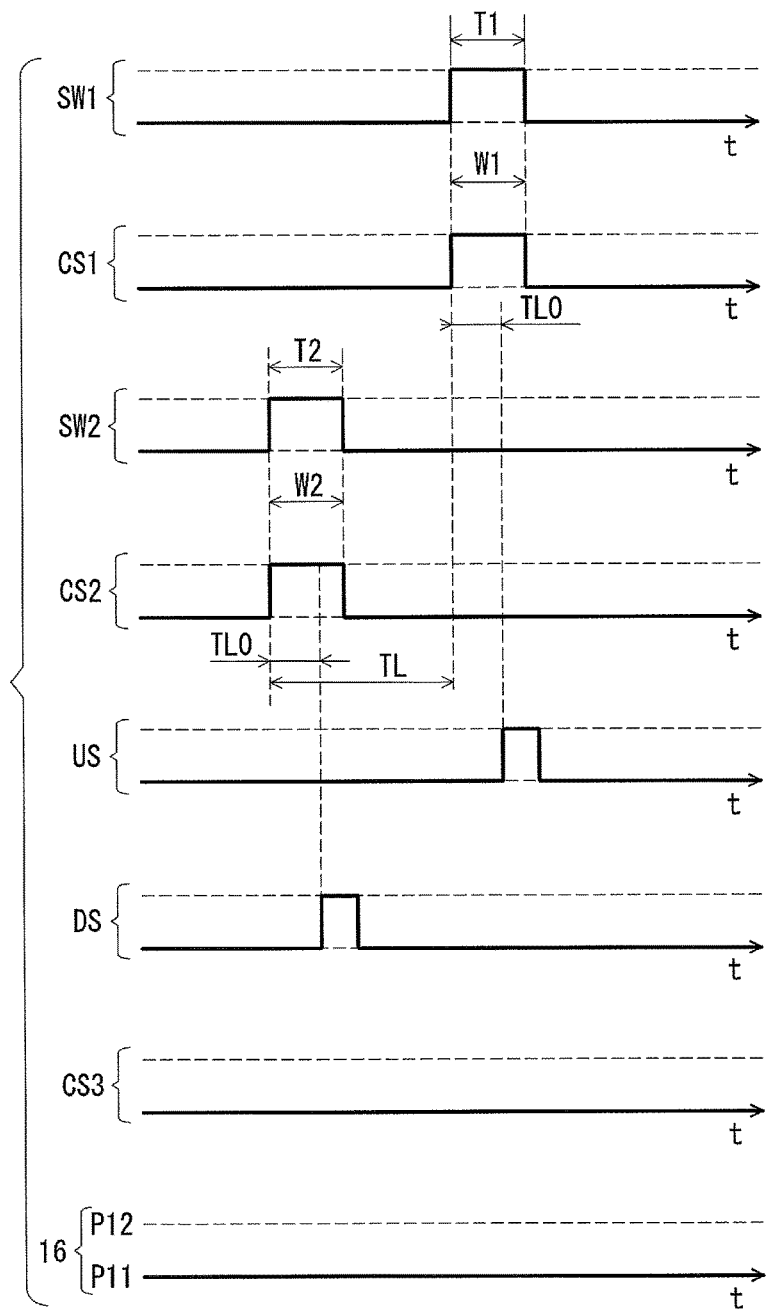

As seen in FIG. 9, the control unit 14 is configured to operate the electrical bicycle shifting device 52 to perform the other of upshifting and downshifting in response to the second transmission control signal CS2 when the control unit 14 does not receive the first transmission control signal CS1 within the operation time lag TL0 after receipt of the second transmission control signal CS2.

In this embodiment, the control unit 14 generates a downshift command signal DS to perform downshifting in the electrical rear derailleur 52 when the control unit 14 does not receive the first transmission control signal CS1 within the operation time lag TL0 after receipt of the second transmission control signal CS2. The electrical rear derailleur 52 downshifts in response to the downshift command signal DS. In a case where the control unit 14 is integrally provided with the motor unit 50 as a single unit, the upshift command signal US and the downshift command signal DS can be omitted. In such an embodiment, for example, the control unit 14 has a function of the motor unit 50.

As seen in FIGS. 6 and 7, the control unit 14 is configured to keep the shift position of the electrical bicycle shifting device 52 when the control unit 14 receives one of the first transmission control signal CS1 and the second transmission control signal CS2 within the operation time lag TL0 after receipt of the other of the first transmission control signal CS1 and the second transmission control signal CS2. Namely, the control unit 14 keeps the shift position of the electrical derailleur 18 when the control unit 14 receives both the upshift signal CS1 and the downshift signal CS2 concurrently. In this embodiment, the control unit 14 generates neither the upshift command signal US nor the downshift command signal DS when the control unit 14 receives both the upshift signal CS1 and the downshift signal CS2 concurrently.

As seen in FIG. 2, the control unit 14 is configured to measure a time lag elapsed from receipt of one of the first transmission control signal CS1 and the second transmission control signal CS2 to receipt of the other of the first transmission control signal CS1 and the second transmission control signal CS2. Namely, the control unit 14 includes a timer 60 configured to measure a time lag elapsed from receipt of one of the first transmission control signal CS1 and the second transmission control signal CS2 to receipt of the other of the first transmission control signal CS1 and the second transmission control signal CS2.

As seen in FIGS. 8 and 9, the first switch SW1 generates the first transmission control signal CS1 having a first width W1 corresponding to a time period T1 during which the first switch SW1 is operated. The second switch SW2 generates the second transmission control signal CS2 having a second width W2 corresponding to a time period T2 during which the second switch SW2 is operated. The upshift command signal US has a constant width regardless of the time period T1. The downshift command signal DS has a constant width regardless of the time period T2.

As seen in FIGS. 6 and 7, the control unit 14 generates the third signal CS3 having a third width W3 corresponding to a time period T3 during which both the first switch SW1 and the second switch SW2 are operated concurrently. In this embodiment, the control unit 14 generates the third signal CS3 having the third width W3 corresponding to the time period T3 during which the control unit 14 receives both the first transmission control signal CS1 and the second transmission control signal CS2. However, the third width W3 of the third signal CS3 can be constant regardless of the time period T3.

The operation of the electrical bicycle operating system 12 will be described in detail below referring to FIGS. 10 and 11.

Figure 10:
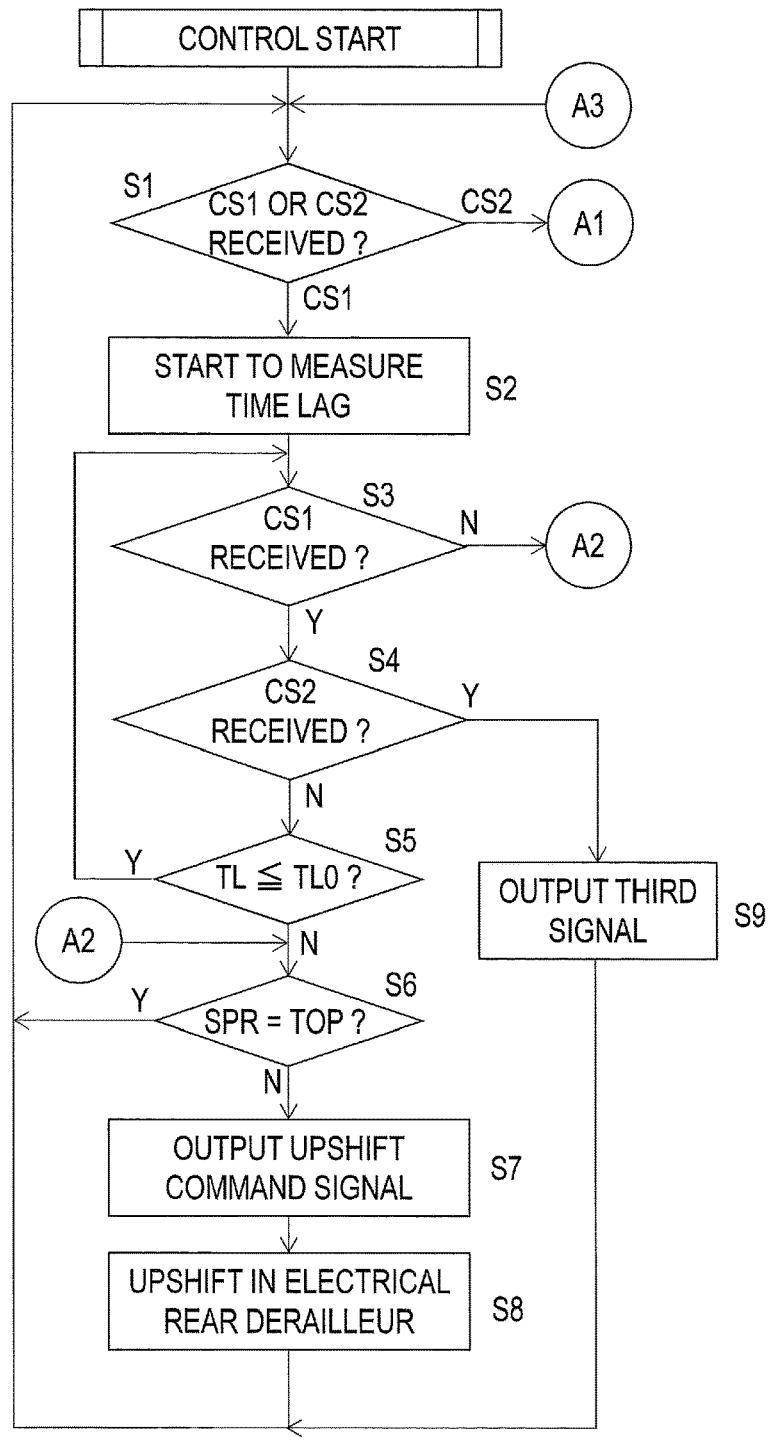
FIGS. 10 and 11 are flow charts of operation of the electrical bicycle operating system illustrated in FIG. 2.

As seen in FIG. 10, the control unit 14 determines whether one of the first transmission control signal CS1 and the second transmission control signal CS2 is received by the control unit 14 (step S1). When the control unit 14 concludes that the first transmission control signal CS1 is received, the control unit 14 (the timer 60) starts to measure the time lag TL occurring between receipt of the first transmission control signal CS1 and receipt of the second transmission control signal CS2 (steps S1 and S2).

Next, the control unit 14 determines whether each of the first transmission control signal CS1 and the second transmission control signal CS2 is received by the control unit 14 (steps S3 and S4). When the control unit 14 concludes that the first transmission control signal CS1 has not been received by the control unit 14, the control unit 14 determines whether the shift position of the electrical rear derailleur 52 is the top gear position (steps S3 and S6).

The process returns to the step S1 when the control unit 14 concludes that the shift position of the electrical rear derailleur 52 is the top gear position (step S6). The upshift command signal US is output from the control unit 14 to the electrical rear derailleur 52 when the control unit 14 concludes that the shift position is not the top gear position (steps S6 and S7). The electrical rear derailleur 52 upshifts in response to the upshift command signal US (step S8). The process returns to the step S1.

When the control unit 14 concludes that the first transmission control signal CS1 is received by the control unit 14, the control unit 14 determines whether the second transmission control signal CS2 is received by the control unit 14. When the control unit 14 concludes that the second transmission control signal CS2 is not received by the control unit 14, the control unit 14 compares the time lag TL with the operation time lag TL0 (steps S4 and S5). When the time lag TL is equal to or shorter than the operation time lag TL0, the steps S3 and S4 are repeatedly executed.

When the time lag TL is longer than the operation time lag TL0, the control unit 14 concludes that the second transmission control signal CS2 is not received by the control unit 14 within the operation time lag TL0 from the receipt of the first transmission control signal CS1. Thus, the steps S6 to S8 are executed to perform upshifting in the electrical rear derailleur 52 (steps S6 to S8).

When the control unit 14 concludes that the second transmission control signal CS2 is received by the control unit 14 within the operation time lag TL0 from the receipt of the first transmission control signal CS1, the third signal CS3 is output from the control unit 14 to the electrical bicycle seatpost assembly 16 (steps S4 and S9).

In this embodiment, as seen in FIG. 6, the third signal CS3 has the third width W3 corresponding to the time period T3 during which the control unit 14 receives both the first transmission control signal CS1 and the second transmission control signal CS2. The electrical actuation unit 39 of the electrical bicycle seatpost assembly 16 moves the flow control part 30 relative to the second tube 22 from the closed position P11 to the open position P12 in response to the third signal CS3. The electrical actuation unit 39 keeps the flow control part 30 at the open position P12 while the control unit 14 keeps receiving the control signal C3 from the control unit 14. Thus, the position of the saddle B3 can be changed via the electrical bicycle seatpost assembly 16 while receiving the control signal C3 from the control unit 14.

Figure 11:
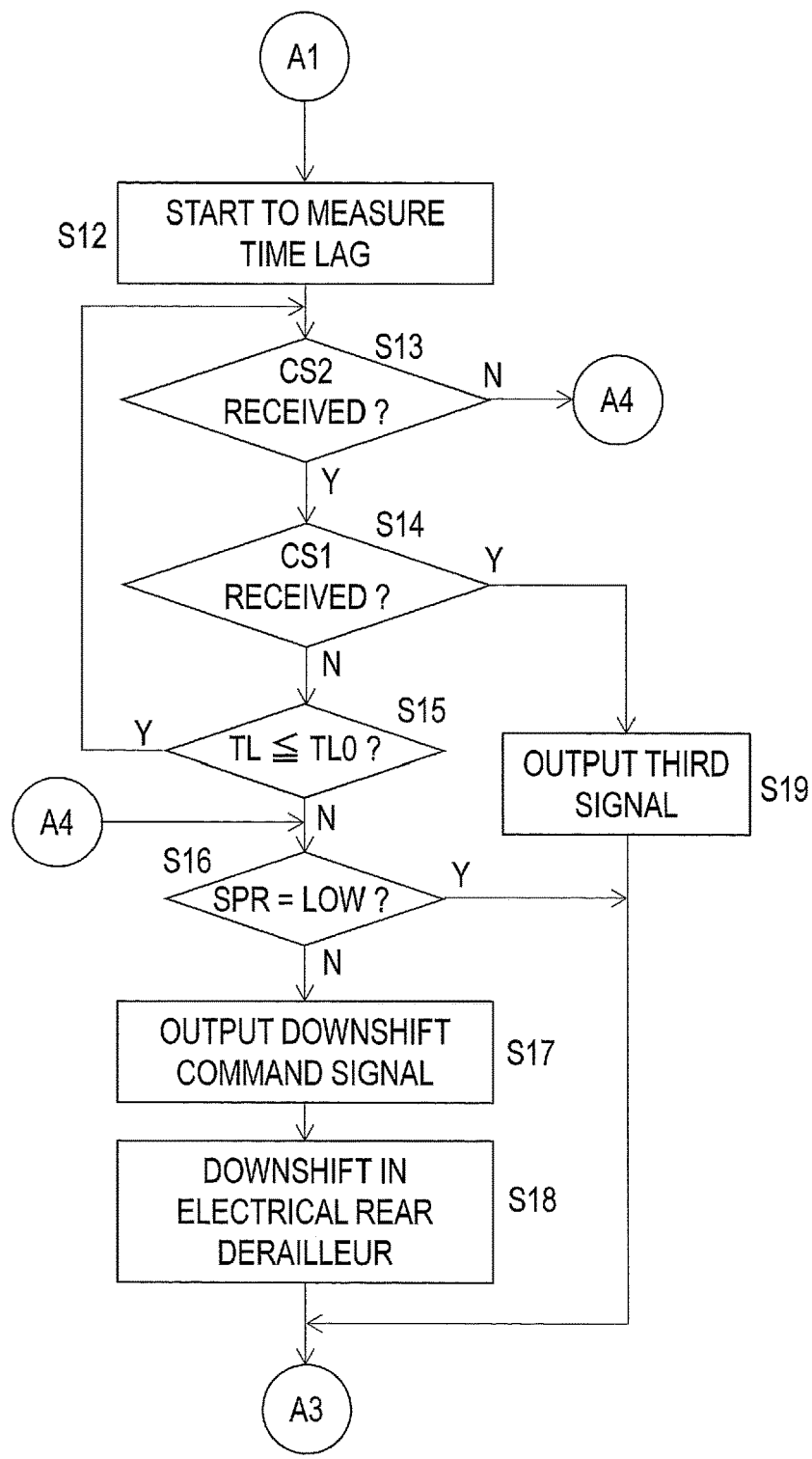

As seen in FIG. 11, when the control unit 14 concludes that the second transmission control signal CS2 is received, the control unit 14 (the timer 60) starts to measure the time lag TL occurring between receipt of the second transmission control signal CS2 and receipt of the first transmission control signal CS1 (steps S1 and S12).

Next, the control unit 14 determines whether each of the first transmission control signal CS1 and the second transmission control signal CS2 is received by the control unit 14 (steps S13 and S14). When the control unit 14 concludes that the second transmission control signal CS2 has not been received by the control unit 14, the control unit 14 determines whether the shift position of the electrical rear derailleur 52 is the low gear position (steps S13 and S16).

The process returns to the step S1 when the control unit 14 concludes that the shift position of the electrical rear derailleur 52 is the low gear position (step S16). The upshift command signal US is output from the control unit 14 to the electrical rear derailleur 52 when the control unit 14 concludes that the shift position is not the low gear position (steps S16 and S17). The electrical rear derailleur 52 downshifts in response to the upshift command signal US (step S18). The process returns to the step S1.

When the control unit 14 concludes that the second transmission control signal CS2 is received by the control unit 14, the control unit 14 determines whether the first transmission control signal CS1 is received by the control unit 14. When the control unit 14 concludes that the first transmission control signal CS1 is not received by the control unit 14, the control unit 14 compares the time lag TL with the operation time lag TL0 (steps S14 and S15). When the time lag TL is equal to or shorter than the operation time lag TL0, the steps S13 and S14 are repeatedly executed.

When the time lag TL is longer than the operation time lag TL0, the control unit 14 concludes that the first transmission control signal CS1 is not received by the control unit 14 within the operation time lag TL0 from the receipt of the second transmission control signal CS2. Thus, the steps S16 to S18 are executed to perform upshifting in the electrical rear derailleur 52 (steps S16 to S18).

When the control unit 14 concludes that the first transmission control signal CS1 is received by the control unit 14 within the operation time lag TL0 from the receipt of the second transmission control signal CS2, the third signal CS3 is output from the control unit 14 to the electrical bicycle seatpost assembly 16 (steps S14 and S19).

In this embodiment, as seen in FIG. 7, the third signal CS3 has the third width W3 corresponding to the time period T3 during which the control unit 14 receives both the first transmission control signal CS1 and the second transmission control signal CS2. The electrical actuation unit 39 of the electrical bicycle seatpost assembly 16 moves the flow control part 30 relative to the second tube 22 from the closed position P11 to the open position P12 in response to the third signal CS3. The electrical actuation unit 39 keeps the flow control part 30 at the open position P12 while the control unit 14 keeps receiving the control signal C3 from the control unit 14. Thus, the position of the saddle B3 can be changed via the electrical bicycle seatpost assembly 16 while receiving the control signal C3 from the control unit 14.

The electrical bicycle operating system 12 has the following features.

(1) The control unit 14 electrically operates at least one of the electrical bicycle seatpost assembly 16, an electrical suspension, and a driving unit configured to output an assist force when both the first switch SW1 and the second switch SW2 are operated concurrently. Accordingly, it is possible to operate, using the first switch SW1 and the second switch SW2, at least one of the electrical bicycle seatpost assembly 16, the electrical suspension, and the driving unit in addition to another electric component operated in response to the first transmission control signal CS1 and the second transmission control signal CS2. This can simplify the configuration of the electrical bicycle operating system 12.

(2) The control unit 14 generates the third signal CS3 to operate the at least one of the electrical bicycle seatpost assembly 16, the electrical suspension, and the driving unit when both the first switch SW1 and the second switch SW2 are operated concurrently. Accordingly, it is possible to operate the at least one of the electrical bicycle seatpost assembly 16, the electrical suspension, and the driving unit using the third signal CS3 different from the first transmission control signal CS1 and the second transmission control signal CS2. Thus, the at least one of the electrical bicycle seatpost assembly 16, the electrical suspension, and the driving unit can easily recognize the third signal CS3.

(3) The control unit 14 generates the third signal CS3 when the control unit 14 receives both the first transmission control signal CS1 and the second transmission control signal CS2 concurrently. Accordingly, it is possible to determine that both the first switch SW1 and the second switch SW2 are operated concurrently based on the first transmission control signal CS1 and the second transmission control signal CS2. In other words, the configuration of the first switch SW1 can be simplified since the first switch SW1 outputs the first transmission control signal CS1 in response to operation of the first switch SW1. Similarly, the configuration of the second switch SW2 can be simplified since the second switch SW2 outputs the second transmission control signal CS2 in response to operation of the second switch SW2.

(4) The control unit 14 generates the third signal CS3 to operate only the electrical bicycle seatpost assembly 16 when both the first switch SW1 and the second switch SW2 are operated concurrently. Accordingly, it is possible to simplify the third signal CS3.

(5) The control unit 14 generates the third signal CS3 having the third width W3 corresponding to the time period T3 during which both the first switch SW1 and the second switch SW2 are operated concurrently. Accordingly, it is possible to vary the third width W3 of the third signal CS3 in accordance with the time period T3 during which both the first switch SW1 and the second switch SW2 are operated concurrently. Thus, it is possible to utilize the variable third width W3 of the third signal CS3 to operate the at least one of the electrical bicycle seatpost assembly 16, the electrical suspension, and the driving unit, improving operability of the electrical bicycle operating system 12.

(6) The control unit 14 generates the third signal CS3 having the third width W3 corresponding to the time period T3 during which the control unit 14 receives both the first transmission control signal CS1 and the second transmission control signal CS2. Accordingly, it is possible to vary the first width W1 of the first transmission control signal CS1, the second width W2 of the second transmission control signal CS2, and the third width W3 of the third signal CS3. Thus, it is possible to utilize the variable first width W1 of the first transmission control signal CS1, the variable second width W2 of the second transmission control signal CS2, and the variable third width W3 of the third signal CS3, improving operability of the electrical bicycle operating system 12.

(7) The control unit 14 generates the third signal CS3 when the control unit 14 receives one of the first transmission control signal CS1 and the second transmission control signal CS2 within the operation time lag TL0 after receipt of the other of the first transmission control signal CS1 and the second transmission control signal CS2. Accordingly, it is possible to absorb a time lag occurring between receipt of the first transmission control signal CS1 and receipt of the second transmission control signal CS2.

(8) The control unit 14 is configured to operate the electrical bicycle shifting device 52 to perform one of upshifting and downshifting in response to the first transmission control signal CS1 when the control unit 14 does not receive the second transmission control signal CS2 within the operation time lag after receipt of the first transmission control signal CS1. The control unit 14 is configured to operate the electrical bicycle shifting device 52 to perform the other of upshifting and downshifting in response to the second transmission control signal CS2 when the control unit 14 does not receive the first transmission control signal CS1 within the operation time lag after receipt of the second transmission control signal CS2. The control unit 14 is configured to keep the shift position of the electrical bicycle shifting device 52 when the control unit 14 receives one of the first transmission control signal CS1 and the second transmission control signal CS2 within the operation time lag TL0 after receipt of the other of the first transmission control signal CS1 and the second transmission control signal CS2. Accordingly, it is possible to prevent the electrical bicycle shifting device 52 from operating in response to both receipt of the first transmission control signal CS1 and receipt of the second transmission control signal CS2.

(9) The control unit 14 is configured to operate the electrical bicycle shifting device 52 to upshift in response to the first transmission control signal CS1. The control unit 14 is configured to operate the electrical bicycle shifting device 52 to downshift in response to the second transmission control signal CS2. Accordingly, it is possible to control the electrical bicycle shifting device 52 to upshift and downshift using the first switch SW1 and the second switch SW2.

(10) The control unit 14 is configured to operate the electrical rear derailleur 52 of the electrical bicycle shifting device 52 in response to one of the first transmission control signal CS1 and the second transmission control signal CS2. Accordingly, it is possible to control the electrical rear derailleur 52 using the first switch SW1 and the second switch SW2.

(11) The control unit 14 is integrally provided with the electrical rear derailleur 52 as a single unit. Accordingly, it is possible to reduce an installation space for the control unit 14 compared with a case where the control unit 14 is separately provided from the electrical rear derailleur 52.

(12) The first switch SW1 is mounted to one of the right part B21 and the left part B22 of the handlebar B2. The second switch SW2 is mounted to the other of the right part B21 and the left part B22 of the handlebar B2. Accordingly, it is possible to improve operability of the first switch SW1 and the second switch SW2.

(13) The electrical derailleur 18 comprises the control unit 14 to generate the control signal CS3 to operate at least one of the electrical bicycle seatpost assembly 16, the electrical suspension, and the driving unit. Accordingly, it is possible to an installation space for the control unit 14 compared with a case where the control unit 14 is separately provided from the electrical derailleur 18.

(14) The control unit 14 transmits the control signal CS3 in response to receipt of the transmission control signal CS1 transmitted from the shift switch SW1. Accordingly, it is possible to operate the at least one of the electrical bicycle seatpost assembly 16, the electrical suspension, and the driving unit using the shift switch, improving operability of the electrical bicycle operating system 12.

(15) The control unit 14 keeps the shift position of the electrical derailleur 18 when the control unit 14 receives both the upshift signal CS1 and the downshift signal CS2 concurrently. Accordingly, it is possible to prevent unintentional operation of the electrical derailleur 18 caused by improper input of the upshift signal CS1 and the downshift signal CS2.

(16) The electrical derailleur 18 further comprises the base 46, the chain guide 48, and the motor unit 50. The motor unit 50 moves the chain guide 48 relative to the base 46. The control unit 14 is operatively connected to the motor unit 50. Accordingly, it is possible to operate the chain guide 48 and the motor unit 50 via the control unit 14.

(17) The control unit 14 is provided to one of the motor unit 50 and the base 46. Accordingly, it is possible to reduce an installation space for the control unit 14 compared with a case where the control unit 14 is provided to neither the motor unit 50 nor the base 46.

First Modification

Figure 12:
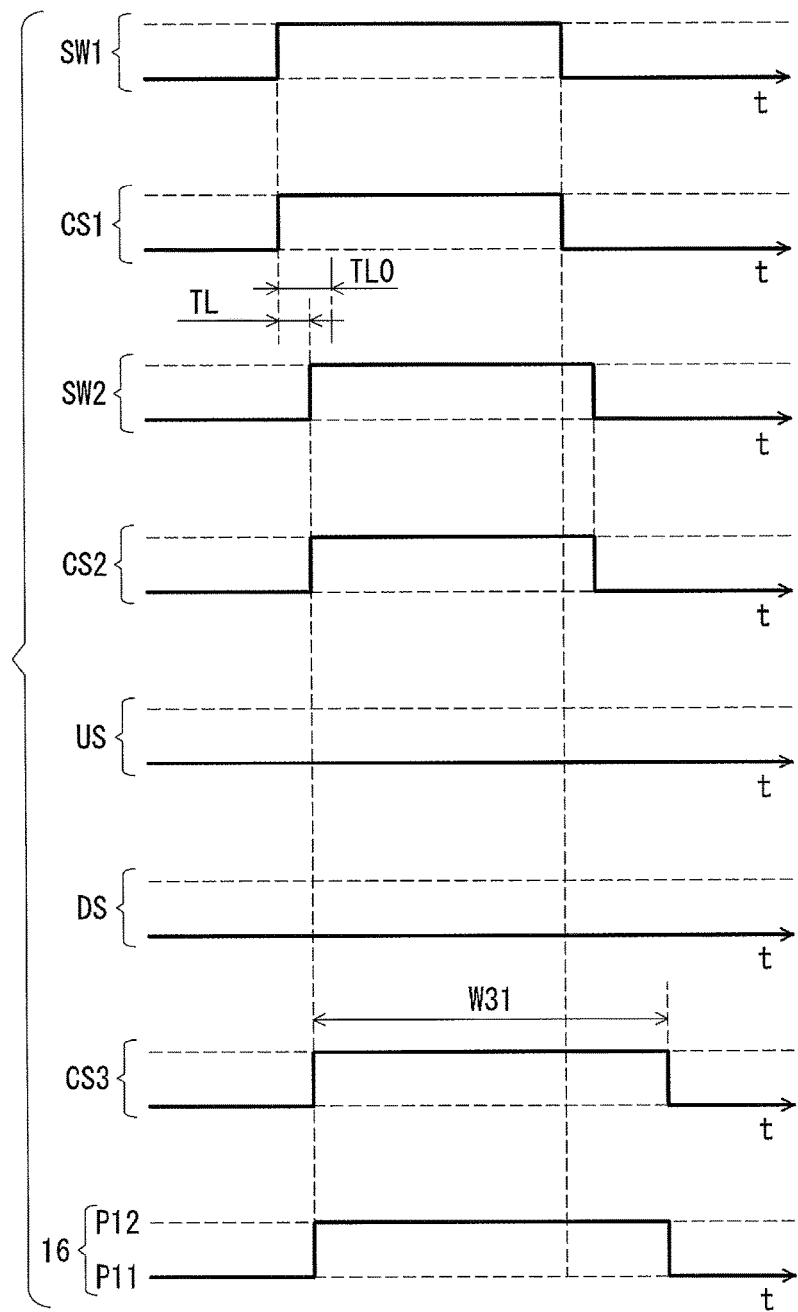
FIG. 12 is a timing chart of operation of the electrical bicycle operating system in accordance with a first modification of the first embodiment.

As seen in FIG. 12, the control unit 14 can be configured to continuously generate the third signal CS3 having a constant width W31 regardless of the width of each of the first transmission control signal CS1 and the second transmission control signal CS2 in response to both the first transmission control signal CS1 and the second transmission control signal CS2. The length of the electrical bicycle seatpost assembly 16 can be adjusted by the user during a time period corresponding to the constant width W31 of the third signal CS3.

With this modification, it is possible to utilize the constant width W31 of the third signal CS3 to operate the at least one of the electrical bicycle seatpost assembly 16, the electrical suspension, and the driving unit.

Second Modification

Figure 13:
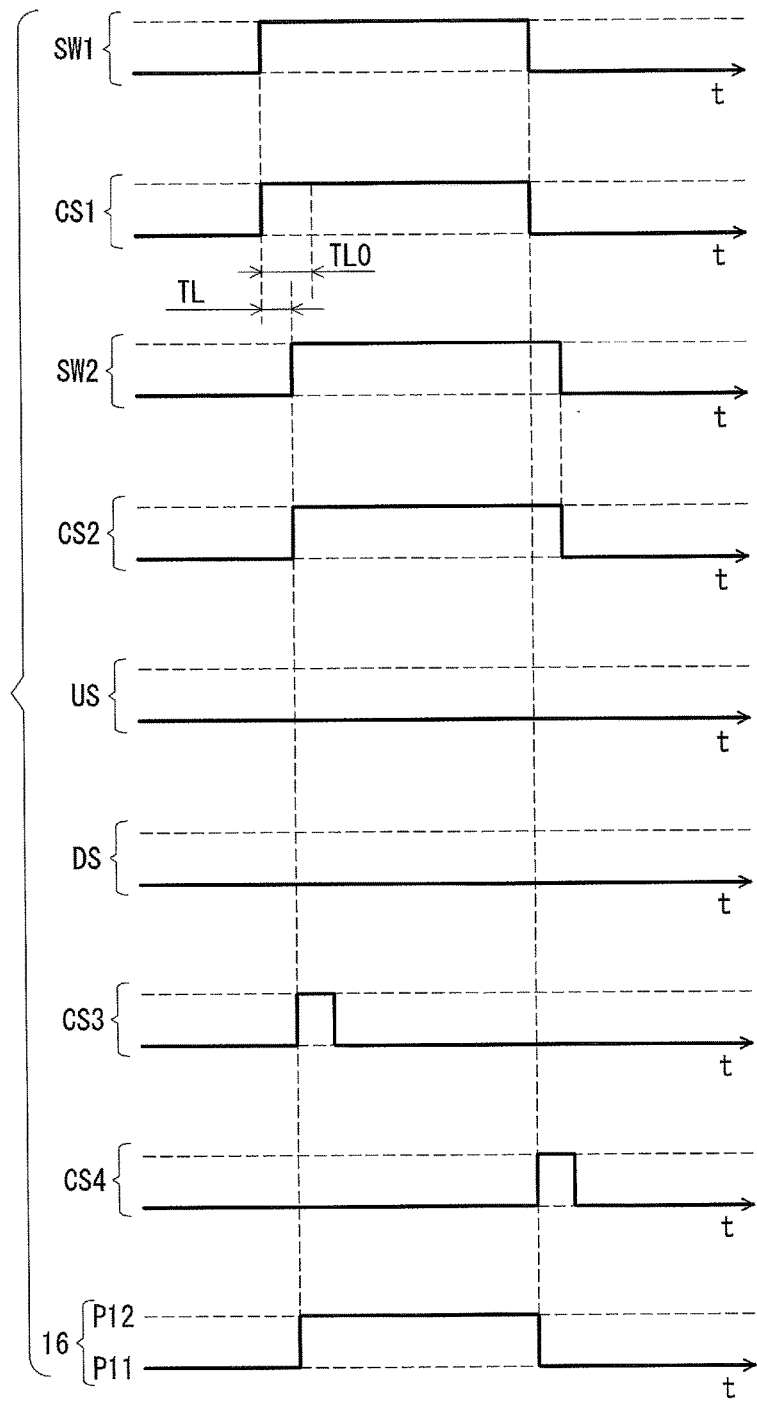
FIG. 13 is a timing chart of operation of the electrical bicycle operating system in accordance with a second modification of the first embodiment.

As seen in FIG. 13, the control unit 14 can be configured to generate the third signal CS3 to perform a first operation of the at least one of the electrical bicycle seatpost assembly 16, the electrical suspension, and the driving unit. The control unit 14 can be configured to generate a fourth signal CS4 to perform a second operation of the at least one of the electrical bicycle seatpost assembly 16, the electrical suspension, and the driving unit. The second operation is different from the first operation. Specifically, the control unit 14 can be configured to generate the third signal CS3 to perform the first operation of the electrical bicycle seatpost assembly 16. The control unit 14 can be configured to generate the fourth signal CS4 to perform the second operation of the electrical bicycle seatpost assembly 16.

In this modification, the control unit 14 generates the third signal CS3 to move the flow control part 30 from the closed position P11 to the open position P12 in the electrical bicycle seatpost assembly 16. The control unit 14 generates the fourth signal CS4 to move the flow control part 30 from the open position P12 to the closed position P11 in the electrical bicycle seatpost assembly 16. Namely, the first operation includes moving the flow control part 30 from the closed position P11 to the open position P12. The second operation includes moving the flow control part 30 from the open position P12 to the closed position P11. However, the first operation and the second operation can be other operations of the electrical bicycle seatpost assembly 16.

With this modification, it is possible to reduce power consumption of the electrical bicycle operating system 12 compared with a case where the third signal CS3 has a continuous width defining the first operation and the second operation of the at least one of the electrical bicycle seatpost assembly 16, the electrical suspension, and the driving unit.

Third Modification

Figure 14:
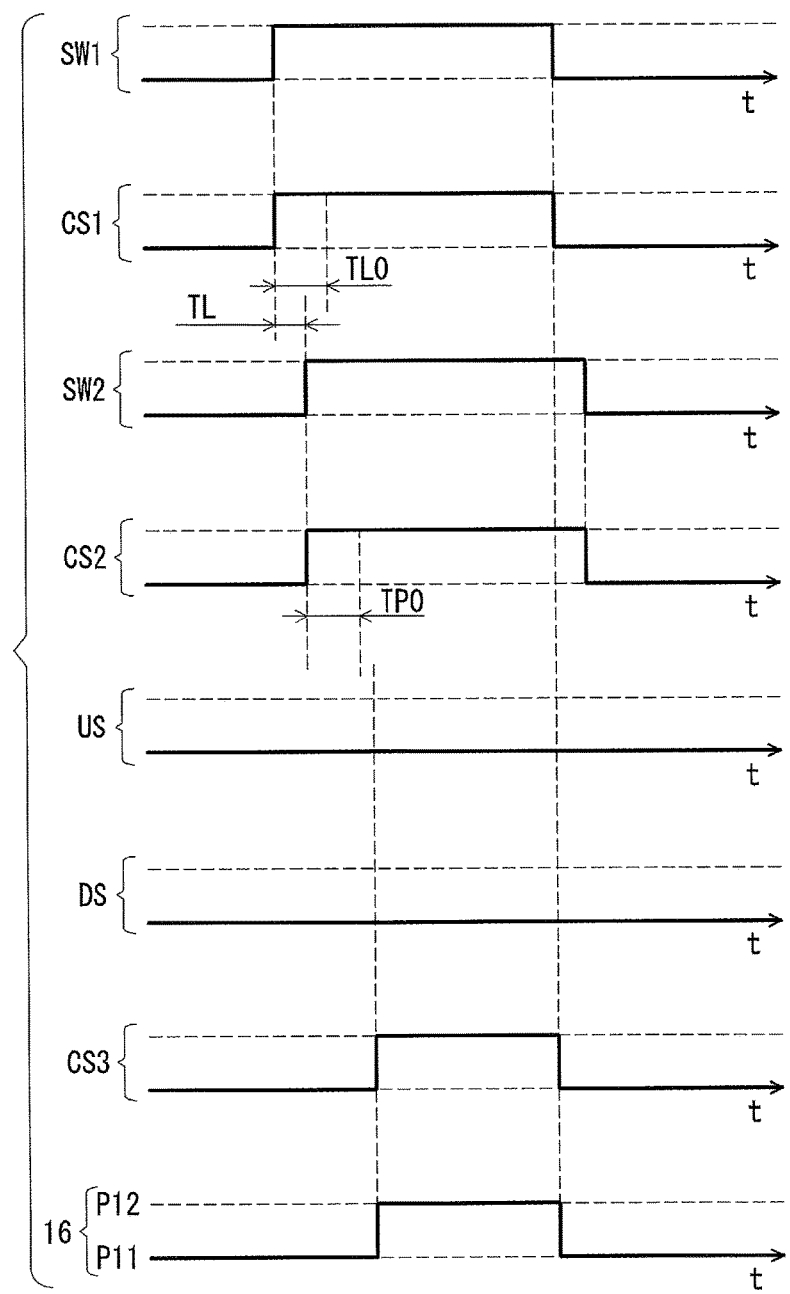
FIG. 14 is a timing chart of operation of the electrical bicycle operating system in accordance with a third modification of the first embodiment.

As seen in FIG. 14, the control unit 14 is configured to generate the third signal CS3 to operate the at least one of the electrical bicycle seatpost assembly 16, the electrical suspension, and the driving unit when the control unit 14 receives both the first transmission control signal CS1 and the second transmission control signal CS2 during more than an operation time period TP0. In this embodiment, the control unit 14 is configured to generate the third signal CS3 to operate the electrical bicycle seatpost assembly 16 when the control unit 14 receives both the first transmission control signal CS1 and the second transmission control signal CS2 during more than the operation time period TP0.

With this modification, it is possible to prevent unintentional operation of the at least one of the electrical bicycle seatpost assembly 16, the electrical suspension, and the driving unit due to improper operation of the first switch SW1 and the second switch SW2.

Fourth Modification

Figure 15:
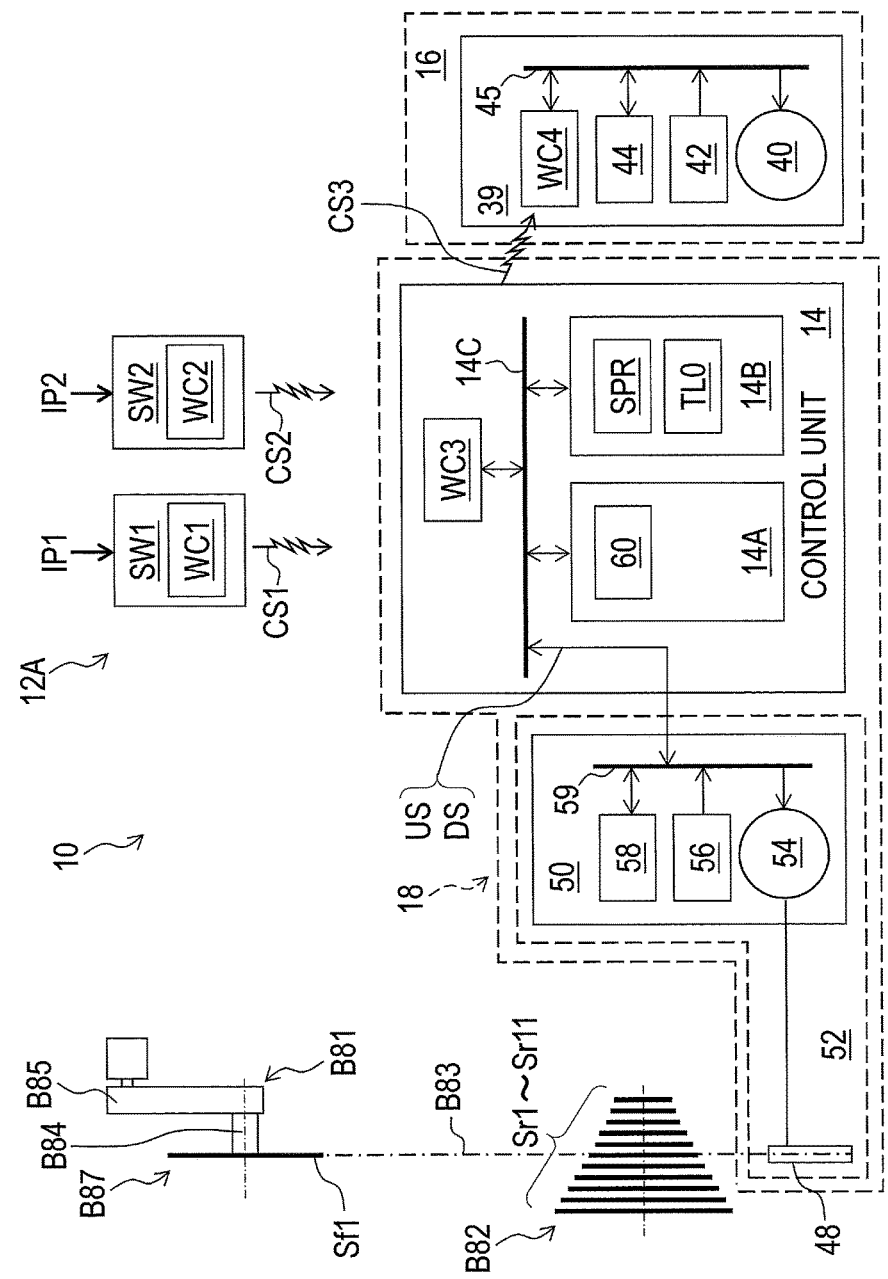
FIG. 15 is a block diagram of the bicycle including the electrical bicycle operating system in accordance with a fourth modification of the first embodiment.

As seen in FIG. 15, in an electrical bicycle operating system 12A according to the fourth modification of the first embodiment, the control unit 14 can wirelessly transmit the control signal CS3. Specifically, the electrical bicycle operating system 12A includes a first wireless communication device WC1 and a second wireless communication device WC2 instead of the first and second PLC controllers PC1 and PC21. The control unit 14 includes a third wireless communication device WC3 instead of the third PLC controller PC3. The electrical bicycle seatpost assembly 16 includes a fourth wireless communication device WC4 instead of the fourth PLC controller PC4. The electric communication path CP is omitted from the electrical bicycle operating system 12A. Instead of the battery B92, batteries (not shown) are respectively provided in the first brake operating unit BU1, the second brake operating unit BU2, the electrical bicycle seatpost assembly 16, and the electrical derailleur 18.

The first wireless communication device WC1 and the third wireless communication device WC3 establish wireless communication therebetween by pairing. The second wireless communication device WC2 and the third wireless communication device WC3 establish wireless communication therebetween by pairing. The third wireless communication device WC3 and the fourth wireless communication device WC4 establish wireless communication therebetween by pairing.

Each of the first to fourth wireless communication devices WC1 to WC4 includes a wireless transmitter and/or a wireless receiver. The first wireless communication device WC1 is configured to wirelessly transmit the first transmission control signal CS1 to the third wireless communication device WC3 of the control unit 14. The second wireless communication device WC1 is configured to wirelessly transmit the second transmission control signal CS2 to the third wireless communication device WC3 of the control unit 14. The third wireless communication device WC3 is configured to wirelessly receive the first transmission control signal CS1 and the second transmission control signal CS2 from the first wireless communication device WC1 and the second wireless communication device WC2.

The third wireless communication device WC3 of the electrical bicycle seatpost assembly 16 is configured to wirelessly transmit the third signal CS3 to the fourth wireless communication device WC4 of the electrical bicycle seatpost assembly 16. In this embodiment, the fourth wireless communication device WC4 of the electrical bicycle seatpost assembly 16 is wirelessly coupled to the third wireless communication device WC3 of the control unit 14. However, instead of and/or in addition to the fourth wireless communication device WC4 of the electrical bicycle seatpost assembly 16, electrical suspension 70 and/or driving unit 80 can be wirelessly coupled to the control unit 14.

With this modification, the control unit 14 wirelessly transmits the control signal CS3. Accordingly, it is possible to omit a cable to transmit the control signal CS3, saving weight of the bicycle 10.

Fifth Modification

Figure 16:
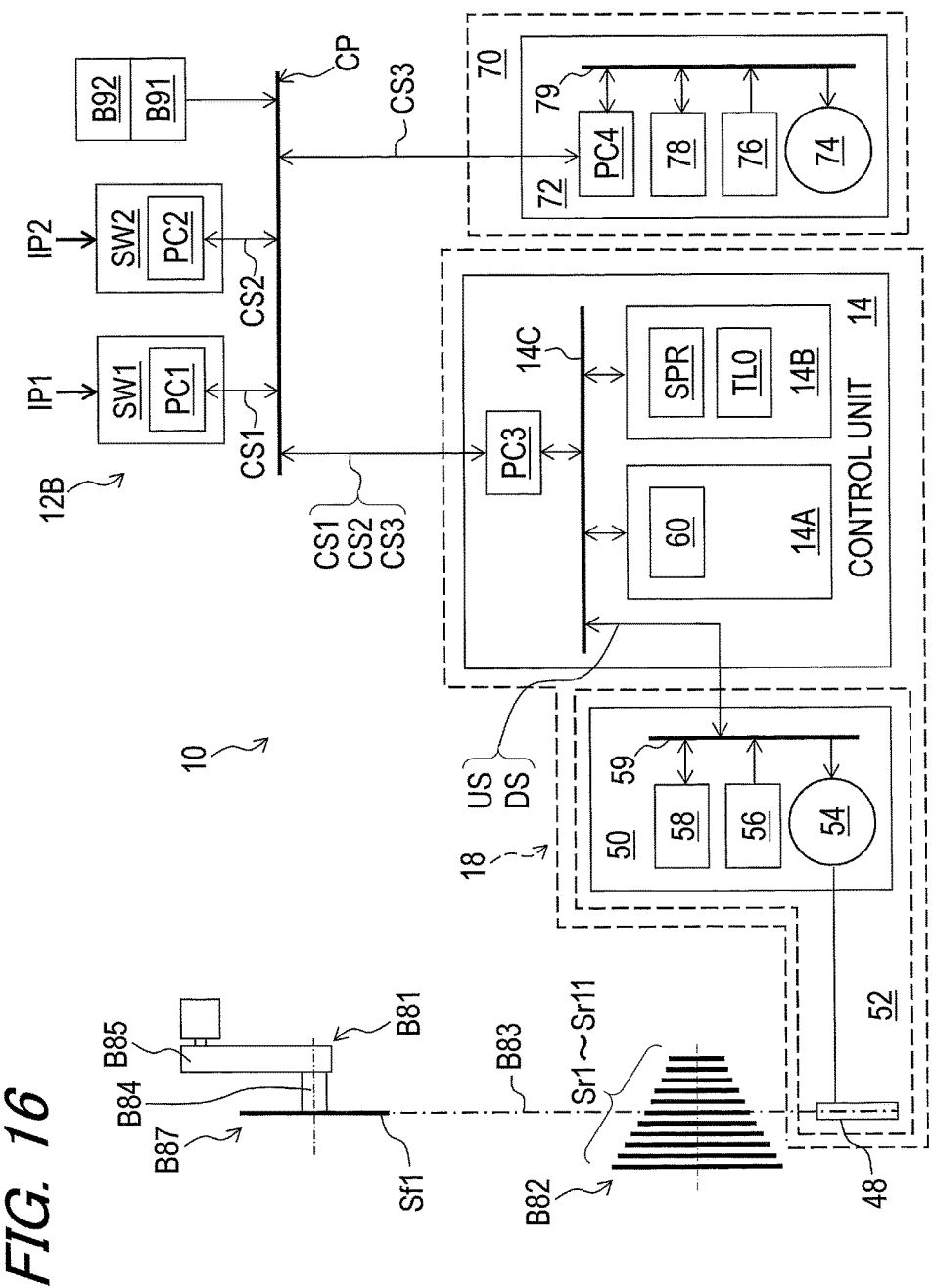
FIG. 16 is a block diagram of the bicycle including the electrical bicycle operating system in accordance with a fifth modification of the first embodiment.

As seen in FIG. 16, in an electrical bicycle operating system 12B according to the fifth modification of the first embodiment, the control unit 14 electrically operates an electrical suspension 70 instead of the electrical bicycle seatpost assembly 16 when both the first switch SW1 and the second switch SW2 are operated concurrently. The control unit 14 generates the third signal CS3 to operate the electrical suspension 70 when both the first switch SW1 and the second switch SW2 are operated concurrently.

In this modification of the first embodiment, the bicycle 10 is a mountain bike, for example. The electrical suspension 70 includes an electrical actuation unit 72. The electrical actuation unit 72 is operatively connected to the control unit 14 via the electric communication path CP. The electrical actuation unit 72 includes a valve actuator 74, a valve position sensor 76, and an actuator driver 78. The valve actuator 74, the valve position sensor 76, the actuator driver 78, and the fourth PLC controller PC4 are connected with each other via a bus 79. The valve actuator 74, the valve position sensor 76, and the actuator driver 78 have substantially the same structures and/or configurations as those of the valve actuator 40, the valve position sensor 42, and the actuator driver 44 of the electrical bicycle seatpost assembly 16. Thus, they will not be described and/or illustrated in detail here for the sake of brevity. For example, the electrical actuation unit 72 changes a stroke of the electrical suspension 70 and/or change a state of the electrical suspension 70 between rock-out state and free state, high damping state and low damping state. Since the electrical suspension 70 includes structures which have been known in the bicycle field, they will not be described and/or illustrated in detail here for the sake of brevity.

Sixth Modification

Figure 17:
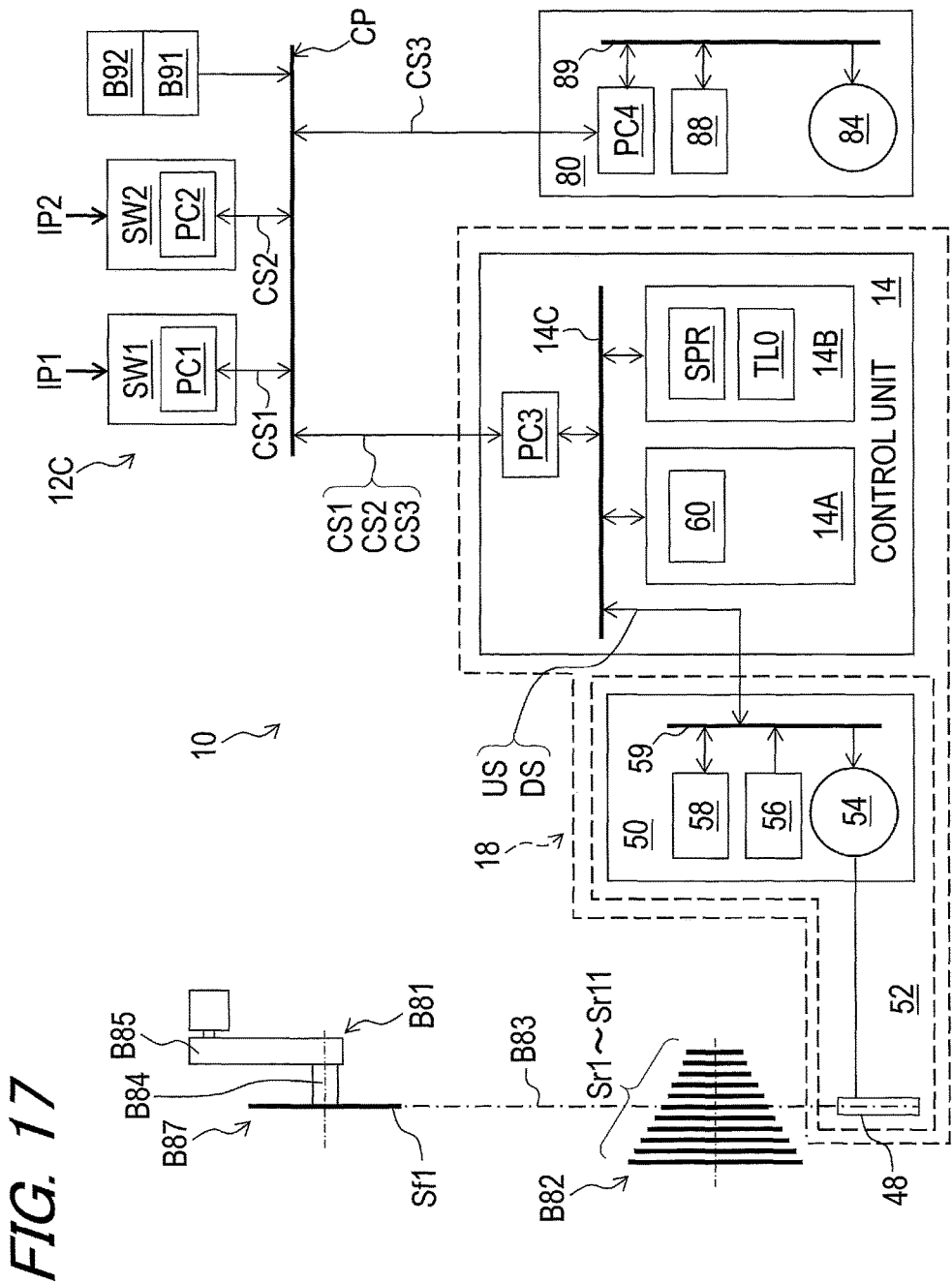
FIG. 17 is a block diagram of the bicycle including the electrical bicycle operating system in accordance with a sixth modification of the first embodiment.

As seen in FIG. 17, in an electrical bicycle operating system 12C according to the sixth modification of the first embodiment, the control unit 14 electrically operates a driving unit 80 configured to output an assist force instead of the electrical bicycle seatpost assembly 16 when both the first switch SW1 and the second switch SW2 are operated concurrently. The control unit 14 generates the third signal CS3 to operate the driving unit 80 when both the first switch SW1 and the second switch SW2 are operated concurrently. The driving unit 80 applies the assist force to the bicycle crank B81.

In this modification of the first embodiment, the bicycle 10 is a power-assisted mountain bike, for example. The driving unit 80 is operatively connected to the control unit 14 via the electric communication path CP. The driving unit 80 includes an assist motor 84 and a motor driver 88. The assist motor 84, the motor driver 88, and the fourth PLC controller PC4 are connected with each other via a bus 89. The assist motor 84 generates the assist force. The motor driver 88 controls the assist force output from the assist motor 84 in accordance with a pedaling torque applied to the bicycle crank B81 during pedaling. The driving unit 80 has a plurality of assist modes. The plurality of assist modes have different assist ratios. For example, the motor driver 88 changes a mode of the driving unit 80 in response to the third signal CS3. Since the driving unit 80 includes structures which have been known in the bicycle field, they will not be described and/or illustrated in detail here for the sake of brevity.

In the first embodiment, the control unit 14 electrically operates one of the electrical bicycle seatpost assembly 16, the electrical suspension 70, and the driving unit 80 when both the first switch SW1 and the second switch SW2 are operated concurrently. However, the control unit 14 can electrically operate at least two of the electrical bicycle seatpost assembly 16, the electrical suspension 70, and the driving unit 80 when both the first switch SW1 and the second switch SW2 are operated concurrently. Furthermore, the control unit 14 can be configured to electrically operate at least one of other electric components such as a lamp and a cycle computer when both the first switch SW1 and the second switch SW2 are operated concurrently. Each of the first to sixth modifications of the first embodiment can be applied to each of the second to twelfth embodiments which are described in detail later.

Second Embodiment

An electrical bicycle operating system 212 in accordance with a second embodiment will be described below referring to FIGS. 18 and 19. The electrical bicycle operating system 212 has the same structures and/or configurations as those of the electrical bicycle operating system 12 except for the arrangement of the control unit. Thus, elements having substantially the same function as those in the first embodiment will be numbered the same here, and will not be described and/or illustrated again in detail here for the sake of brevity.

Figure 18:
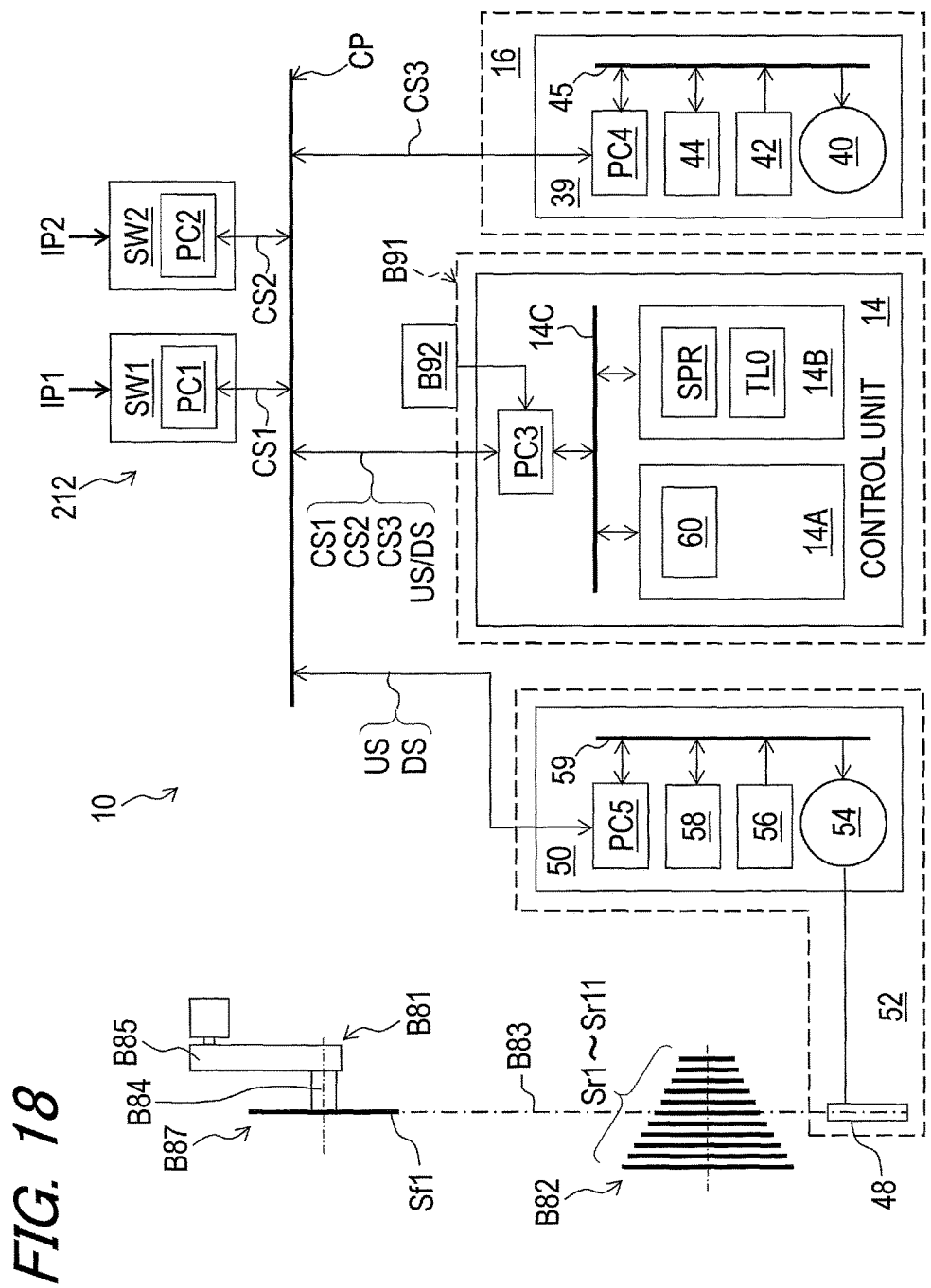
FIG. 18 is a block diagram of a bicycle including an electrical bicycle operating system in accordance with a second embodiment.
Figure 19:
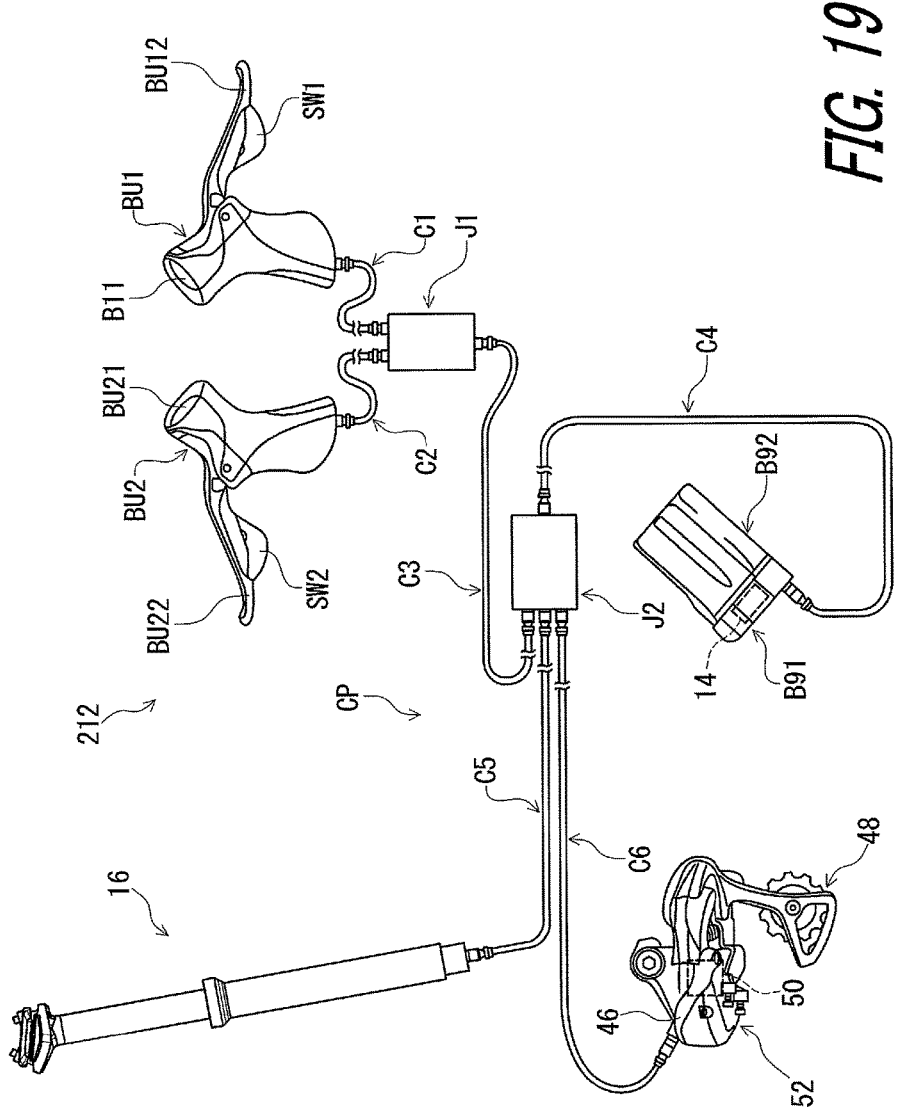
FIG. 19 is a schematic diagram showing one exemplary configuration of an electric communication path of the bicycle illustrated in FIG. 18.

As seen in FIGS. 18 and 19, the electrical bicycle operating system 212 comprises the first switch SW1, the second switch SW2, the control unit 14. The control unit 14 electrically operates at least one of the electrical bicycle seatpost assembly 16, the electrical suspension 70, and the driving unit 80 when both the first switch SW1 and the second switch SW2 are operated concurrently. Unlike the electrical bicycle operating system 12 of the first embodiment, the control unit 14 is separately provided from the electrical rear derailleur 52. In this embodiment, the control unit 14 is provided in the battery holder B91.

The motor unit 50 of the electrical rear derailleur 52 includes a fifth PLC controller PC5 having the same function as that of each of the first to fourth PLC controllers PC1 to PC4. The third PLC controller PC3 transmits the upshift command signal US and the downshift command signal DS to the fifth PLC controller PC5 via the electric communication path CP using the PLC. The fifth PLC controller PC5 transmits the shift position sensed by the shift position sensor 56 to the third PLC controller PC3 via the electric communication path CP using the PLC.

With the electrical bicycle operating system 212, it is possible to obtain substantially the same effects as those of the electrical bicycle operating system 12 of the first embodiment. The above first to sixth modifications of the first embodiment can be applied to the electrical bicycle operating system 212 of the second embodiment.

In the electrical bicycle operating system 212, wireless communication can be applied to at least part of the control unit 14, the first switch SW1, the second switch SW2, the rear derailleur 52, the electrical bicycle seatpost assembly 16, the electrical suspension 70, and the driving unit 80 instead of the PLC.

Third Embodiment

An electrical bicycle operating system 312 in accordance with a third embodiment will be described below referring to FIGS. 20 to 23. The electrical bicycle operating system 312 has the same structures and/or configurations as those of the electrical bicycle operating system 12 except for the arrangement of the control unit. Thus, elements having substantially the same function as those in the above embodiments will be numbered the same here, and will not be described and/or illustrated again in detail here for the sake of brevity.

Figure 20:
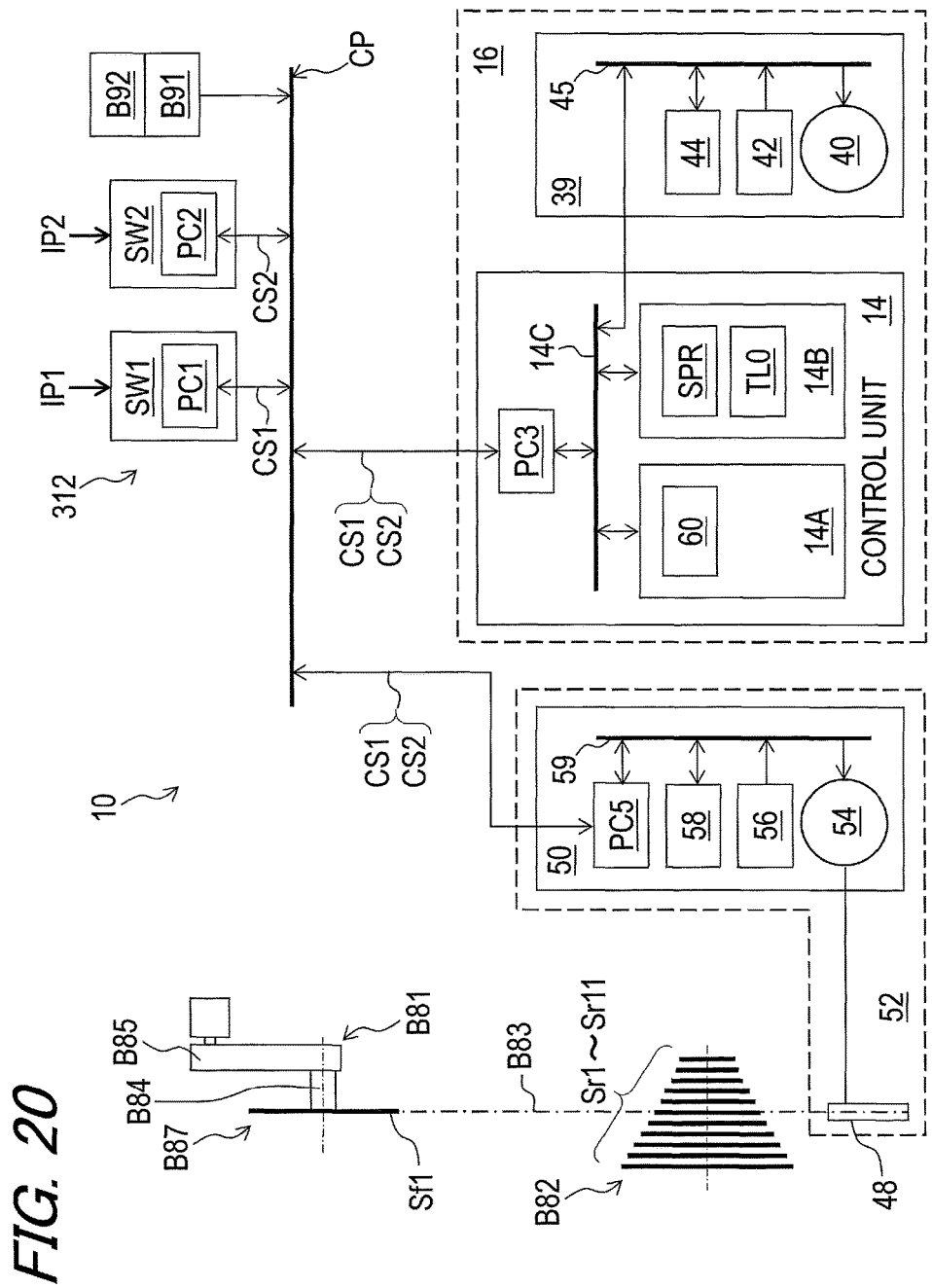
FIG. 20 is a block diagram of a bicycle including an electrical bicycle operating system in accordance with a third embodiment.
Figure 21:
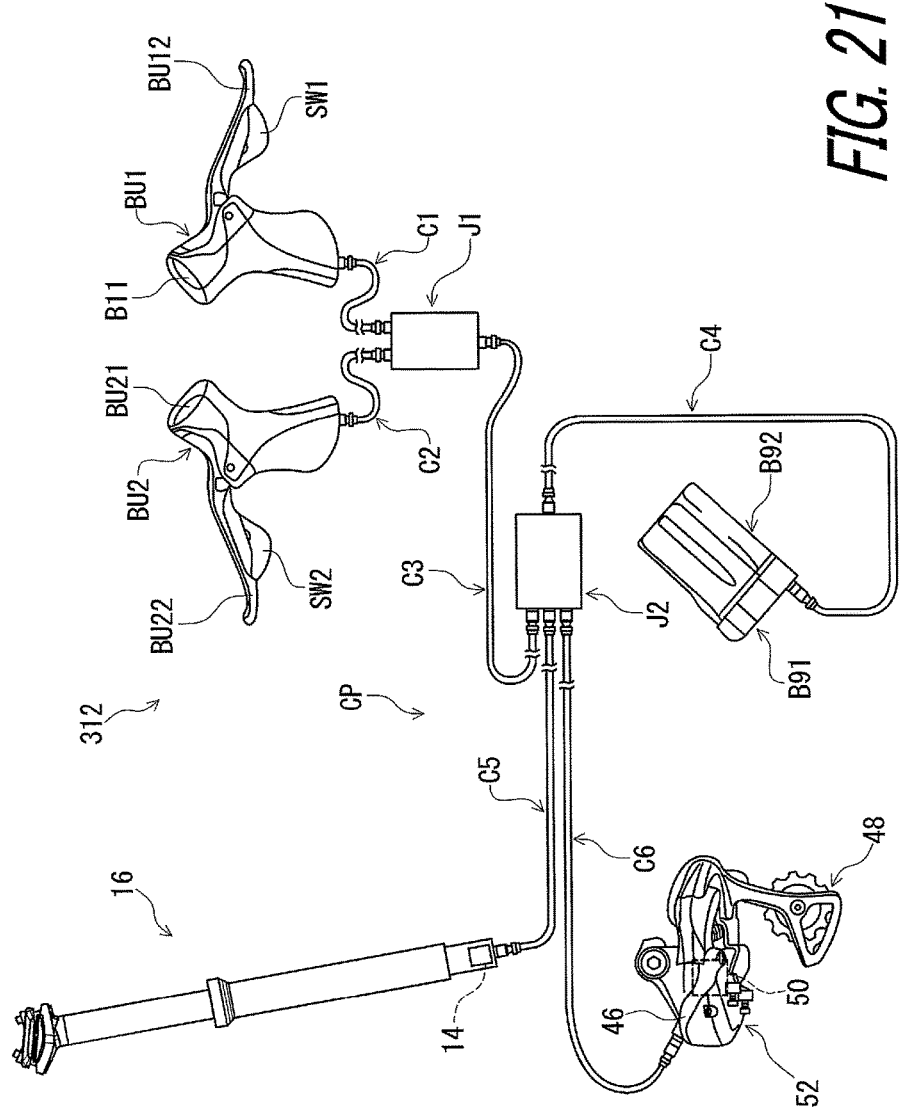
FIG. 21 is a schematic diagram showing one exemplary configuration of an electric communication path of the bicycle illustrated in FIG. 20.

As seen in FIGS. 20 and 21, the electrical bicycle operating system 312 comprises the first switch SW1, the second switch SW2, the control unit 14. The control unit 14 electrically operates at least one of the electrical bicycle seatpost assembly 16, the electrical suspension 70, and the driving unit 80 when both the first switch SW1 and the second switch SW2 are operated concurrently. Unlike the electrical bicycle operating system 12 of the first embodiment, the control unit 14 is separately provided from the electrical rear derailleur 52. In this embodiment, the control unit 14 is provided in the electrical bicycle seatpost assembly 16.

The motor unit 50 of the electrical rear derailleur 52 includes the fifth PLC controller PC5 as well as the second embodiment. Unlike the first and second embodiments, however, the fourth PLC controller PC4 is omitted from the electrical bicycle seatpost assembly 16 in this embodiment. The control unit 14 is electrically connected to the electrical actuation unit 39 without the electric communication path CP. In this embodiment, the bus 14C of the control unit 14 is connected to the bus 45 of the electrical actuation unit 39.

The third PLC controller PC3 receives the first transmission control signal CS1 and the second transmission control signal CS2 from the first PLC controller PC1 and the second PLC controller PC2 via the electric communication path CP using the PLC. Similarly, the fifth PLC controller PC5 receives the first transmission control signal CS1 and the second transmission control signal CS2 from the first PLC controller PC1 and the second PLC controller PC2 via the electric communication path CP using the PLC.

In the illustrated embodiment, the third signal CS3 is omitted from the electrical bicycle operating system 312. However, the control unit 14 can be configured to generate the third signal CS3 to operate the electrical bicycle seatpost assembly 16 when the control unit 14 receives the first transmission control signal CS1 and the second transmission control signal CS2 concurrently.

The control unit 14 electrically operates at least one of the electrical bicycle seatpost assembly 16, the electrical suspension 70, and the driving unit 80 to output the assist force when both the first switch SW1 and the second switch SW2 are operated concurrently. In this embodiment, the control unit 14 electrically operates the electrical bicycle seatpost assembly 16 when both the first switch SW1 and the second switch SW2 are operated concurrently.

Figure 22:
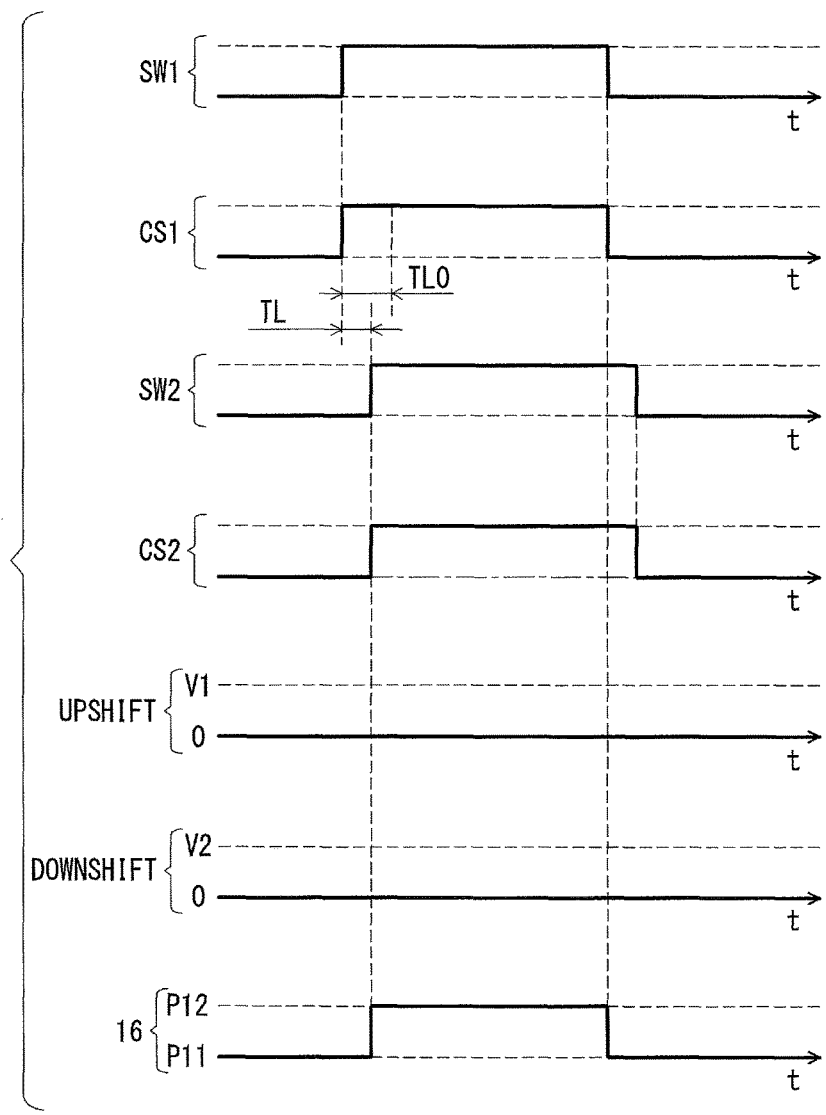
FIGS. 22 and 23 are timing charts of the electrical bicycle operating system illustrated in FIG. 20.

As seen in FIG. 22, the control unit 14 is configured to control the electrical actuation unit 39 when the control unit 14 concurrently receives both the first transmission control signal CS1 to perform upshifting of the electrical bicycle shifting device 52 and the second transmission control signal CS2 to perform downshifting of the electrical bicycle shifting device 52. In this embodiment, the control unit 14 controls the electrical actuation unit 39 to move the flow control part 30 from the closed position P11 to the open position P12 when the control unit 14 receives both the first transmission control signal CS1 and the second transmission control signal CS2 concurrently. Specifically, the control unit 14 controls the electrical actuation unit 39 to move the flow control part 30 from the closed position P11 to the open position P12 when the control unit 14 receives one of the first transmission control signal CS1 and the second transmission control signal CS2 within the operation time lag TL0 after receipt of the other of the first transmission control signal CS1 and the second transmission control signal CS2.

The motor unit 50 keeps the shift position of the electrical rear derailleur 52 when the motor unit 50 receives both the first transmission control signal CS1 and the second transmission control signal CS2 concurrently. Specifically, the motor unit 50 keeps the shift position of the electrical rear derailleur 52 when the control unit 14 receives one of the first transmission control signal CS1 and the second transmission control signal CS2 within the operation time lag TL0 after receipt of the other of the first transmission control signal CS1 and the second transmission control signal CS2.

Figure 23:
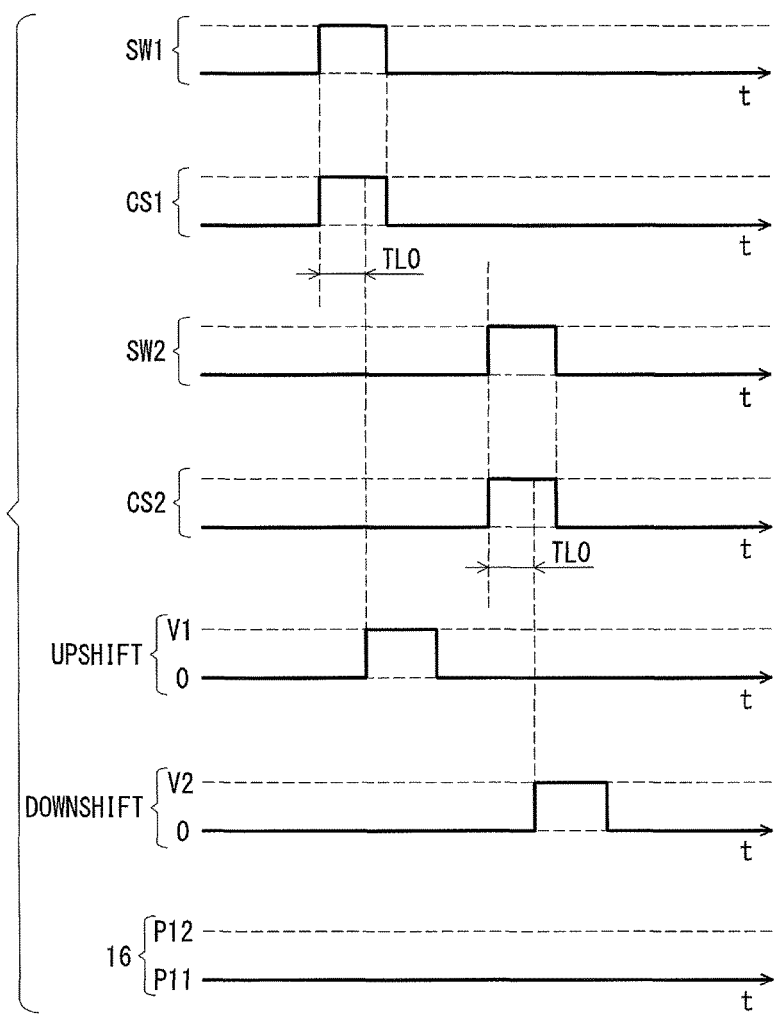

As seen in FIG. 23, the control unit 14 controls the electrical actuation unit 39 to keep the flow control part 30 at the closed position P11 when the control unit 14 does not concurrently receive both the first transmission control signal CS1 and the second transmission control signal CS2. Specifically, the control unit 14 controls the electrical actuation unit 39 to keep the flow control part 30 at the closed position P11 when the control unit 14 does not receive one of the first transmission control signal CS1 and the second transmission control signal CS2 within the operation time lag TL0 after receipt of the other of the first transmission control signal CS1 and the second transmission control signal CS2.

The motor unit 50 performs upshifting of the electrical rear derailleur 52 when the motor unit 50 receives only the first transmission control signal CS1 without concurrently receiving both the first transmission control signal CS1 and the second transmission control signal CS2. The motor unit 50 performs downshifting of the electrical rear derailleur 52 when the motor unit 50 receives only the second transmission control signal CS2 without concurrently receiving both the first transmission control signal CS1 and the second transmission control signal CS2.

Specifically, the motor unit 50 performs upshifting of the electrical rear derailleur 52 when the control unit 14 receives only the first transmission control signal CS1 within the operation time lag TL0. The motor unit 50 performs downshifting of the electrical rear derailleur 52 when the control unit 14 receives only the second transmission control signal CS2 within the operation time lag TL0. The motor unit 50 moves the chain guide 48 relative to the base 46 at a driving speed V1 during upshifting. The motor unit 50 moves the chain guide 48 relative to the base 46 at a driving speed V2 during downshifting. While the driving speed V1 is equal to the driving speed V2 in this embodiment, the driving speed V1 can be different from the driving speed V2.

With the electrical bicycle operating system 312, it is possible to obtain substantially the same effects as those of the electrical bicycle operating systems 12 and 212. The above first to sixth modifications of the first embodiment can be applied to the electrical bicycle operating system 312 of the third embodiment.

Furthermore, the control unit 14 controls the electrical actuation unit 39 when the control unit 14 concurrently receives both the first transmission control signal CS1 to perform upshifting of the electrical bicycle shifting device 52 and the second transmission control signal CS2 to perform downshifting of the electrical bicycle shifting device 52. Accordingly, it is possible to electrically operate the electrical bicycle seatpost assembly 16 using the first transmission control signal CS1 and the second transmission control signal CS2.

In the electrical bicycle operating system 312, wireless communication can be applied to at least part of the control unit 14, the first switch SW1, the second switch SW2, the rear derailleur 52, the electrical bicycle seatpost assembly 16, the electrical suspension 70, and the driving unit 80 instead of the PLC.

Fourth Embodiment

An electrical bicycle operating system 412 in accordance with a fourth embodiment will be described below referring to FIGS. 24 to 32. The electrical bicycle operating system 412 has the same structures and/or configurations as those of the electrical bicycle operating system 12 except for the arrangement of the control unit. Thus, elements having substantially the same function as those in the above embodiments will be numbered the same here, and will not be described and/or illustrated again in detail here for the sake of brevity.

Figure 24:
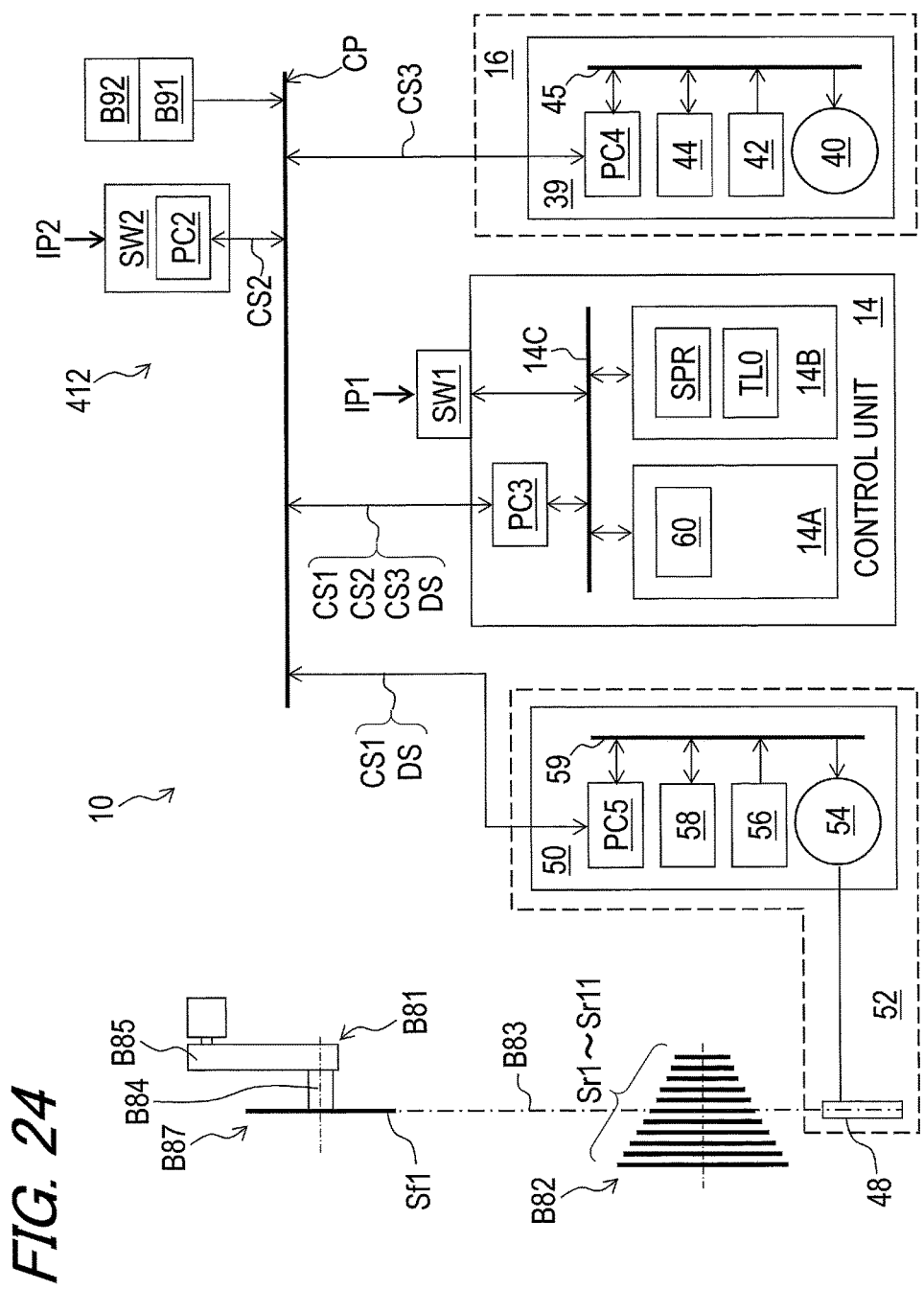
FIG. 24 is a block diagram of a bicycle including an electrical bicycle operating system in accordance with a fourth embodiment.
Figure 25:
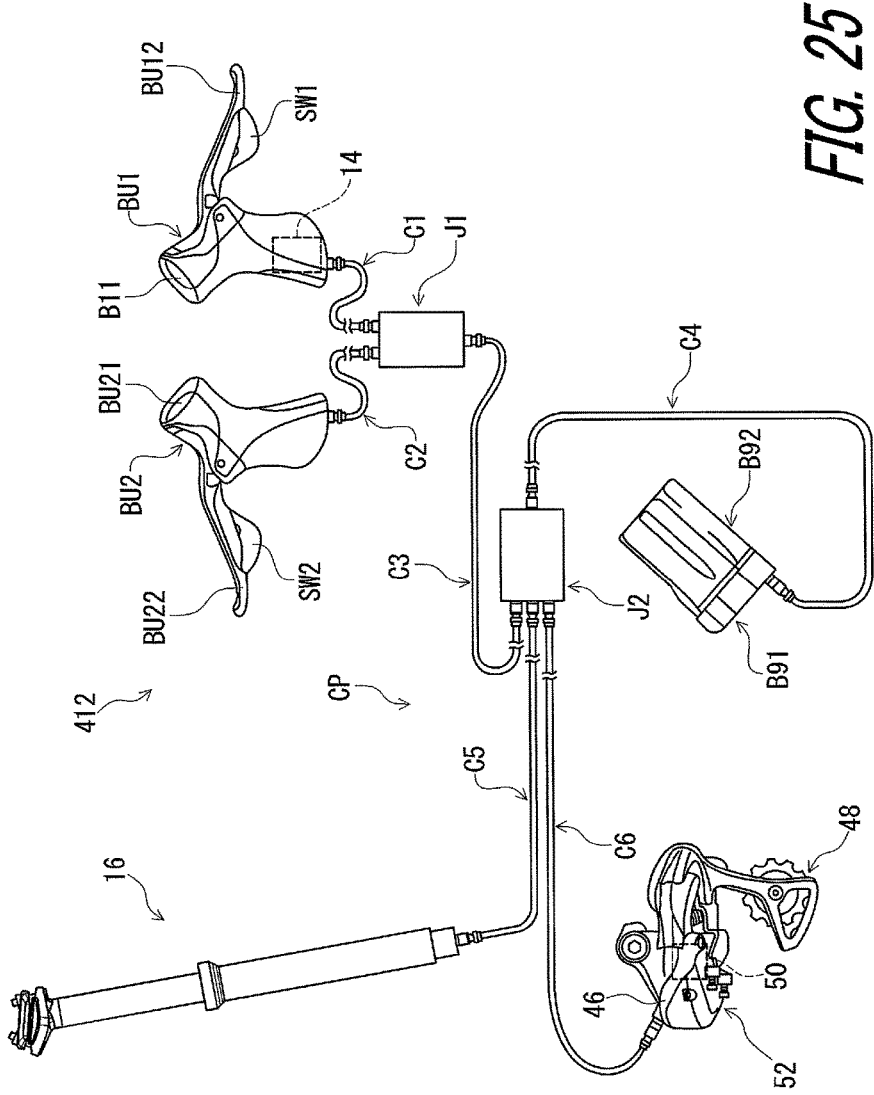
FIG. 25 is a schematic diagram showing one exemplary configuration of an electric communication path of the bicycle illustrated in FIG. 24.

As seen in FIGS. 24 and 25, the electrical bicycle operating system 412 comprises the first switch SW1, the second switch SW2, the control unit 14. The control unit 14 electrically operates at least one of the electrical bicycle seatpost assembly 16, the electrical suspension 70, and the driving unit 80 when both the first switch SW1 and the second switch SW2 are operated concurrently. Unlike the electrical bicycle operating system 12 of the first embodiment, the control unit 14 is separately provided from the electrical rear derailleur 52. In this embodiment, the control unit 14 is integrally provided with the first switch SW1 as a single unit. Specifically, the control unit 14 is provided in the first brake operating unit BU1.

Figure 26:
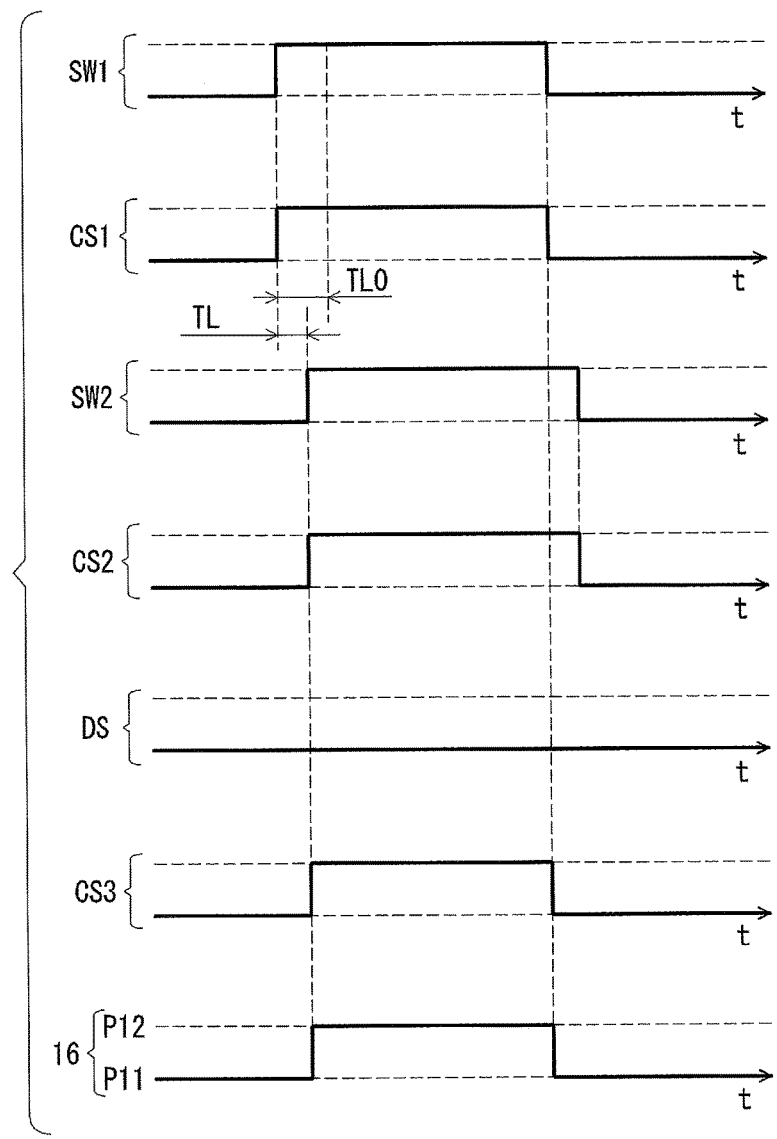
FIGS. 26 to 28 are timing charts of the electrical bicycle operating system illustrated in FIG. 24.
Figure 27:
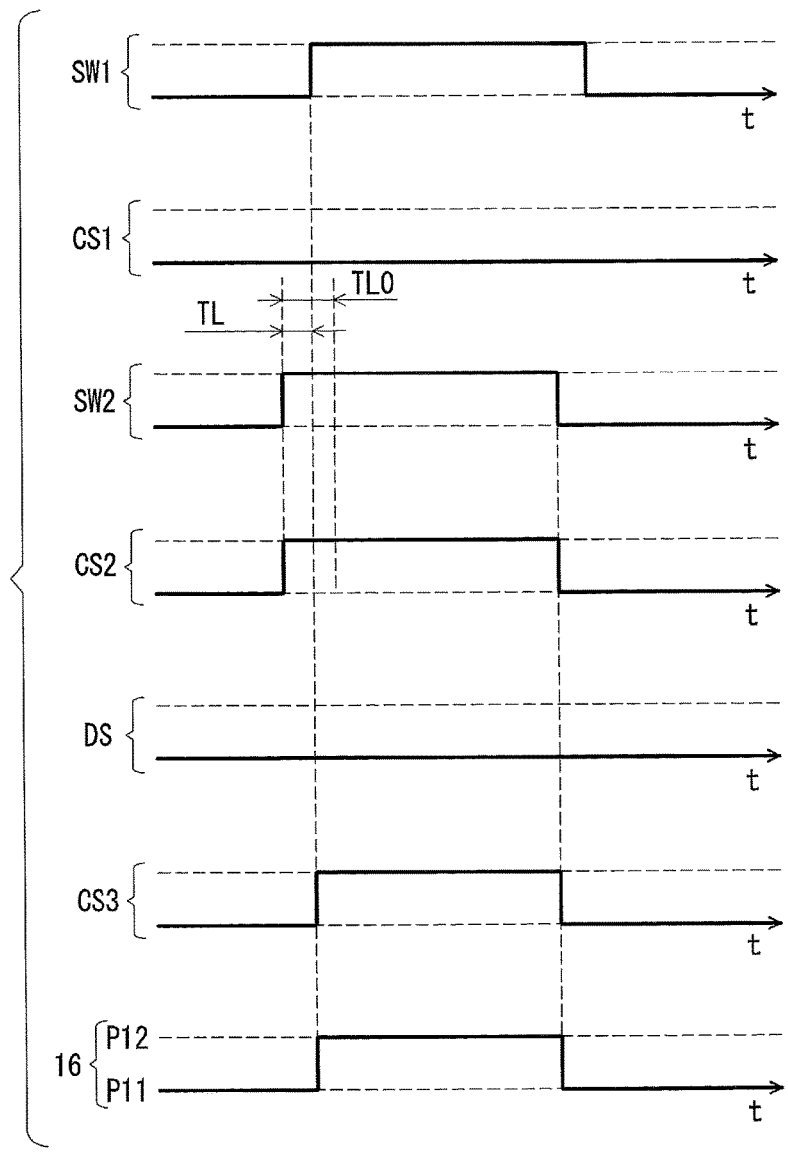

As seen in FIGS. 26 and 27, the control unit 14 generates the third signal CS3 to operate the at least one of the electrical bicycle seatpost assembly 16, the electrical suspension 70, and the driving unit 80 when both the first switch SW1 and the second switch SW2 are operated concurrently. In this embodiment, the control unit 14 generates the third signal CS3 to operate the electrical bicycle seatpost assembly 16 when both the first switch SW1 and the second switch SW2 are operated concurrently.

The first switch SW1 does not output the first transmission control signal CS1 when both the first switch SW1 and the second switch SW2 are operated concurrently. Specifically, as seen in FIG. 26, the first switch SW1 does not output the first transmission control signal CS1 when the first switch SW1 receives the second transmission control signal CS1 within the operation time lag TL0 after operation of the first switch SW1. In this embodiment, the first switch SW1 is configured to detect the second transmission control signal CS2. As seen in FIG. 27, the first switch SW1 does not output the first transmission control signal CS1 when the first switch SW1 is operated within the operation time lag TL0 after receipt of the second transmission control signal CS2. However, the first switch SW1 can be configured to output the first transmission control signal CS1 when both the first switch SW1 and the second switch SW2 are operated concurrently. In such an embodiment, the electrical rear derailleur 52 and the electrical bicycle seatpost assembly 16 are operated concurrently using the first transmission control signal CS1 and the third signal CS3.

Figure 28:
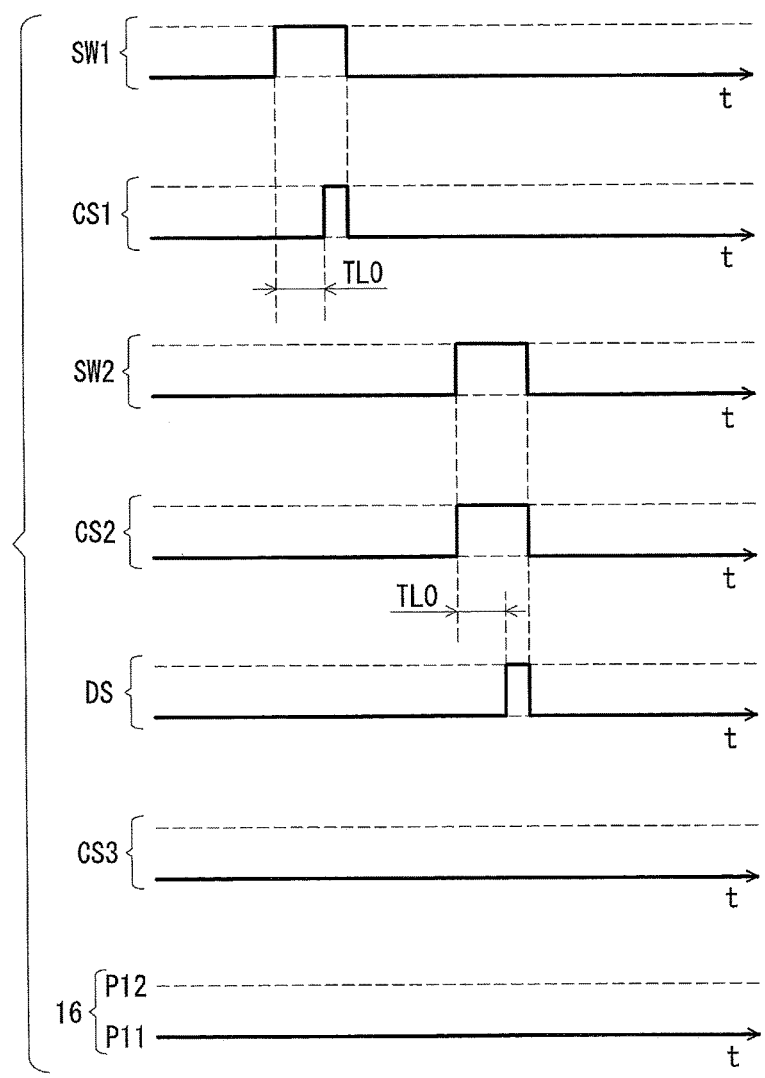

As seen in FIG. 28, the first switch SW1 outputs the first transmission control signal CS1 when the first switch SW1 does not receive the second transmission control signal CS2 within the operation time lag TL0 after operation of the first switch SW1. Thus, the first transmission control signal CS1 is output from the first switch CS1 after the operation time lag TL0 is elapsed from operation of the first switch SW1. The second switch SW2 outputs the second transmission control signal CS2 in response to operation of the second switch SW2. The control unit 14 generates the downshift command signal DS when the first switch SW1 is not operated within the operation time lag TL0 after receipt of the second transmission control signal CS2.

With the electrical bicycle operating system 412, it is possible to obtain substantially the same effects as those of the electrical bicycle operating systems 12 to 312. The above first to sixth modifications of the first embodiment can be applied to the electrical bicycle operating system 412 of the fourth embodiment.

Furthermore, with the electrical bicycle operating system 412, the first switch SW1 does not output the first transmission control signal CS1 when both the first switch SW1 and the second switch SW2 are operated concurrently. Accordingly, it is possible to reduce power presumption of the electrical bicycle operating system 412 compared with a case where the first transmission control signal CS1 is output when both the first switch SW1 and the second switch SW2 are operated concurrently.

First Modification

Figure 29:
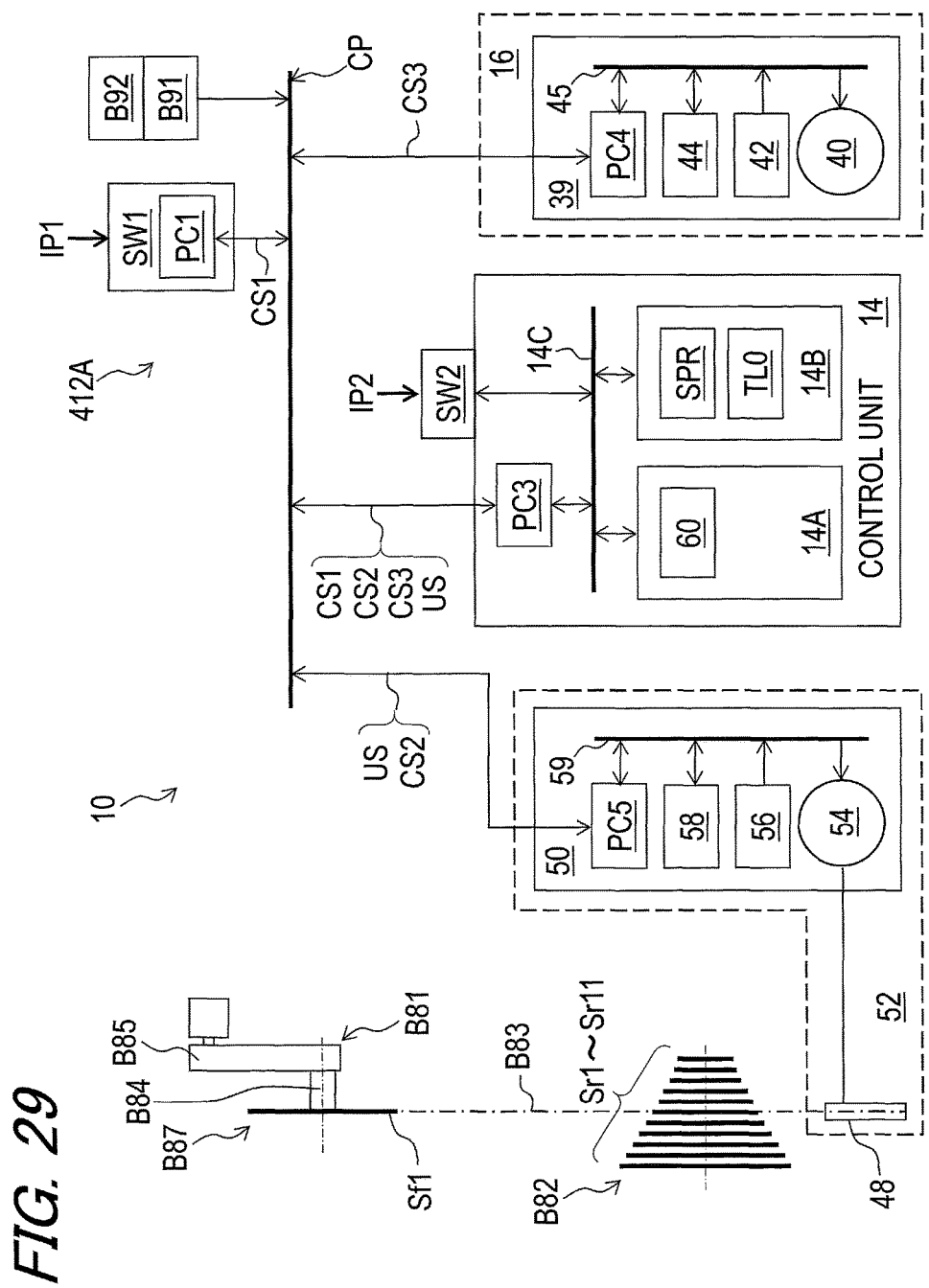
FIG. 29 is a block diagram of a bicycle including the electrical bicycle operating system in accordance with a first modification of the fourth embodiment.
Figure 30:
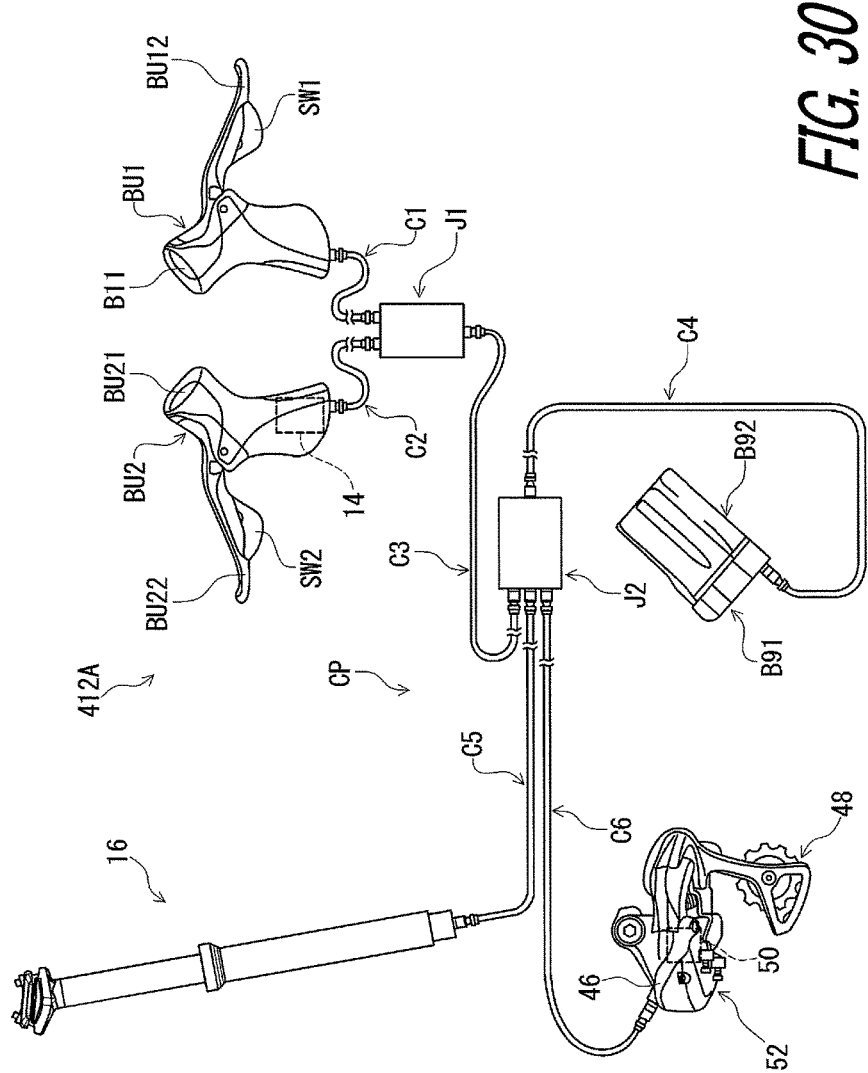
FIG. 30 is a schematic diagram showing one exemplary configuration of an electric communication path of the bicycle illustrated in FIG. 29.

As seen in FIGS. 29 and 30, in an electrical bicycle operating system 412A according to the first modification of the first embodiment, the control unit 14 can be integrally provided with the second switch SW2 as a single unit. In this modification, the control unit 14 is provided in the second brake operating unit BU2.

Figure 31:
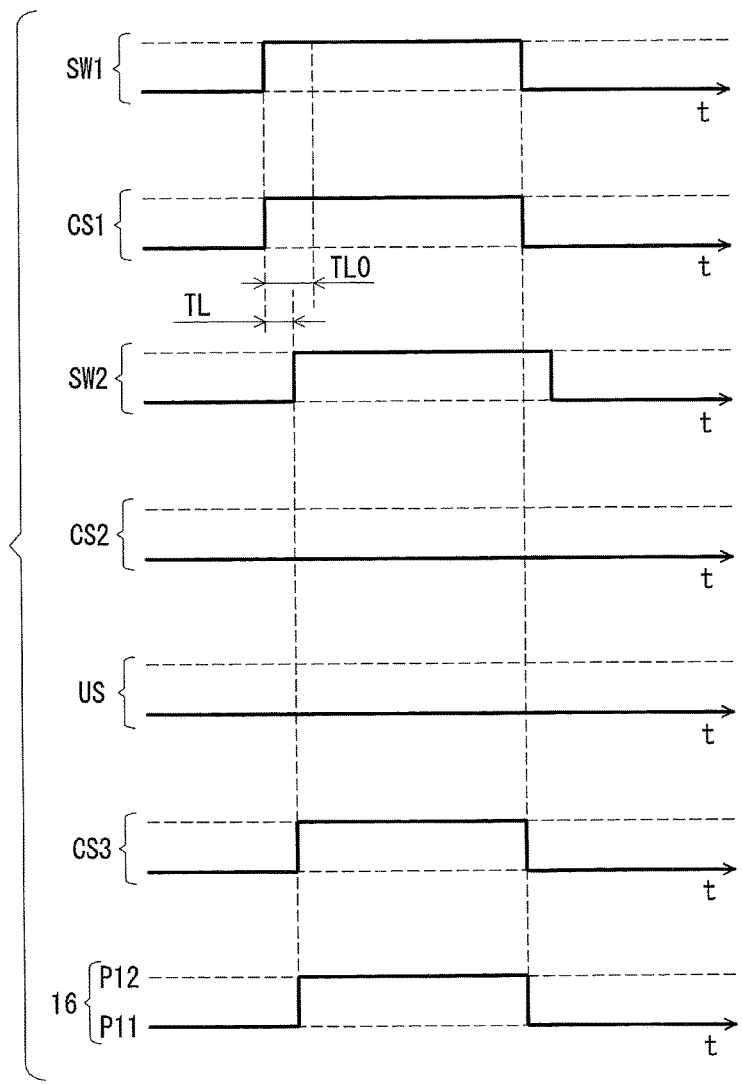
FIGS. 31 to 33 are timing charts of the electrical bicycle operating system illustrated in FIG. 29.
Figure 32:
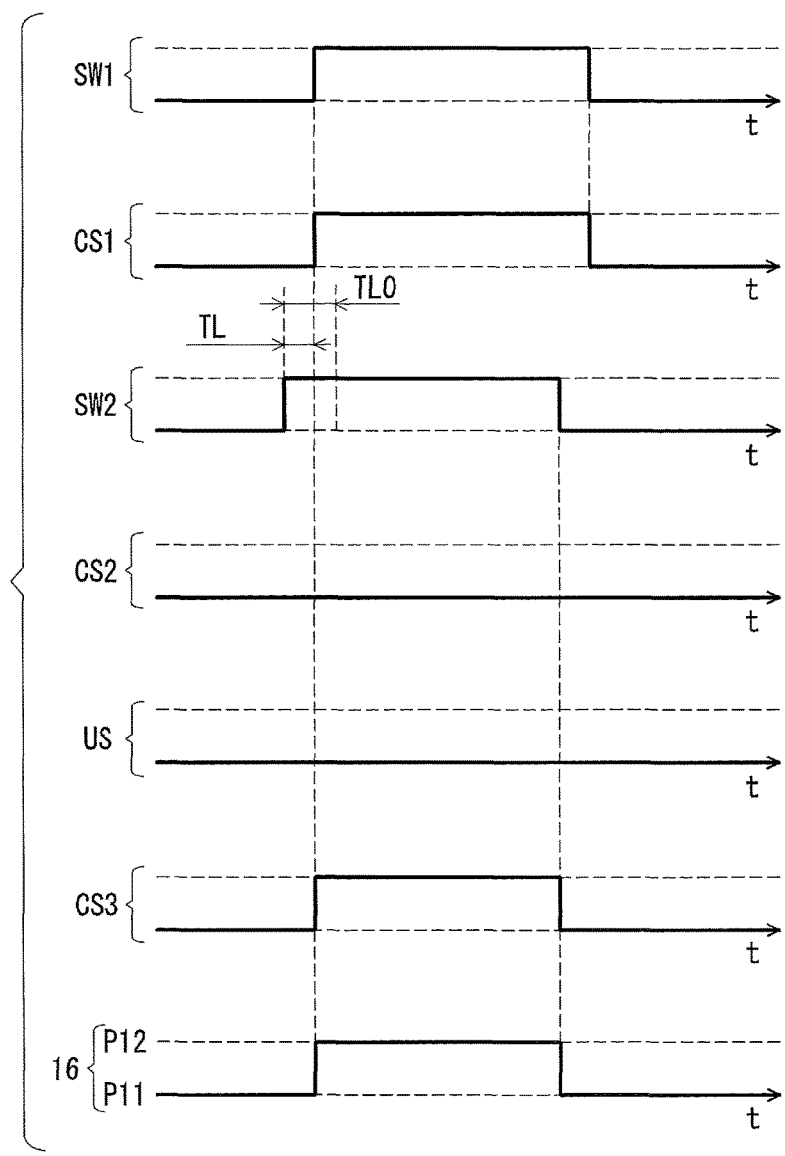

As seen in FIGS. 31 and 32, the second switch SW2 does not output the second transmission control signal CS2 when both the first switch SW1 and the second switch SW2 are operated concurrently. Specifically, as seen in FIG. 31, the second switch SW2 does not output the second transmission control signal CS2 when the second switch SW2 receives the first transmission control signal CS1 within the operation time lag TL0 after operation of the second switch SW2. In this embodiment, the second switch SW2 is configured to detect the first transmission control signal CS1. As seen in FIG. 32, the second switch SW2 does not output the second transmission control signal CS2 when the second switch SW2 is operated within the operation time lag TL0 after receipt of the first transmission control signal CS1.

Figure 33:
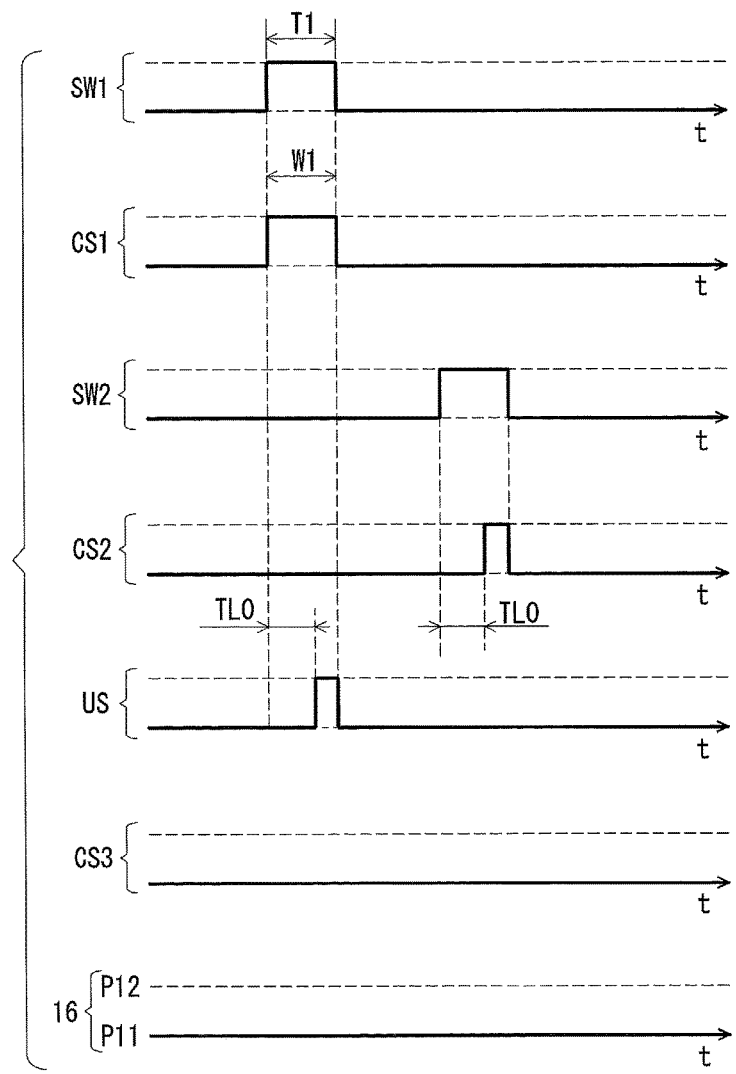

As seen in FIG. 33, the second switch SW2 outputs the second transmission control signal CS2 when the second switch SW2 does not receive the first transmission control signal CS1 within the operation time lag TL0 after operation of the second switch SW2. Thus, the second transmission control signal CS2 is output from the second switch SW2 after the operation time lag TL0 is elapsed from operation of the second switch SW2. The first switch SW1 outputs the first transmission control signal CS1 in response to operation of the first switch SW1. The control unit 14 generates the upshift command signal US when the second switch SW2 is not operated within the operation time lag TL0 after receipt of the first transmission control signal CS1.

Furthermore, with the electrical bicycle operating system 412A, the second switch SW2 does not output the second transmission control signal CS2 when both the first switch SW1 and the second switch SW2 are operated concurrently. Accordingly, it is possible to reduce power presumption of the electrical bicycle operating system 412A compared with a case where the second transmission control signal CS2 is output when both the first switch SW1 and the second switch SW2 are operated concurrently.

In each of the electrical bicycle operating systems 412 and 412A, wireless communication can be applied to at least part of the control unit 14, the first switch SW1, the second switch SW2, the rear derailleur 52, the electrical bicycle seatpost assembly 16, the electrical suspension 70, and the driving unit 80 instead of the PLC.

Fifth Embodiment

An electrical bicycle operating system 512 in accordance with a fifth embodiment will be described below referring to FIGS. 34 and 35. The electrical bicycle operating system 512 has the same structures and/or configurations as those of the electrical bicycle operating system 212 except for a communication path. Thus, elements having substantially the same function as those in the above embodiments will be numbered the same here, and will not be described and/or illustrated again in detail here for the sake of brevity.

Figure 34:
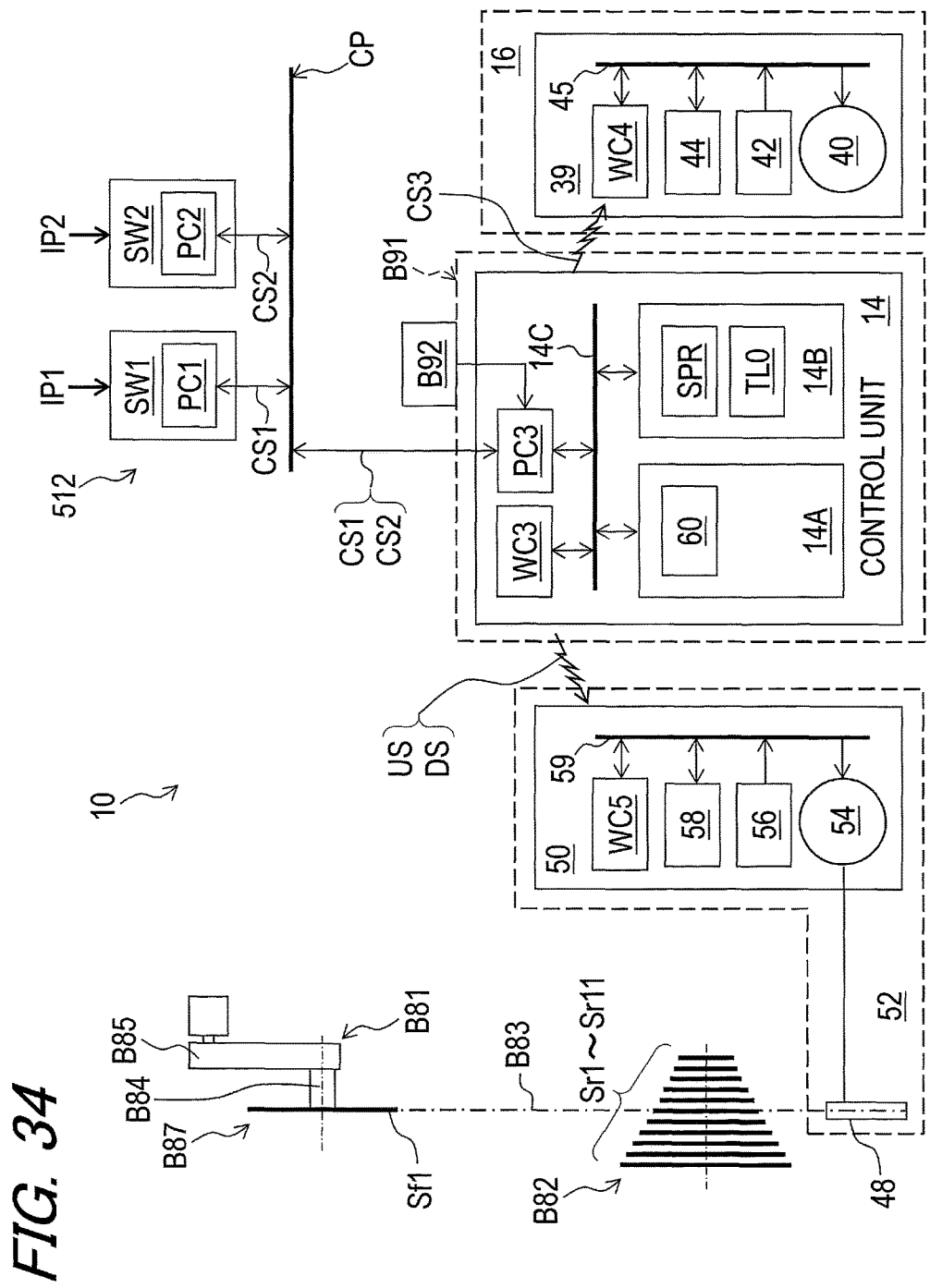
FIG. 34 is a block diagram of a bicycle including an electrical bicycle operating system in accordance with a fifth embodiment.
Figure 35:
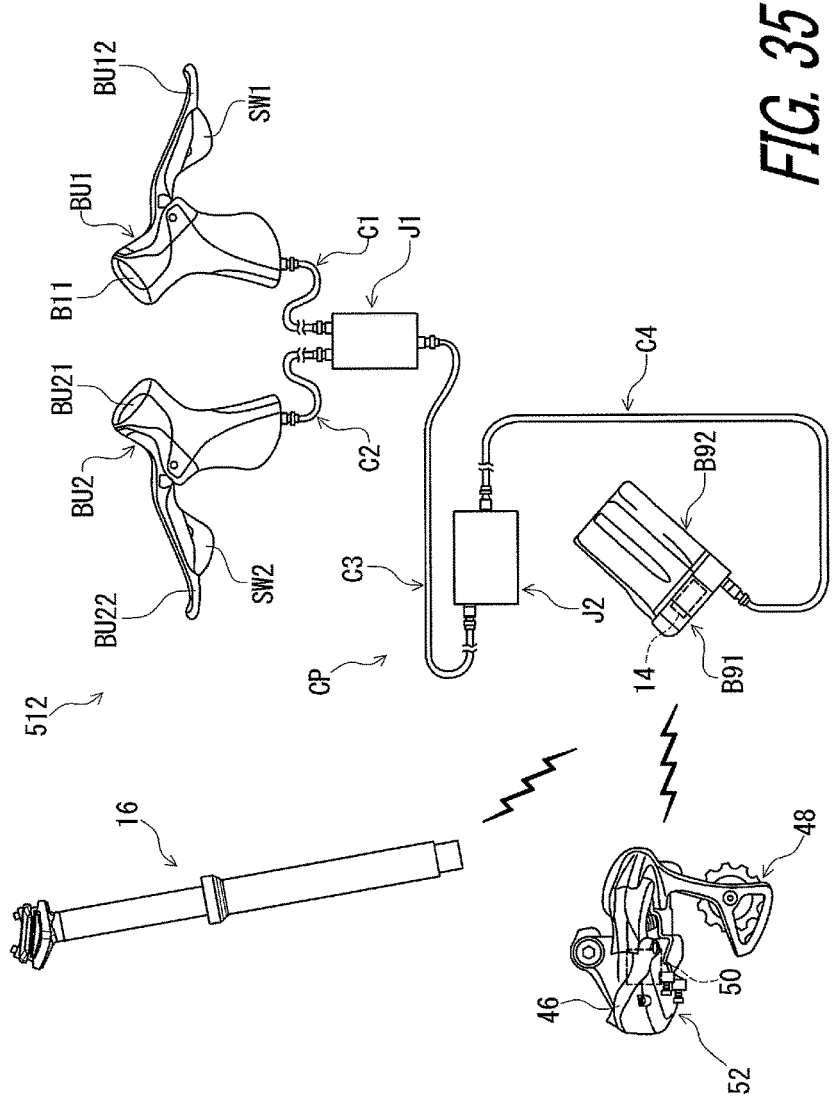
FIG. 35 is a schematic diagram showing one exemplary configuration of an electric communication path of the bicycle illustrated in FIG. 34.

As seen in FIGS. 34 and 35, in the electrical bicycle operating system 512, the control unit 14 is wirelessly connected to the electrical bicycle seatpost assembly 16 and the electrical rear derailleur 52 without the electric communication path CP while the first switch SW1 and the second switch SW2 are connected to the control unit 14 via the electric communication path CP.

The electrical bicycle seatpost assembly 16 includes the fourth wireless communication device WC4 instead of the fourth PLC controller PC4. The electrical rear derailleur 52 includes the fifth wireless communication device WC5 instead of the fifth PLC controller PC5. Batteries (not shown) are respectively provided in the electrical bicycle seatpost assembly 16 and the electrical derailleur 18.

With the electrical bicycle operating system 512, it is possible to obtain substantially the same effects as those of the electrical bicycle operating systems 12 to 412. The above modifications of the above embodiments can be applied to the electrical bicycle operating system 512 of the fifth embodiment.

Sixth Embodiment

An electrical bicycle operating system 612 in accordance with a sixth embodiment will be described below referring to FIGS. 36 to 40. The electrical bicycle operating system 612 has the same structures and/or configurations as those of the electrical bicycle operating system 412 except for the arrangement of the second switch. Thus, elements having substantially the same function as those in the above embodiments will be numbered the same here, and will not be described and/or illustrated again in detail here for the sake of brevity.

Figure 36:
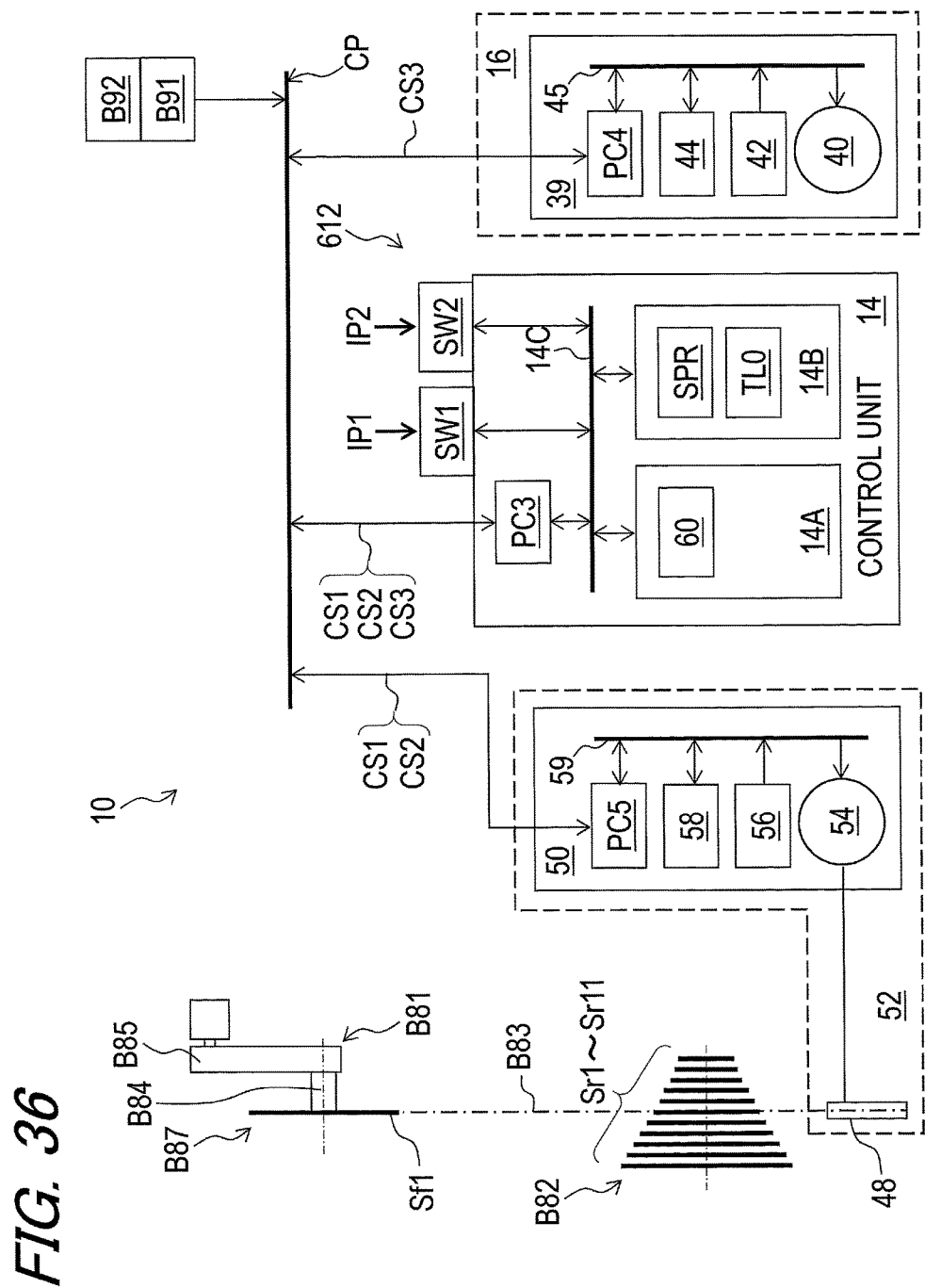
FIG. 36 is a block diagram of a bicycle including an electrical bicycle operating system in accordance with a sixth embodiment.
Figure 37:
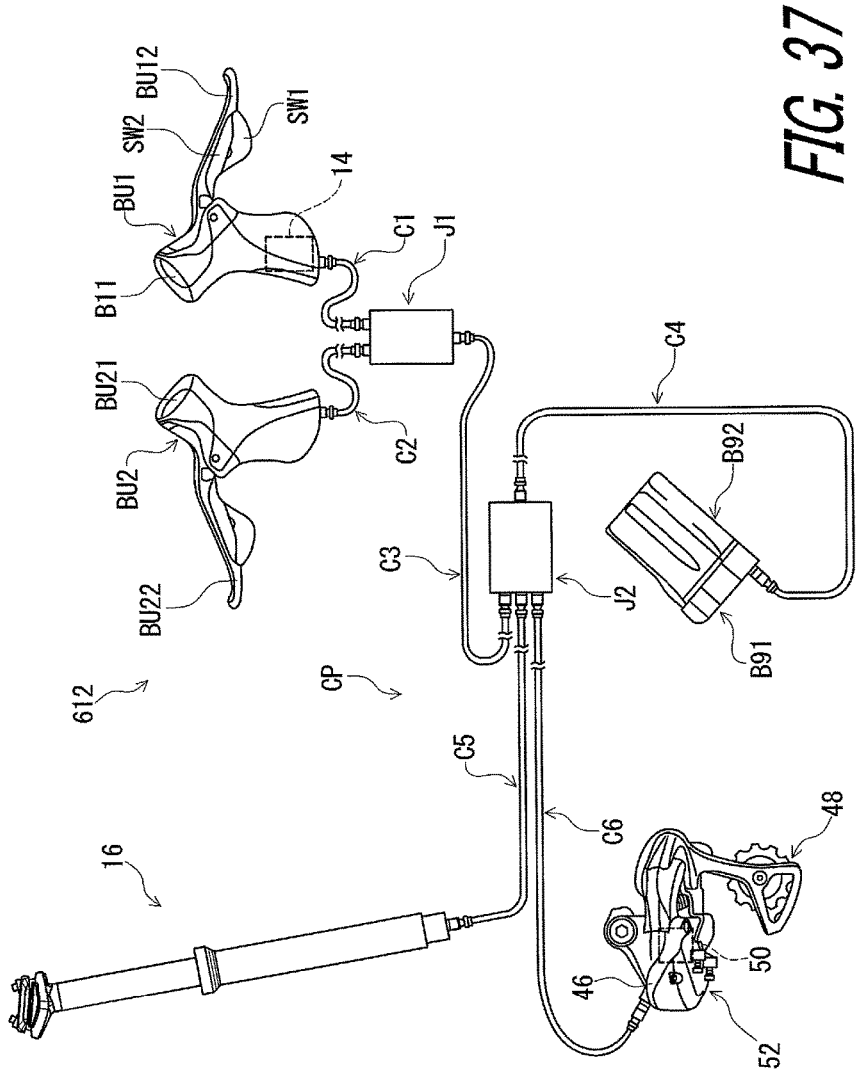
FIG. 37 is a schematic diagram showing one exemplary configuration of an electric communication path of the bicycle illustrated in FIG. 36.

As seen in FIGS. 36 and 37, the first switch SW1, the second switch SW2, and the control unit 14 are mounted to the first brake operating unit BU1 in the electrical bicycle operating system 612. Specifically, the first switch SW1 and the second switch SW2 are mounted to the first brake lever BU12 of the first brake operating unit BU1.

Figure 38:
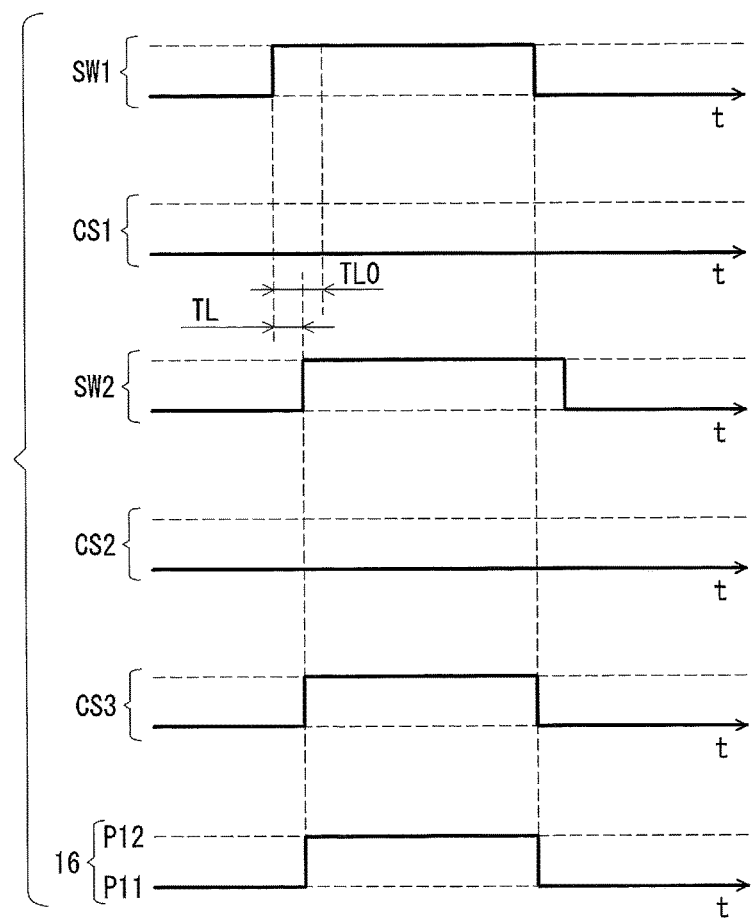
FIGS. 38 to 40 are timing charts of the electrical bicycle operating system illustrated in FIG. 36.
Figure 39:
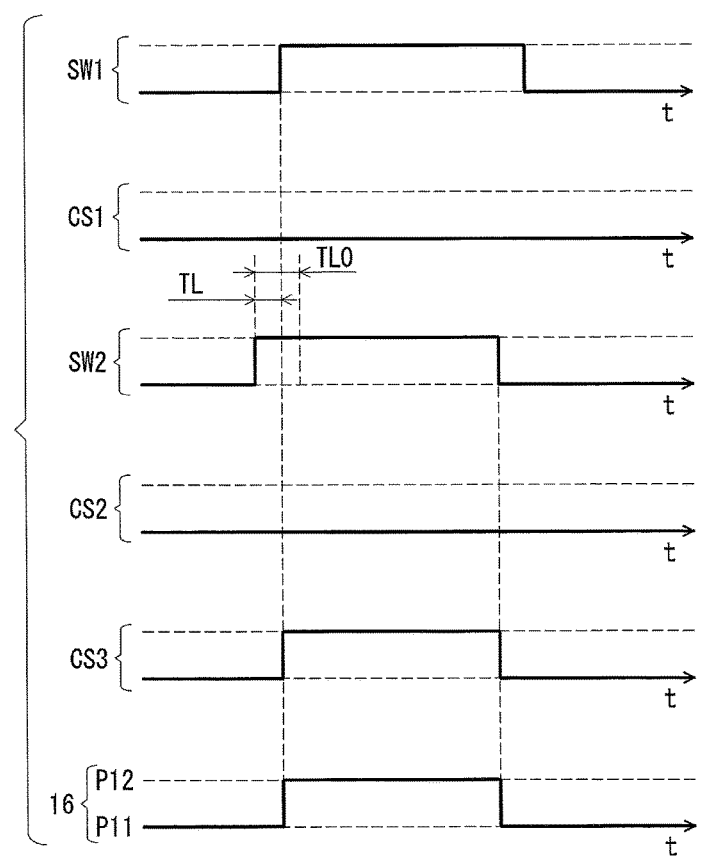

As seen in FIGS. 38 and 39, the first switch SW1 does not output the first transmission control signal CS1 when both the first switch SW1 and the second switch SW2 are operated concurrently. The second switch SW2 does not output the second transmission control signal CS2 when both the first switch SW1 and the second switch SW2 are operated concurrently. These features are the same as those of the first switch SW1 of the fourth embodiment and the second switch SW2 of the first modification of the fourth embodiment. Thus, they will not be described and/or illustrated in detail here for the sake of brevity.

Figure 40:
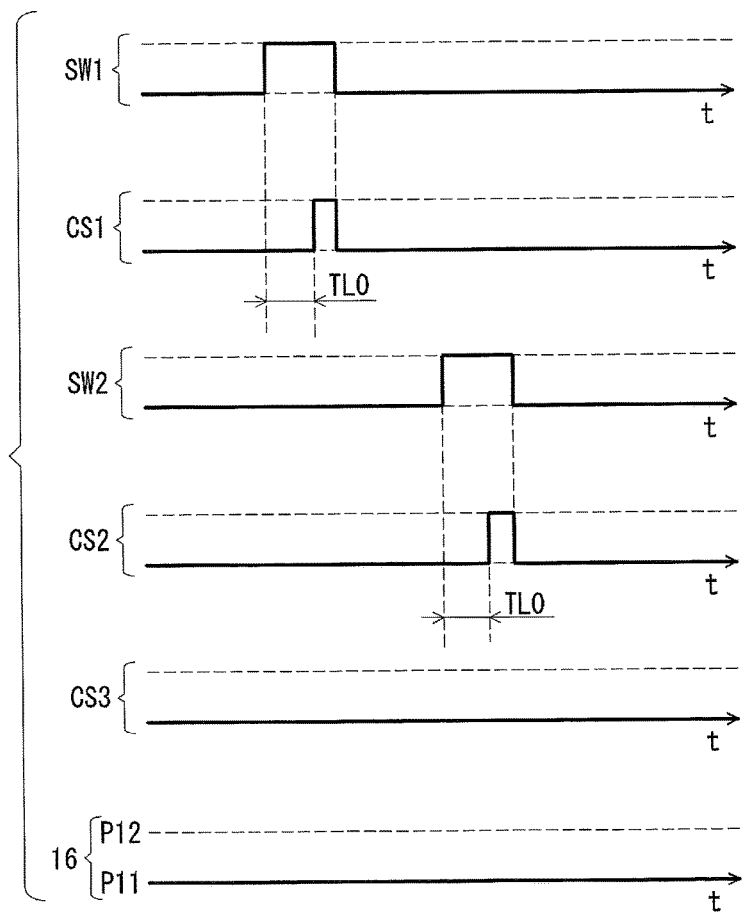

As seen in FIG. 40, the first switch SW1 outputs the first transmission control signal CS1 when the second switch SW2 is not operated within the operation time lag TL0 after operation of the first switch SW1. Thus, the first transmission control signal CS1 is output from the first switch CS1 after the operation time lag TL0 is elapsed from operation of the first switch SW1. The second switch SW2 outputs the second transmission control signal CS2 when the first switch SW1 is not operated within the operation time lag TL0 after operation of the second switch SW2. Thus, the second transmission control signal CS2 is output from the second switch SW2 after the operation time lag TL0 is elapsed from operation of the second switch SW2.

The control unit 14 is configured to detect operation of the first switch SW1 without the first transmission control signal CS1. The control unit 14 is configured to detect operation of the second switch SW2 without the second transmission control signal CS2.

With the electrical bicycle operating system 612, it is possible to obtain substantially the same effects as those of the electrical bicycle operating systems 12 to 512. The above modifications of the above embodiments can be applied to the electrical bicycle operating system 612 of the sixth embodiment.

In the electrical bicycle operating system 612, wireless communication can be applied to at least part of the control unit 14, the first switch SW1, the second switch SW2, the rear derailleur 52, the electrical bicycle seatpost assembly 16, the electrical suspension 70, and the driving unit 80 instead of the PLC.

Seventh Embodiment

A bicycle 710 including an electrical bicycle operating system 712 in accordance with a seventh embodiment will be described below referring to FIGS. 41 and 42. The electrical bicycle operating system 712 has the same structures and/or configurations as those of the electrical bicycle operating system 12 except for an electrical front derailleur. Thus, elements having substantially the same function as those in the above embodiments will be numbered the same here, and will not be described and/or illustrated again in detail here for the sake of brevity.

Figure 41:
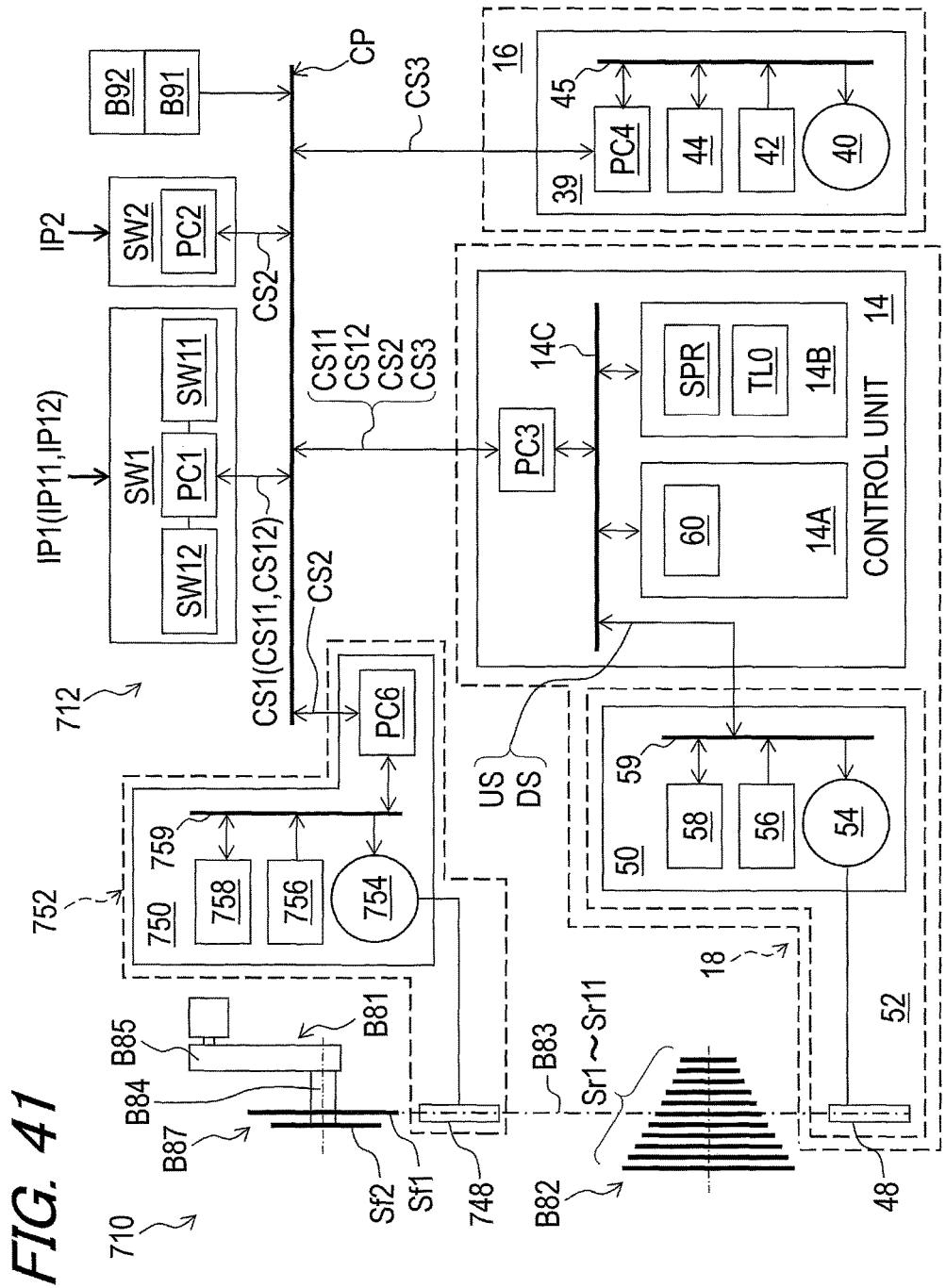
FIG. 41 is a block diagram of a bicycle including an electrical bicycle operating system in accordance with a seventh embodiment.
Figure 42:
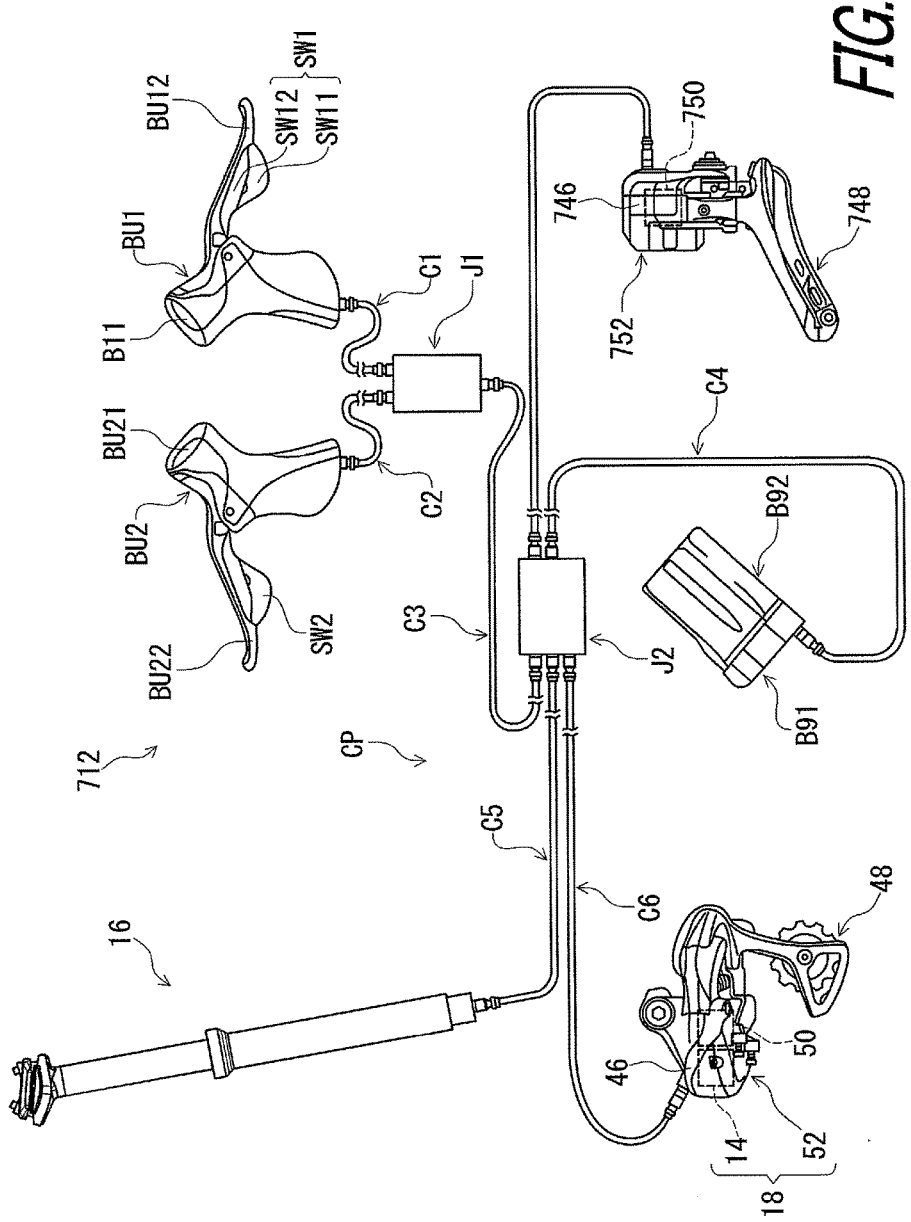
FIG. 42 is a schematic diagram showing one exemplary configuration of an electric communication path of the bicycle illustrated in FIG. 41.

As seen in FIGS. 41 and 42, the bicycle 710 has substantially the same structures and/or configurations as those of the bicycle 10. Unlike the bicycle 10, however, the bicycle 710 includes an electrical front derailleur 752. The front sprocket B87 includes the front sprocket wheel Sf1 and additional front sprocket wheel Sf2. The front sprocket wheel Sf1 corresponds to a top gear position of the electrical front derailleur 752. The electrical front derailleur 752 has top and low shift positions respectively corresponding to the front sprocket wheel Sf1 and the additional front sprocket wheel Sf2.

As seen in FIG. 42, the electrical front derailleur 752 further comprises a base 746, a chain guide 748, and a motor unit 750. The motor unit 750 moves the chain guide 748 relative to the base 746. The control unit 14 is operatively connected to the motor unit 750. The base 746, the chain guide 748, and the motor unit 750 have substantially the same structures as those of the base 46, the chain guide 48, and the motor unit 50 of the electrical rear derailleur 52. A total number of the shift positions of the electrical front derailleur 752 is not limited to this embodiment.

The motor unit 750 includes a sixth PLC controller PC6 having the same function as that of each of the first to fifth PLC controllers PC1 to PC5. The third PLC controller PC3 transmits the second transmission control signal PC6 to the sixth PLC controller PC6 via the electric communication path CP using the PLC. The sixth PLC controller PC6 transmits the shift position sensed by the shift position sensor 756 to the third PLC controller PC3 via the electric communication path CP using the PLC.

As seen in FIG. 41, the motor unit 750 includes a motor 754, a shift position sensor 756, and a motor driver 758. The motor 754, the shift position sensor 756, the motor driver 758, and the sixth PLC controller PC6 are connected with each other via a bus 759. The motor 754 is mechanically coupled to the chain guide 748. The motor 754 is configured to move the chain guide 748 to shift the bicycle chain B83 relative to the front sprocket B87. The motor 754, the shift position sensor 756, and the motor driver 758 have substantially the same configuration as those of the motor 54, the shift position sensor 56, and the motor driver 58. Thus, they will not be described in detail here for the sake of brevity.

In the present application, upshifting of the electrical front derailleur 752 occurs when the bicycle chain B83 is shifted by the electrical front derailleur 752 from a smaller sprocket to a neighboring larger sprocket. Downshifting of the electrical front derailleur 752 occurs when the bicycle chain B83 is shifted by the electrical front derailleur 752 from a larger sprocket to a neighboring smaller sprocket.

In this embodiment, the electrical rear derailleur 52 is operated via the first switch SW1, and the electrical front derailleur 752 is operated via the second switch SW2. The first switch SW1 includes an upshift switch SW11 and a downshift switch SW12. The upshift switch SW11 is configured to generate an upshift signal CS11 as the first transmission control signal CS1 in response to an upshift user input IP11 defined as the first user input IP1. The downshift switch SW12 is configured to generate a downshift signal CS12 as the first transmission control signal CS1 in response to a downshift user input IP12 defined as the first user input IP1. Each of the upshift signal CS11 and the downshift signal CS12 can be also referred to as the first transmission control signal CS1.

The electrical rear derailleur 52 upshifts in response to the upshift signal CS11 and downshifts in response to the downshift signal CS12. The electrical front derailleur 752 upshifts in response to the second transmission control signal CS2 when the electrical front derailleur 752 is at the low shift position. The electrical front derailleur 752 downshifts in response to the second transmission control signal CS2 when the electrical front derailleur 752 is at the top shift position.

The control unit 14 electrically operates at least one of the electrical bicycle seatpost assembly 16, the electrical suspension 70, and the driving unit 80 when both the first switch SW1 and the second switch SW2 are operated concurrently. In this embodiment, the control unit 14 electrically operates the electrical bicycle seatpost assembly 16 when both the first switch SW1 and the second switch SW2 are operated concurrently. Specifically, the control unit 14 electrically operates the electrical bicycle seatpost assembly 16 when both the upshift switch SW11 and the second switch SW2 are operated concurrently. However, the control unit 14 can be configured to electrically operate the electrical bicycle seatpost assembly 16 when both the downshift switch SW12 and the second switch SW2 are operated concurrently. In this embodiment, the control unit 14 is provided to the electrical rear derailleur 52. However, the control unit 14 can be provided to the electrical front derailleur 752.

The control unit 14 generates the third signal CS3 to operate the electrical bicycle seatpost assembly 16 when both the first switch SW1 and the second switch SW2 are operated concurrently. In this embodiment, the control unit 14 generates the third signal CS3 to operate the electrical bicycle seatpost assembly 16 when both the upshift switch SW11 and the second switch SW2 are operated concurrently. However, the control unit 14 can be configured to generate the third signal CS3 to operate the electrical bicycle seatpost assembly 16 when both the downshift switch SW12 and the second switch SW2 are operated concurrently.

The control unit 14 generates the third signal CS3 when the control unit 14 receives both the first transmission control signal CS1 and the second transmission control signal CS2 concurrently. In this embodiment, the control unit 14 generates the third signal CS3 when the control unit 14 receives both the upshift signal CS11 and the second transmission control signal CS2 concurrently. However, the control unit 14 can be configured to generate the third signal CS3 when the control unit 14 receives both the downshift signal CS12 and the second transmission control signal CS2 concurrently.

Unlike the electrical bicycle operating system 12 of the first embodiment, the electrical rear derailleur 52 is operated using the first transmission control signal CS1, and the electrical front derailleur 752 is operated using the second transmission control signal CS2. However, operation of the electrical bicycle operating system 712 is substantially the same as operation of the electrical bicycle operating system 12 of the first embodiment. Thus, it will not be described and/or illustrated in detail here for the sake of brevity.

With the electrical bicycle operating system 712, it is possible to obtain substantially the same effects as those of the electrical bicycle operating systems 12 to 612. The above modifications of the above embodiments can be applied to the electrical bicycle operating system 712 of the seventh embodiment.

In the electrical bicycle operating system 712, wireless communication can be applied to at least part of the control unit 14, the first switch SW1, the second switch SW2, the front derailleur 752, the rear derailleur 52, the electrical bicycle seatpost assembly 16, the electrical suspension 70, and the driving unit 80 instead of the PLC.

Eighth Embodiment

An electrical bicycle operating system 812 in accordance with an eighth embodiment will be described below referring to FIGS. 43 and 44. The electrical bicycle operating system 812 has the same structures and/or configurations as those of the electrical bicycle operating system 212 except for the electrical front derailleur. Thus, elements having substantially the same function as those in the above embodiments will be numbered the same here, and will not be described and/or illustrated again in detail here for the sake of brevity.

Figure 43:
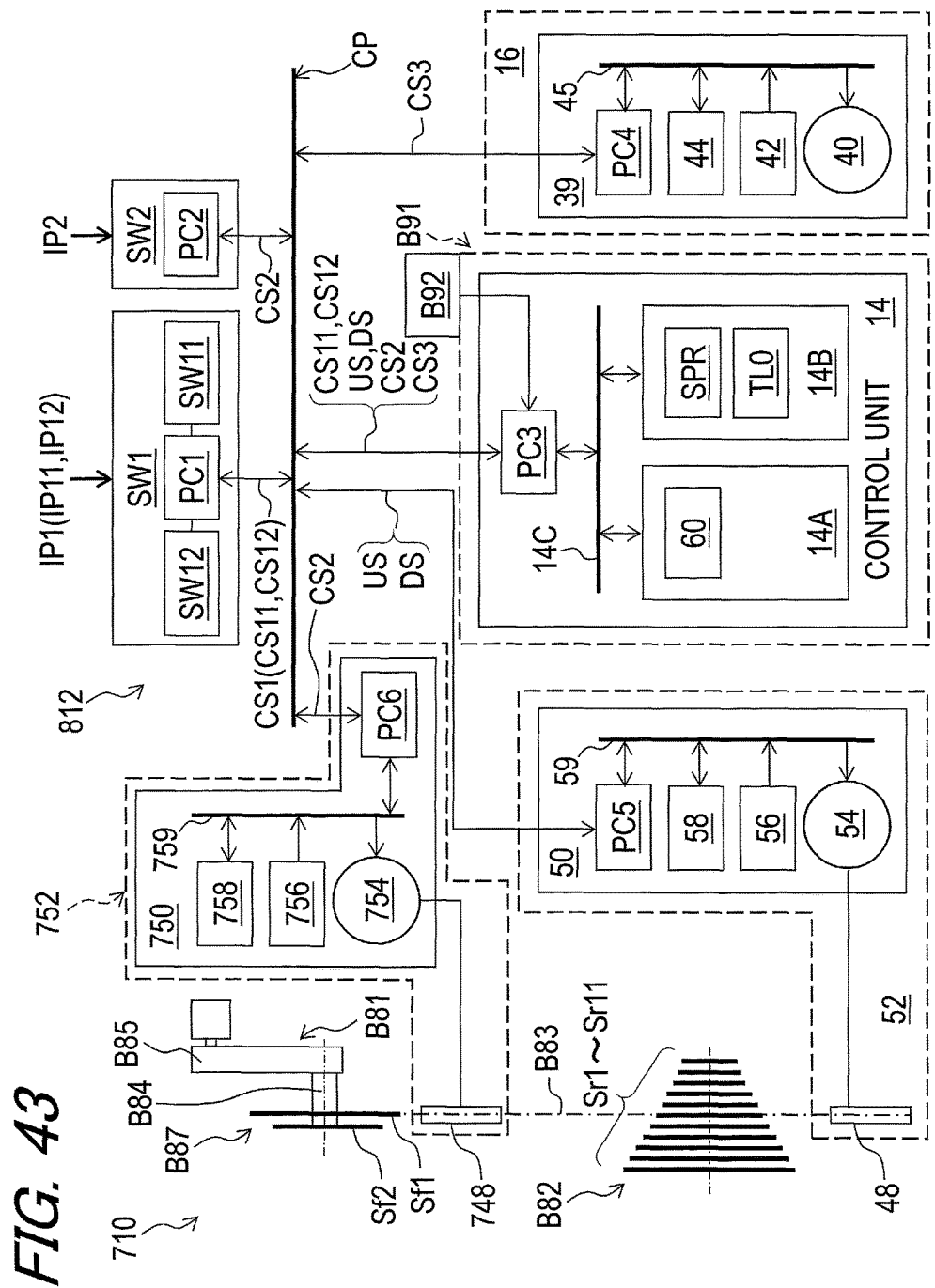
FIG. 43 is a block diagram of a bicycle including an electrical bicycle operating system in accordance with an eighth embodiment.
Figure 44:
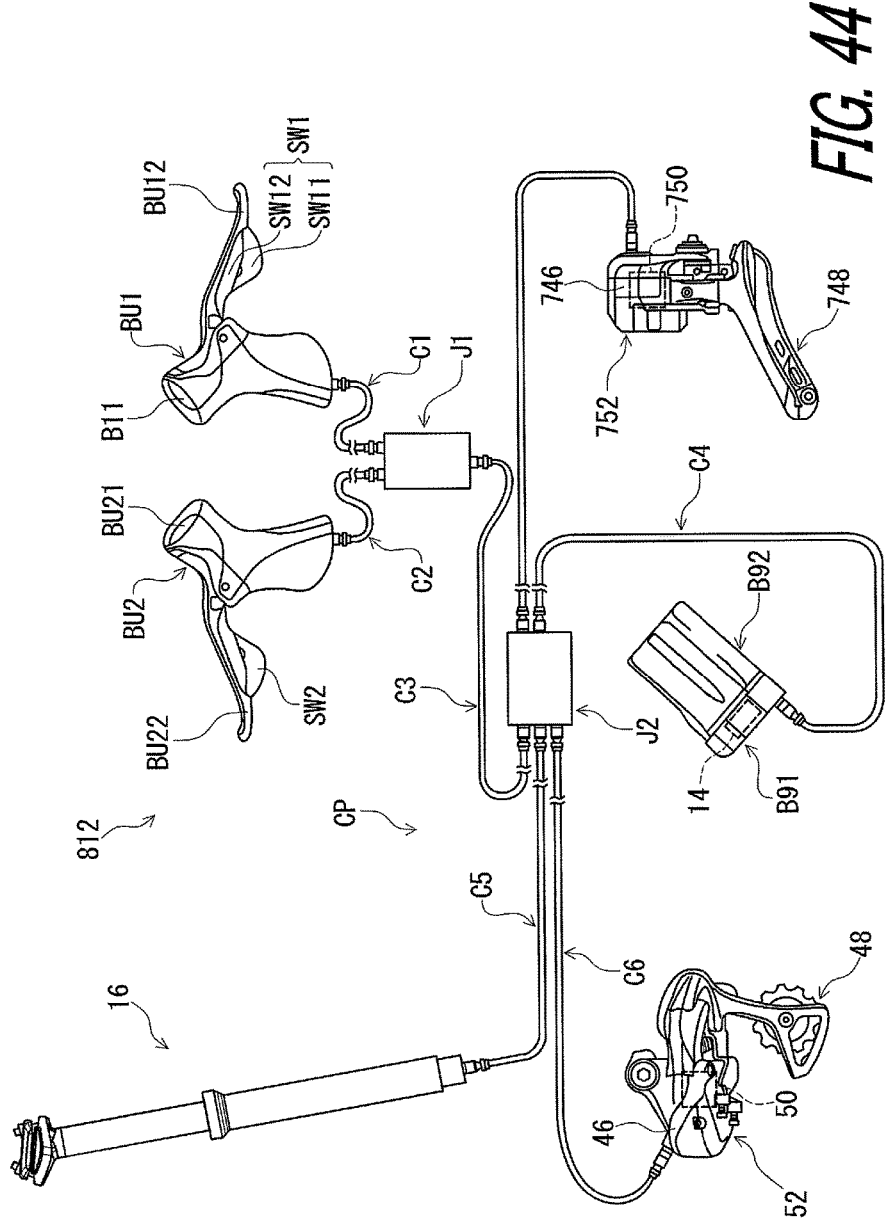
FIG. 44 is a schematic diagram showing one exemplary configuration of an electric communication path of the bicycle illustrated in FIG. 43.

As seen in FIGS. 43 and 44, in the electrical bicycle operating system 812, the control unit 14 is provided in the battery holder B91. The electrical bicycle operating system 812 is constituted as a combination of the electrical bicycle operating system 212 of the second embodiment and the electrical bicycle operating system 712 of the seventh embodiment.

With the electrical bicycle operating system 812, it is possible to obtain substantially the same effects as those of the electrical bicycle operating systems 12 to 712. The above modifications of the above embodiment can be applied to the electrical bicycle operating system 812 of the eighth embodiment.

In the electrical bicycle operating system 812, wireless communication can be applied to at least part of the control unit 14, the first switch SW1, the second switch SW2, the front derailleur 752, the rear derailleur 52, the electrical bicycle seatpost assembly 16, the electrical suspension 70, and the driving unit 80 instead of the PLC.

Ninth Embodiment

An electrical bicycle operating system 912 in accordance with a ninth embodiment will be described below referring to FIGS. 45 and 46. The electrical bicycle operating system 912 has the same structures and/or configurations as those of the electrical bicycle operating system 412 except for the electrical front derailleur. Thus, elements having substantially the same function as those in the above embodiments will be numbered the same here, and will not be described and/or illustrated again in detail here for the sake of brevity.

Figure 45:
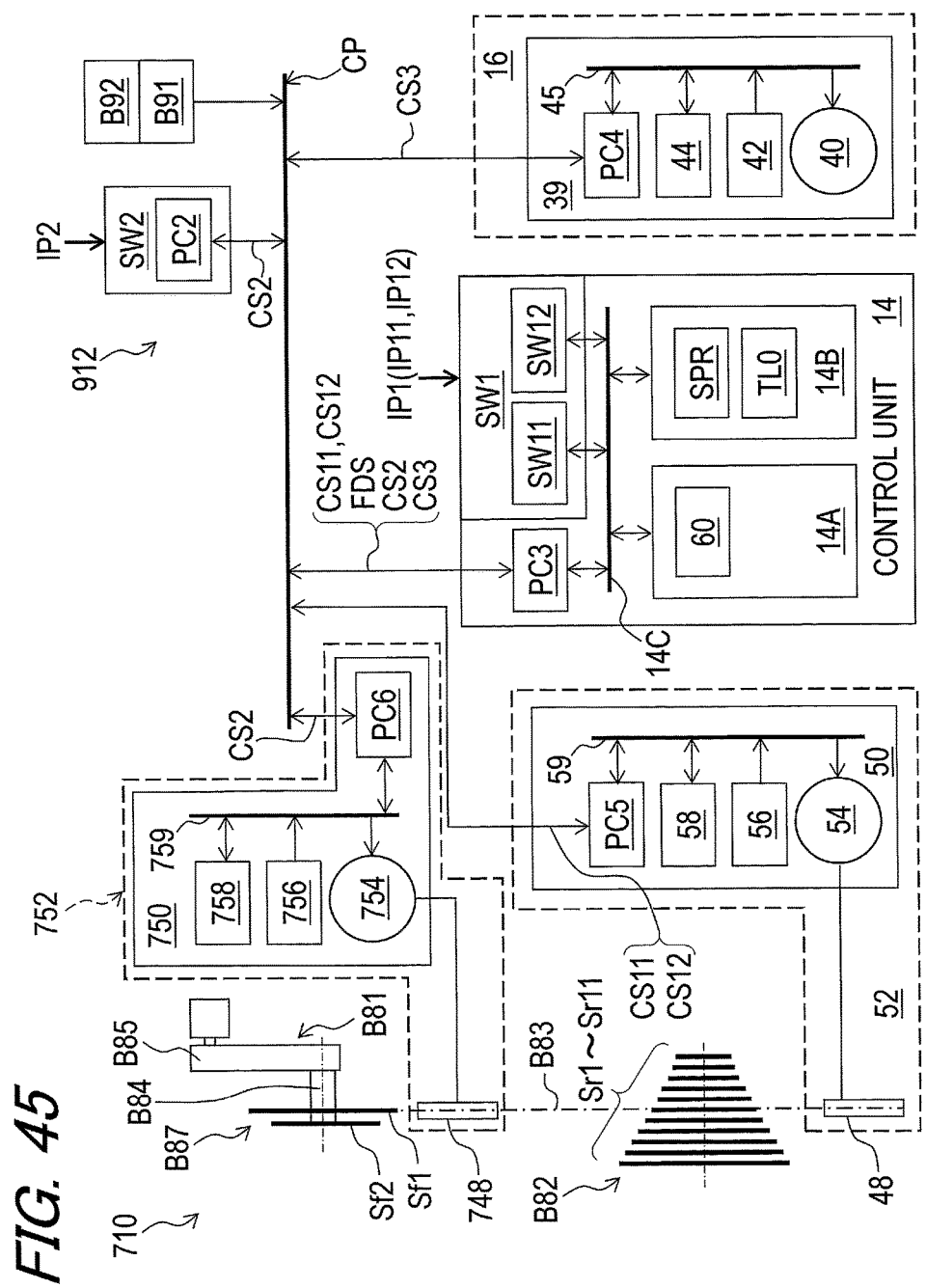
FIG. 45 is a block diagram of a bicycle including an electrical bicycle operating system in accordance with a ninth embodiment.
Figure 46:
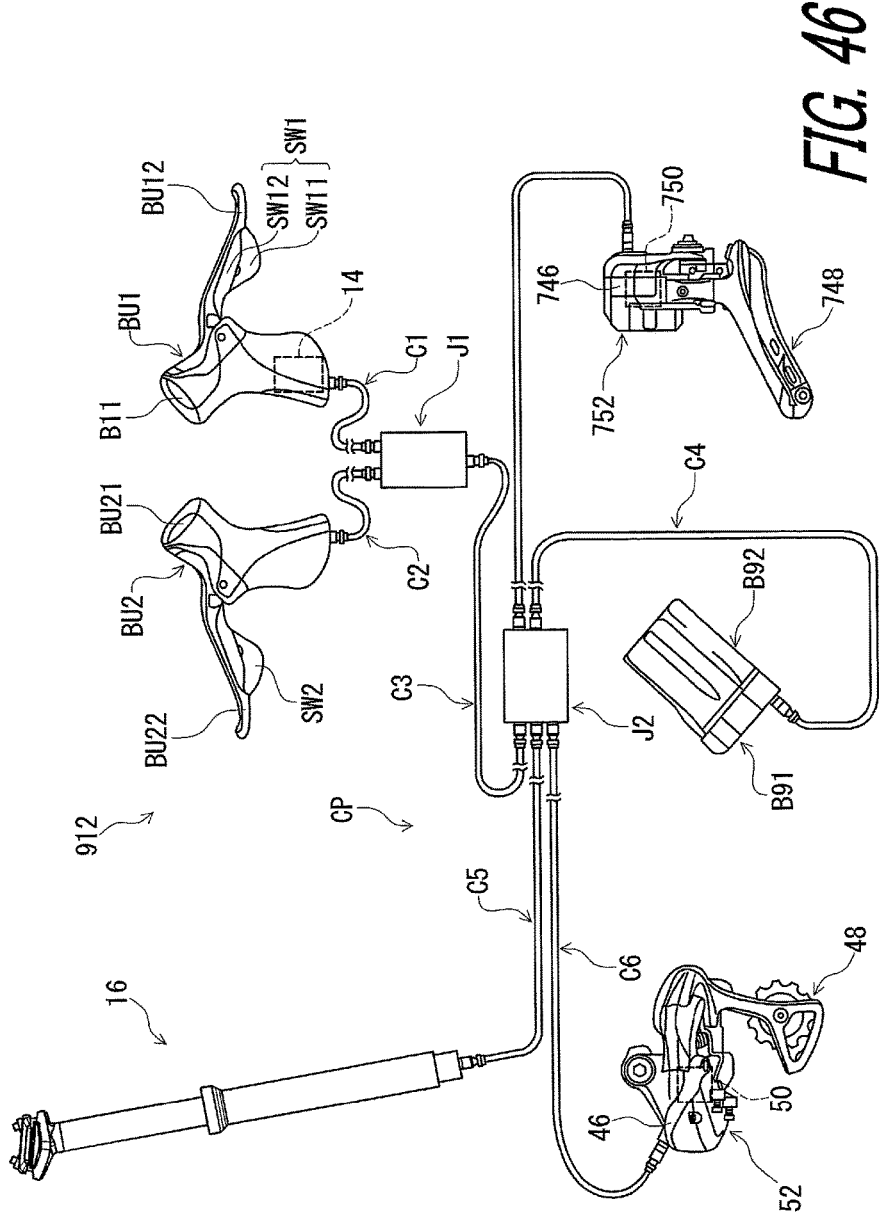
FIG. 46 is a schematic diagram showing one exemplary configuration of an electric communication path of the bicycle illustrated in FIG. 45.

As seen in FIGS. 45 and 46, the control unit 14 is integrally provided with the first switch SW1 as a single unit in the electrical bicycle operating system 912. Specifically, the control unit 14 is provided in the first brake operating unit BU1. However, the control unit 14 can be integrally provided with the second switch SW2 as a single unit.

The electrical bicycle operating system 912 is constituted as a combination of the electrical bicycle operating system 412 of the fourth embodiment and the electrical bicycle operating system 712 of the seventh embodiment.

With the electrical bicycle operating system 912, it is possible to obtain substantially the same effects as those of the electrical bicycle operating systems 12 to 812. The above modifications of the above embodiments can be applied to the electrical bicycle operating system 912 of the ninth embodiment.

In the electrical bicycle operating system 912, wireless communication can be applied to at least part of the control unit 14, the first switch SW1, the second switch SW2, the front derailleur 752, the rear derailleur 52, the electrical bicycle seatpost assembly 16, the electrical suspension 70, and the driving unit 80 instead of the PLC.

Tenth Embodiment

An electrical bicycle operating system 1012 in accordance with a tenth embodiment will be described below referring to FIGS. 47 and 48. The electrical bicycle operating system 1012 has the same structures and/or configurations as those of the electrical bicycle operating system 612 except for the electrical front derailleur. Thus, elements having substantially the same function as those in the above embodiments will be numbered the same here, and will not be described and/or illustrated again in detail here for the sake of brevity.

Figure 47:
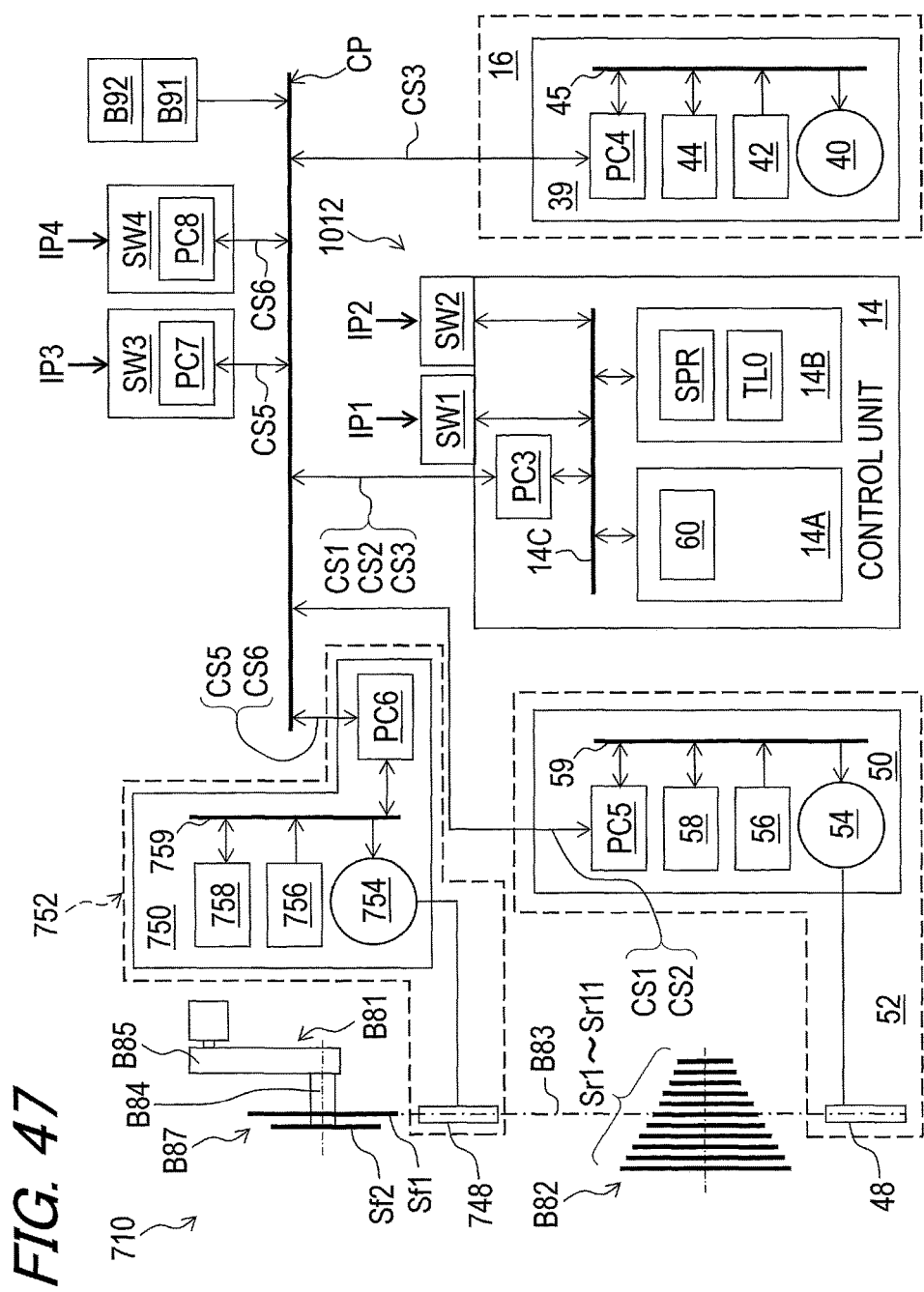
FIG. 47 is a block diagram of a bicycle including an electrical bicycle operating system in accordance with a tenth embodiment.
Figure 48:
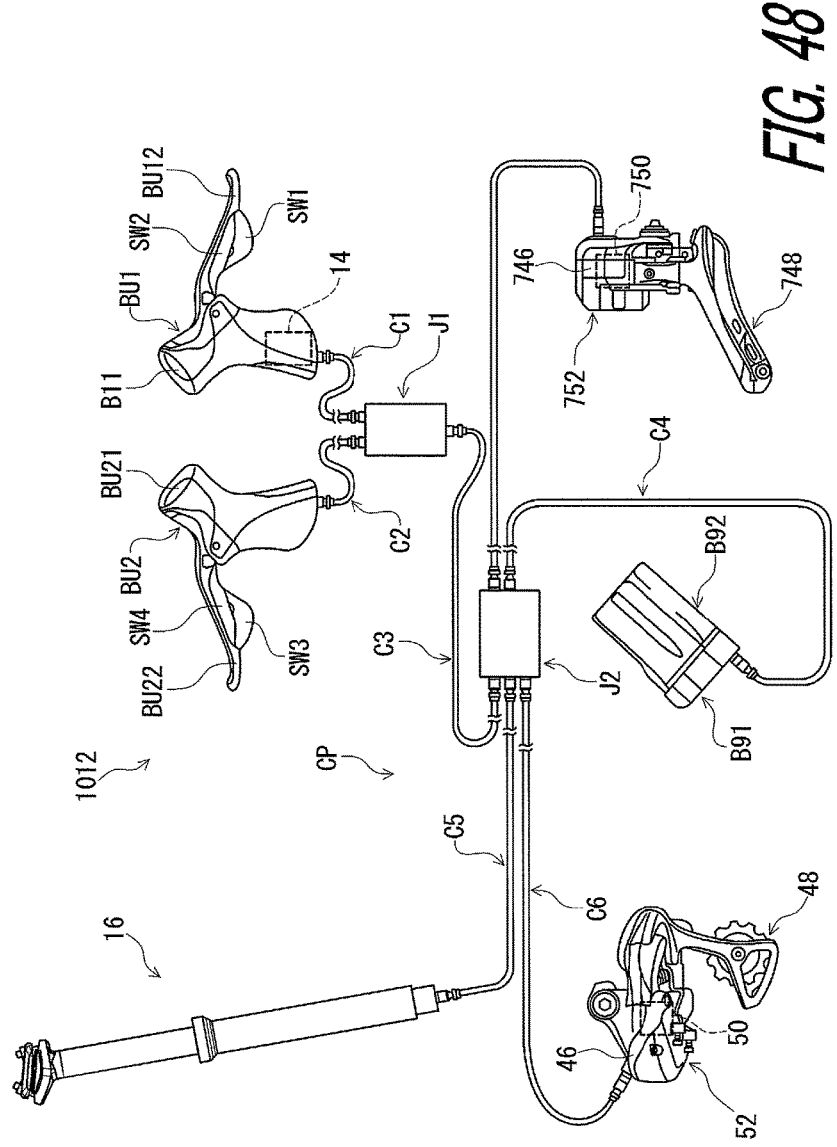
FIG. 48 is a schematic diagram showing one exemplary configuration of an electric communication path of the bicycle illustrated in FIG. 47.

As seen in FIGS. 47 and 48, the control unit 14 is integrally provided with the first switch SW1 as a single unit in the electrical bicycle operating system 1012. Specifically, the control unit 14 is provided in the first brake operating unit BU1. However, the control unit 14 can be integrally provided with the second switch SW2 as a single unit.

The electrical bicycle operating system 1012 is constituted as a combination of the electrical bicycle operating system 612 of the sixth embodiment and the electrical bicycle operating system 712 of the seventh embodiment.

With the electrical bicycle operating system 1012, it is possible to obtain substantially the same effects as those of the electrical bicycle operating systems 12 to 912. The above modifications of the above embodiments can be applied to the electrical bicycle operating system 1012 of the tenth embodiment.

In the electrical bicycle operating system 1012, wireless communication can be applied to at least part of the control unit 14, the first switch SW1, the second switch SW2, the front derailleur 752, the rear derailleur 52, the electrical bicycle seatpost assembly 16, the electrical suspension 70, and the driving unit 80 instead of the PLC.

Eleventh Embodiment

An electrical bicycle operating system 1112 in accordance with an eleventh embodiment will be described below referring to FIGS. 49 to 52. The electrical bicycle operating system 1112 has the same structures and/or configurations as those of the electrical bicycle operating system 712 except for a first mode and a second mode. Thus, elements having substantially the same function as those in the above embodiments will be numbered the same here, and will not be described and/or illustrated again in detail here for the sake of brevity.

Figure 49:
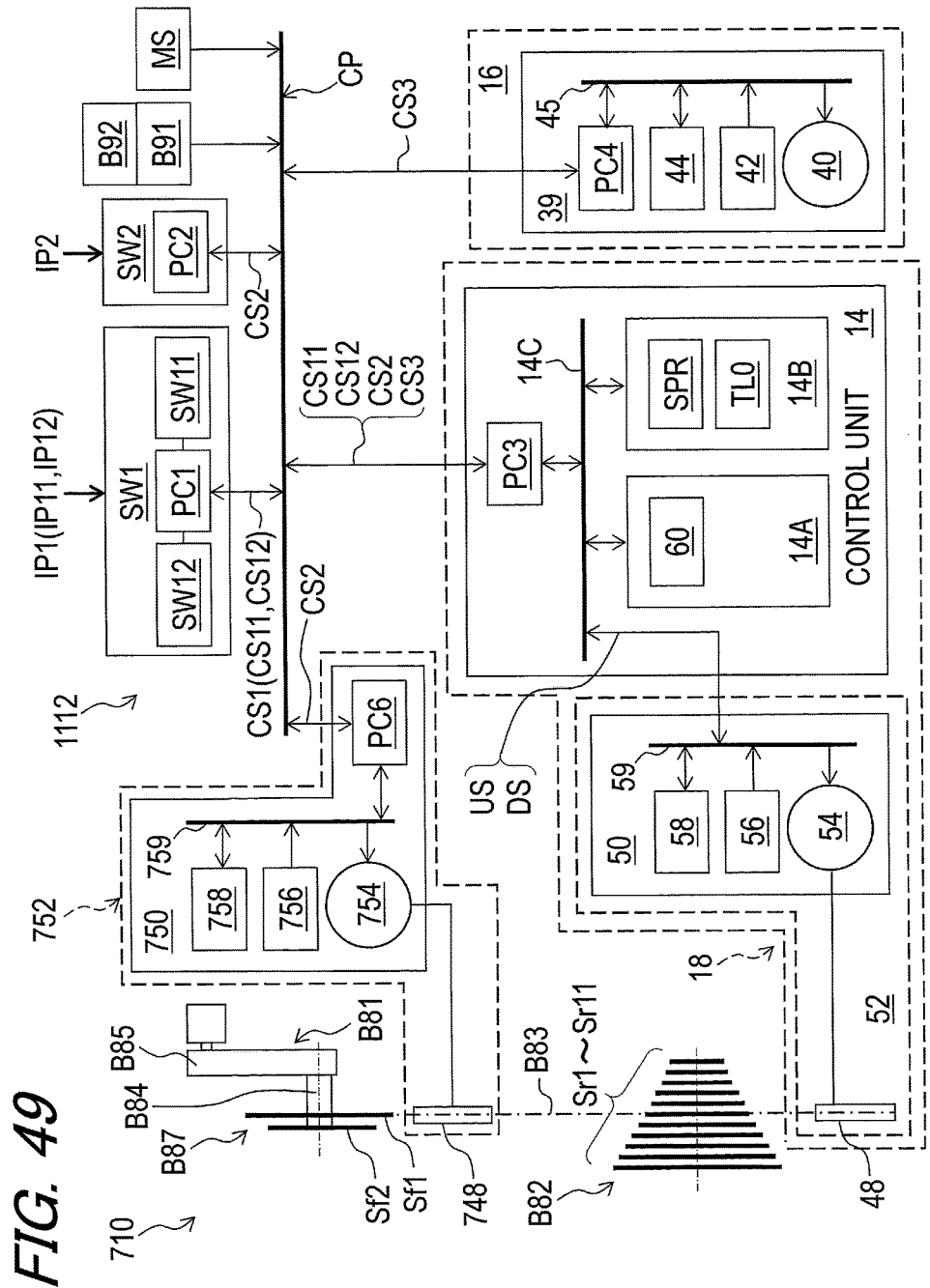
FIG. 49 is a block diagram of a bicycle including an electrical bicycle operating system in accordance with an eleventh embodiment.
Figure 50:
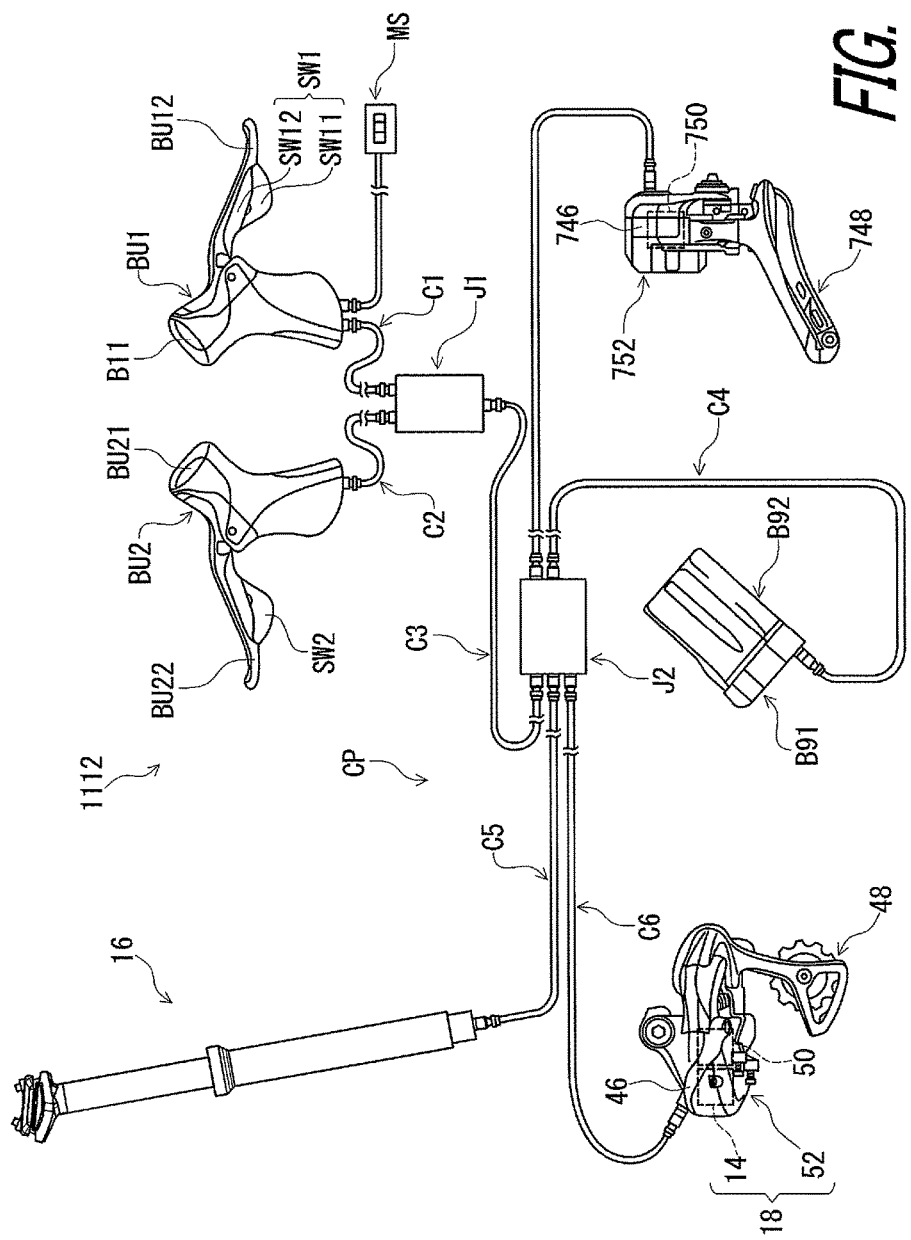
FIG. 50 is a schematic diagram showing one exemplary configuration of an electric communication path of the bicycle illustrated in FIG. 49.

As seen in FIGS. 49 and 50, the electrical bicycle operating system 1112 has substantially the same configuration as that of the electrical bicycle operating system 712 of the seventh embodiment.

Figure 51:
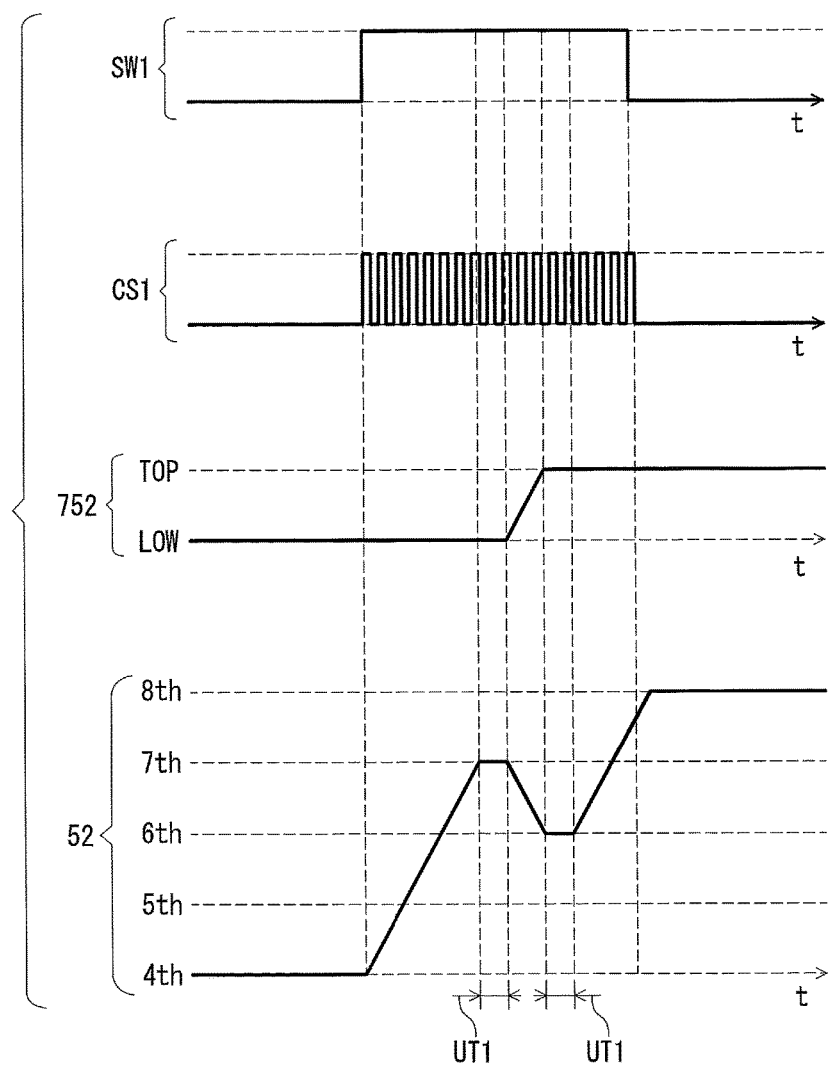
FIG. 51 is a timing chart of the electrical bicycle operating system illustrated in FIG. 49.

As seen in FIG. 51, however, the first switch SW1 generates the first transmission control signal CS1 having a plurality of intermittent signals. Specifically, the upshift switch SW11 generates the upshift signal CS11 having a plurality of intermittent signals. The downshift switch SW12 generates the downshift signal CS12 having a plurality of intermittent signals. A total number of the intermittent signals of the upshift signal CS11 depends on a time period during which the upshift switch SW11 is operated. A total number of the intermittent signals of the downshift signal CS12 depends on a time period during which the downshift switch SW12 is operated. The upshift switch SW11 periodically generates an intermittent signal during the time period during which the upshift switch SW11 is operated. The downshift switch SW12 periodically generates an intermittent signal during the time period during which the downshift switch SW12 is operated.

Similarly, the second switch SW2 can be configured to generate the second transmission control signal CS2 having a plurality of intermittent signals. A total number of the intermittent signals of the second transmission control signal CS2 depends on a time period during which the second switch SW2 is operated. The second switch SW2 periodically generates a signal during the time period during which the second switch SW2 is operated.

Furthermore, in this embodiment, the electrical bicycle operating system 712 has a first mode and a second mode. The storage device 14B stores a program to perform the first mode and the second mode.

As seen in FIGS. 49 and 50, the electrical bicycle operating system 712 includes a mode selector MS configured to receive a user mode input to select a mode of the electrical bicycle operating system 712. The mode selector MS is electrically connected to the control unit 14 via the electric communication path CP. The mode selector MS includes a two-position switch including a first mode position and a second mode position respectively corresponding to the first mode and the second mode. The mode selector MS allows the user to select the mode of the electrical bicycle operating system 12 between the first mode and the second mode. The control unit 14 detects the mode selected via the mode selector MS.

In the first mode, the electrical rear derailleur 52 is operated using the first switch SW1 (the upshift switch SW11 and the downshift switch SW12), and the electrical front derailleur 752 is operated using the second switch SW2. The electrical rear derailleur 52 and the electrical front derailleur 752 independently operate from each other.

In the second mode, the electrical rear derailleur 52 and the electrical front derailleur 752 are operated using only the first switch SW1 (the upshift switch SW11 and the downshift switch SW12) without using the second switch SW2. The electrical rear derailleur 52 and the electrical front derailleur 752 operate in accordance with shift-map information (FIG. 52) stored in the storage device 14B.

In this embodiment, as seen in FIG. 52, the shift-map information includes a single route R1 defined by thirteen combinations of the front shift position and the rear shift position. Namely, the bicycle 10 has thirteen speed stages in the second mode. In the second mode, the control unit 14 is configured to control the electrical rear derailleur 52 and the electrical front derailleur 752 based on the shift-map information in response to each of the upshift signal CS11 and the downshift signal CS12. In the second mode, the control unit 14 is unresponsive to the second transmission control signal CS2.

Specifically, in the second mode, the control unit 14 controls the electrical rear derailleur 52 and the electrical front derailleur 752 to increase a gear ratio defined by the electrical rear derailleur 52 and the electrical front derailleur 752 in response to the upshift signal CS11 along the single route R1 of the shift-map information. The control unit 14 controls the electrical rear derailleur 52 and the electrical front derailleur 752 to decrease the gear ratio defined by the electrical rear derailleur 52 and the electrical front derailleur 752 in response to the downshift signal CS12 along the single route R1 of the shift-map information.

In this embodiment, as seen in FIG. 52, the shift-map information includes a first conjunction point JP1 and a second conjunction point JP2. In the second mode, the control unit 14 controls the electrical rear derailleur 52 to downshift and the electrical front derailleur 752 to upshift at the first conjunction point JP1 on the single route R1 in response to the upshift signal CS11. The control unit 14 controls the electrical rear derailleur 52 to downshift and the electrical front derailleur 752 to keep the front shift position at the first conjunction point JP1 on the single route R1 in response to the downshift signal CS12.

In the second mode, the control unit 14 controls the electrical rear derailleur 52 to upshift and the electrical front derailleur 752 to downshift at the second conjunction point JP2 on the single route R1 in response to the downshift signal CS11. The control unit 14 controls the electrical rear derailleur 52 to upshift and the electrical front derailleur 752 to keep the front shift position at the second conjunction point JP2 on the single route R1 in response to the upshift signal CS11.

In the second mode, the control unit 14 controls the electrical rear derailleur 52 and the electrical front derailleur 752 to continuously change the gear ratio defined by the electrical rear derailleur 52 and the electrical front derailleur 752 in accordance with the time period during the first switch SW1 is operated. Specifically, the control unit 14 controls the electrical rear derailleur 52 and the electrical front derailleur 752 to keep changing the gear ratio defined by the electrical rear derailleur 52 and the electrical front derailleur 752 in accordance with the time period during the first switch SW1 is operated.

For example, the control unit 14 controls the electrical rear derailleur 52 and the electrical front derailleur 752 to keep increasing the gear ratio defined by the electrical rear derailleur 52 and the electrical front derailleur 752 along the single route R1 in accordance with the time period during which the upshift switch SW11 is operated. The control unit 14 controls the electrical rear derailleur 52 and the electrical front derailleur 752 to keep decreasing the gear ratio defined by the electrical rear derailleur 52 and the electrical front derailleur 752 along the single route R1 in accordance with the time period during the downshift switch SW12 is operated.

Furthermore, the control unit 14 ignores the first transmission control signal CS1 during a predetermined time period at the first conjunction point JP1 and the second conjunction point JP2. For example, FIG. 51 shows a timing chart of when the control unit 14 changes the gear ratio defined by the electrical front derailleur 752 and the electrical rear derailleur 52 from 1.86 to 3.52 along the single route R1.

The control unit 14 is unresponsive to the first transmission control signal CS1 within a predetermined time period UT1 at each of the first conjunction point JP1 and the second conjunction point JP2. Specifically, the control unit 14 is unresponsive to the first transmission control signal CS1 within the predetermined time period UT1 from a timing at which the electrical front derailleur 752 is at the low shift position and the electrical rear derailleur 52 is at the seventh shift position. Thus, actions of the electrical front derailleur 752 and the electrical rear derailleur 52 are temporarily delayed by at least the predetermined time period UT1 before the electrical front derailleur 752 and the electrical rear derailleur 52 concurrently operate. This can prevent the bicycle chain B83 from being unintentionally removed from the front sprocket B87 and/or the rear sprocket B82. The same applies to the second conjunction point JP2.

In the electrical bicycle operating system 1112, wireless communication can be applied to at least part of the control unit 14, the first switch SW1, the second switch SW2, the front derailleur 752, the rear derailleur 52, the electrical bicycle seatpost assembly 16, the electrical suspension 70, and the driving unit 80 instead of the PLC.

Twelfth Embodiment

An electrical bicycle operating system 1212 in accordance with a twelfth embodiment will be described below referring to FIGS. 53 to 58. The electrical bicycle operating system 1212 has the same structures and/or configurations as those of the electrical bicycle operating system 712 except for the second switch. Thus, elements having substantially the same function as those in the above embodiments will be numbered the same here, and will not be described and/or illustrated again in detail here for the sake of brevity.

Figure 53:
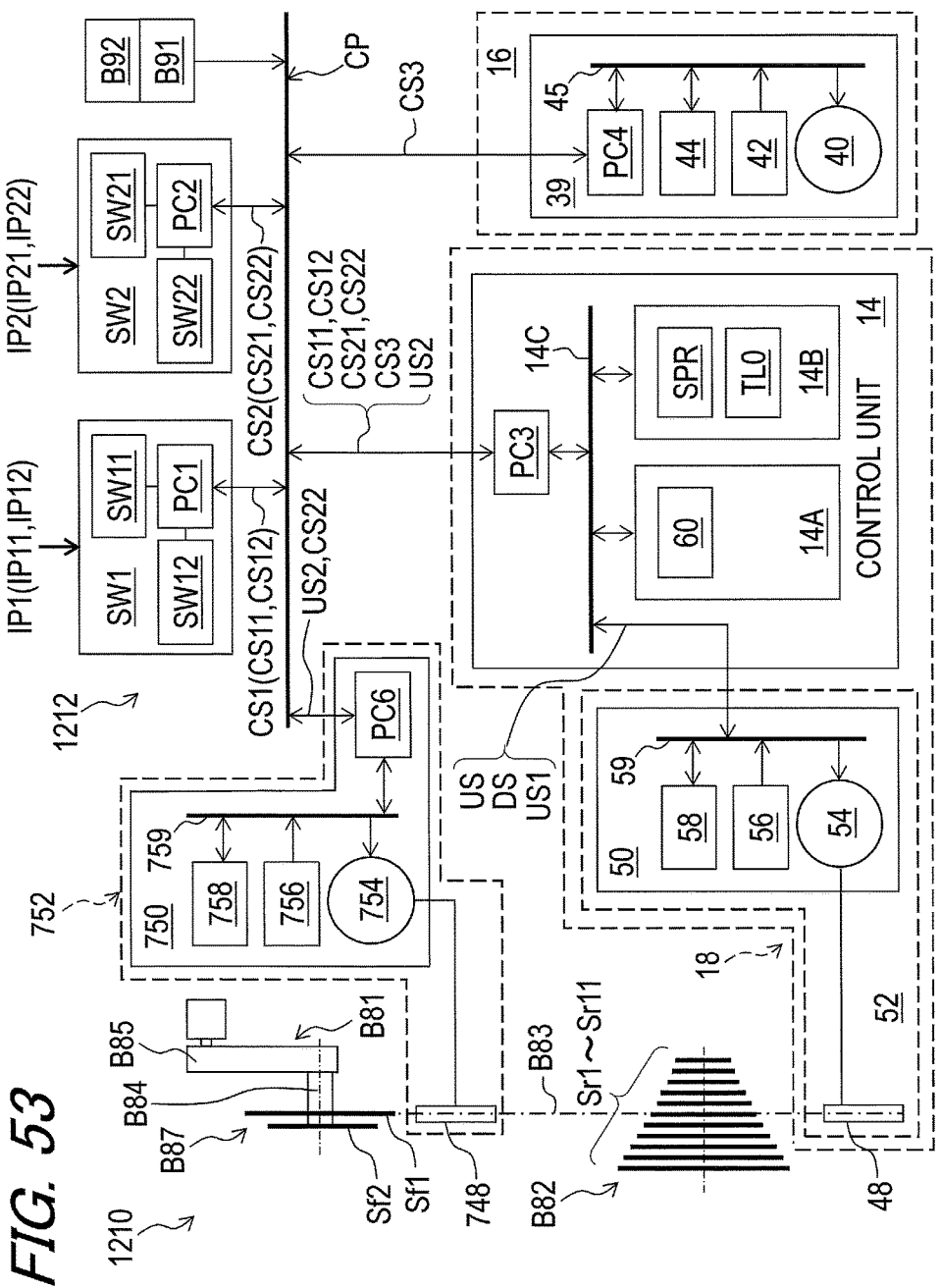
FIG. 53 is a block diagram of a bicycle including an electrical bicycle operating system in accordance with a twelfth embodiment.
Figure 54:
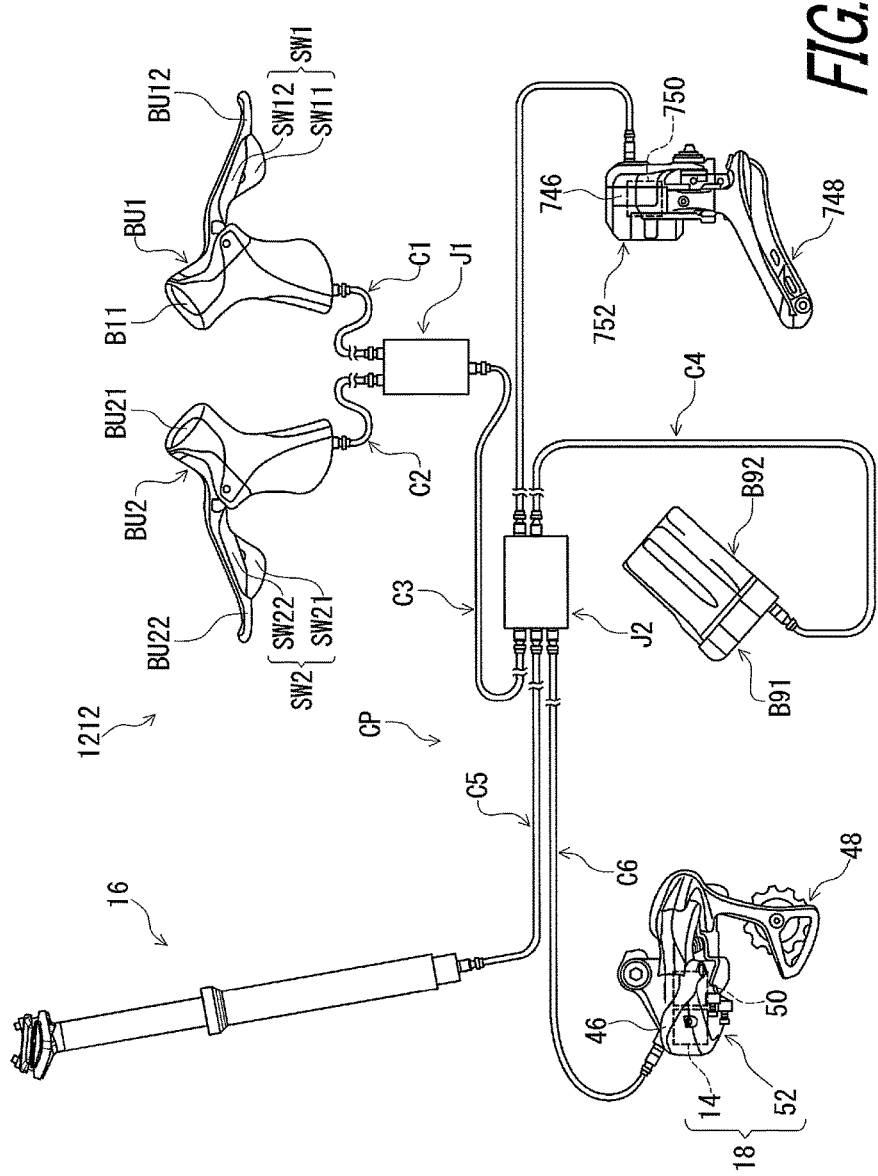
FIG. 54 is a schematic diagram showing one exemplary configuration of an electric communication path of the bicycle illustrated in FIG. 53.

As seen in FIGS. 53 and 54, the electrical bicycle operating system 1212 has substantially the same configuration as that of the electrical bicycle operating system 712 of the seventh embodiment. Specifically, the upshift switch SW11 can also be referred to as a first upshift switch SW11. The downshift switch SW12 can also be referred to as a second upshift switch SW12. The first switch SW1 includes a first upshift switch SW11 and a first downshift switch SW12.

In this embodiment, however, the second switch SW2 includes a second upshift switch and a second downshift switch. The second upshift switch SW21 is configured to generate a second upshift signal CS21 as a second transmission control signal CS2 in response to a second upshift user input IP21 defined as the second user input IP2. The second downshift switch SW22 is configured to generate a second downshift signal CS22 as the second transmission control signal CS2 in response to a second downshift user input IP22 defined as the second user input IP2. Each of the second upshift signal CS21 and the second downshift signal CS22 can be also referred to as the second transmission control signal CS2. The upshift signal CS11 can also be referred to as a first upshift signal CS11. The downshift signal CS12 can also be referred to as a first downshift signal CS12.

The electrical rear derailleur 52 upshifts in response to the first upshift signal CS11 and downshifts in response to the first downshift signal CS12. The electrical front derailleur 752 upshifts in response to the second upshift signal CS21 when the electrical front derailleur 752 is at the low shift position. The electrical front derailleur 752 downshifts in response to the second downshift signal CS22 when the electrical front derailleur 752 is at the top shift position.

In this embodiment, the control unit 14 controls an electrical bicycle shifting device to continuously change a shift position of the electrical bicycle shifting device by at least two shift stages when both the first switch SW1 and the second switch SW2 are operated concurrently. The control unit 14 has substantially the same configuration as that of the control unit 14 of the seventh embodiment. In this embodiment, however, the control unit 14 controls the rear derailleur 52 provided as the electrical bicycle shifting device to continuously change a rear shift position of the rear derailleur 52 by the at least two shift stages when both the first switch SW1 and the second switch SW2 are operated concurrently. Specifically, the control unit 14 controls the rear derailleur 52 to continuously change the rear shift position of the rear derailleur 52 by two shift stages when both the first switch SW1 and the second switch SW2 are operated concurrently. However, the control unit 14 can be configured to control the rear derailleur 52 to continuously change the rear shift position of the rear derailleur 52 by three or more shift stages when both the first switch SW1 and the second switch SW2 are operated concurrently.

The control unit 14 controls the electrical bicycle shifting device to continuously upshift by the at least two shift stages when both the first switch SW1 and the second switch SW2 are operated concurrently. The control unit 14 sets a predetermined number of shift stages as the at least two shift stages in accordance with a user input. The control unit 14 controls the electrical bicycle shifting device to continuously change the shift position by the predetermined number of shift stages when both the first switch SW1 and the second switch SW2 are operated concurrently.

The control unit 14 can be configured to use the predetermined number of shift stages stored in the storage device 14B before the electrical bicycle operating system 1212 is shipped from a factory. Furthermore, the control unit 14 can be configured to select the predetermined number of shift stages among available numbers of shift stages stored in the storage device 14B before the electrical bicycle operating system 1212 is shipped from the factory.

The control unit 14 controls the rear derailleur 52 to continuously change a rear shift position of the rear derailleur 52 by the at least two shift stages when both the second switch SW2 and one of the first upshift switch SW11 and the first downshift switch SW12 are operated concurrently. The control unit 14 controls the rear derailleur 52 to continuously change the rear shift position by the at least two shift stages when both one of the first upshift switch SW11 and the first downshift switch SW12 and one of the second upshift switch SW21 and the second downshift switch SW22 are operated concurrently.

In this embodiment, the control unit 14 controls the rear derailleur 52 to continuously change the rear shift position by the at least two shift stages when both the first upshift switch SW11 and the second upshift switch SW21 are operated concurrently. The control unit 14 controls the rear derailleur 52 to continuously upshift by the at least two shift stages when both the first upshift switch SW11 and the second upshift switch SW21 are operated concurrently.

However, the control unit 14 can be configured to control the rear derailleur 52 to continuously upshift by the at least two shift stages when both the first downshift switch SW12 and the second upshift switch SW21 are operated concurrently. The control unit 14 can be configured to control the rear derailleur 52 to continuously upshift by the at least two shift stages when both the first upshift switch SW11 and the second downshift switch SW22 are operated concurrently. The control unit 14 can be configured to control the rear derailleur 52 to continuously upshift by the at least two shift stages when both the first downshift switch SW12 and the second downshift switch SW22 are operated concurrently. The control unit 14 can be configured to control the rear derailleur 52 to continuously upshift by the at least two shift stages when both the first upshift switch SW11 and the first downshift switch SW12 are operated concurrently. The control unit 14 can be configured to control the rear derailleur 52 to continuously upshift by the at least two shift stages when both the second upshift switch SW21 and the second downshift switch SW22 are operated concurrently.

Figure 55:
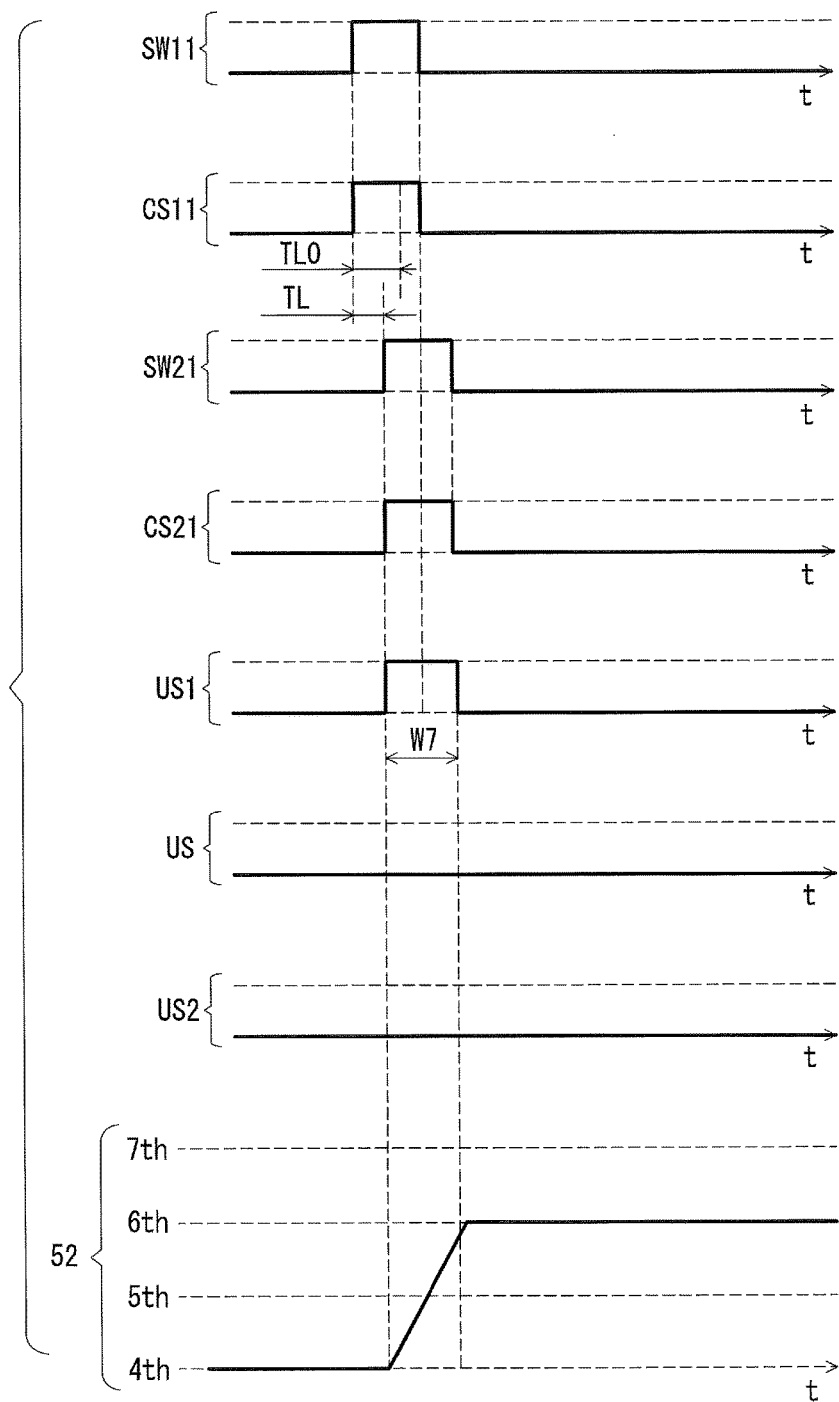
FIGS. 55 to 58 are timing charts of the electrical bicycle operating system illustrated in FIG. 53.
Figure 56:
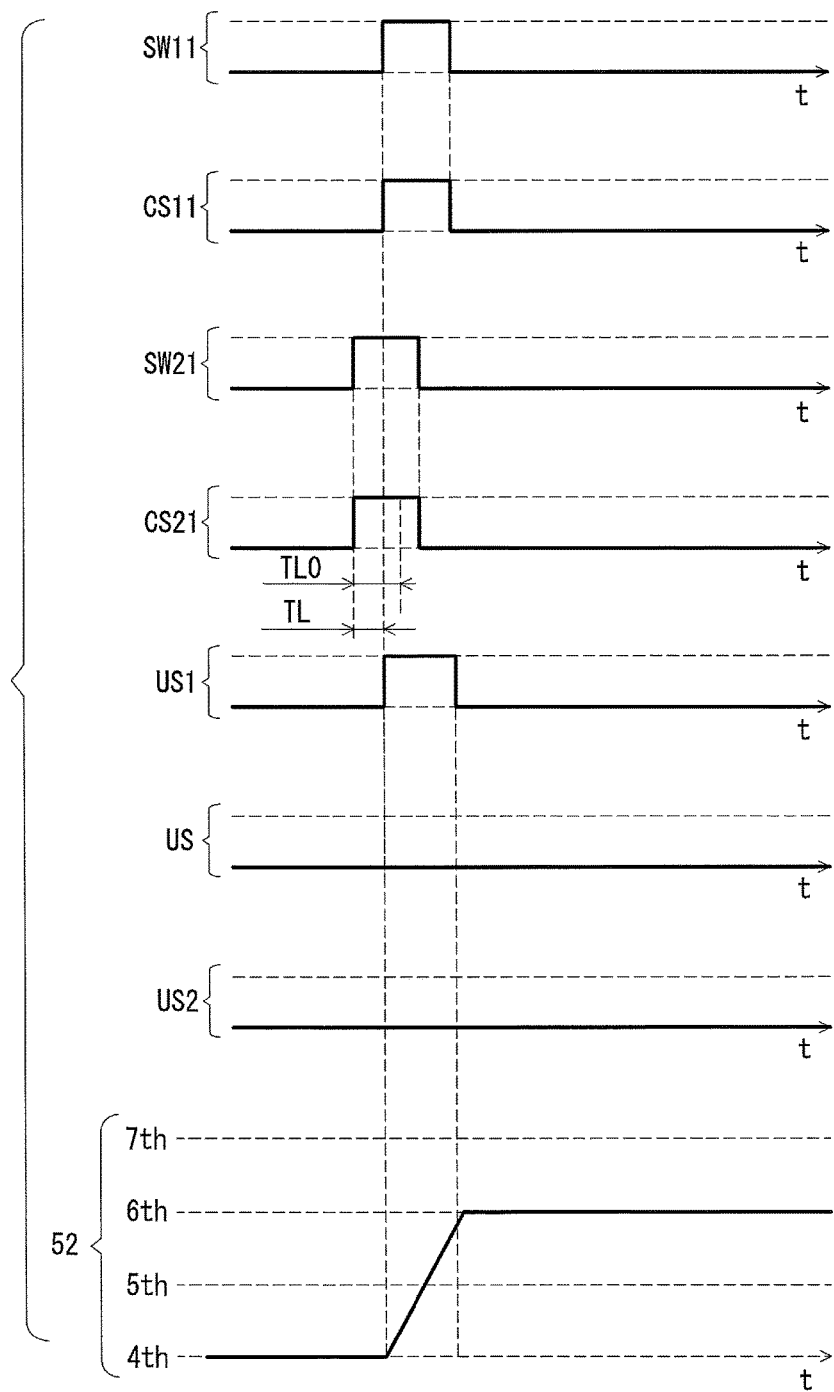

As seen in FIGS. 55 and 56, the control unit 14 controls the rear derailleur 52 to continuously upshift by the at least two shift stages when the control unit 14 receives one of the first transmission control signal CS1 and the second transmission control signal CS2 within the operation time lag TL0 after receipt of the other of the first transmission control signal CS1 and the second transmission control signal CS2. The control unit 14 controls the rear derailleur 52 to continuously upshift by the at least two shift stages when the control unit 14 receives one of the first upshift signal CS11 and the second upshift signal CS21 within the operation time lag TL0 after receipt of the other of the first upshift signal CS11 and the second downshift signal CS21.

As seen in FIG. 55, the control unit 14 controls the rear derailleur 52 to continuously upshift by two shift stages when the control unit 14 receives the second upshift signal CS21 within the operation time lag TL0 after receipt of the first upshift signal CS11. In this embodiment, the control unit 14 generates a rear upshift command signal US1 having a width W7 corresponding to the two shift stages when the control unit 14 receives the second upshift signal CS21 within the operation time lag TL0 after receipt of the first upshift signal CS11. The rear derailleur 52 continuously upshifts by the two shift stages in response to the upshift command signal US. The rear upshift command signal US1 can also be referred to as an operation signal US1.

As seen in FIG. 56, the control unit 14 controls the rear derailleur 52 to continuously upshift by two shift stages when the control unit 14 receives the first upshift signal CS11 within the operation time lag TL0 after receipt of the second upshift signal CS21. In this embodiment, the control unit 14 generates the rear upshift command signal US1 having the width W7 corresponding to the two shift stages when the control unit 14 receives the first upshift signal CS11 within the operation time lag TL0 after receipt of the second upshift signal CS21. The rear derailleur 52 continuously upshifts by the two shift stages in response to the upshift command signal US.

Figure 57:
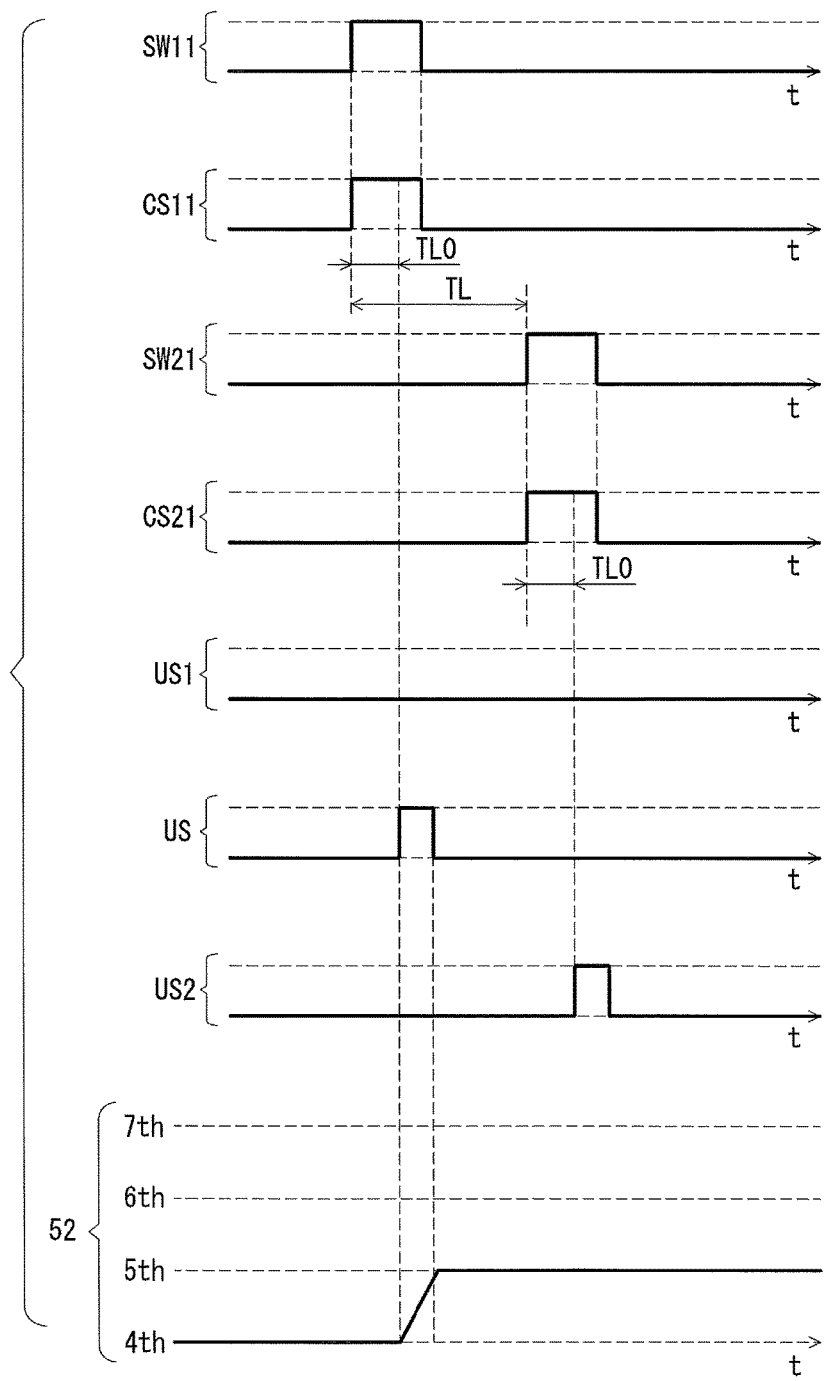
Figure 58:
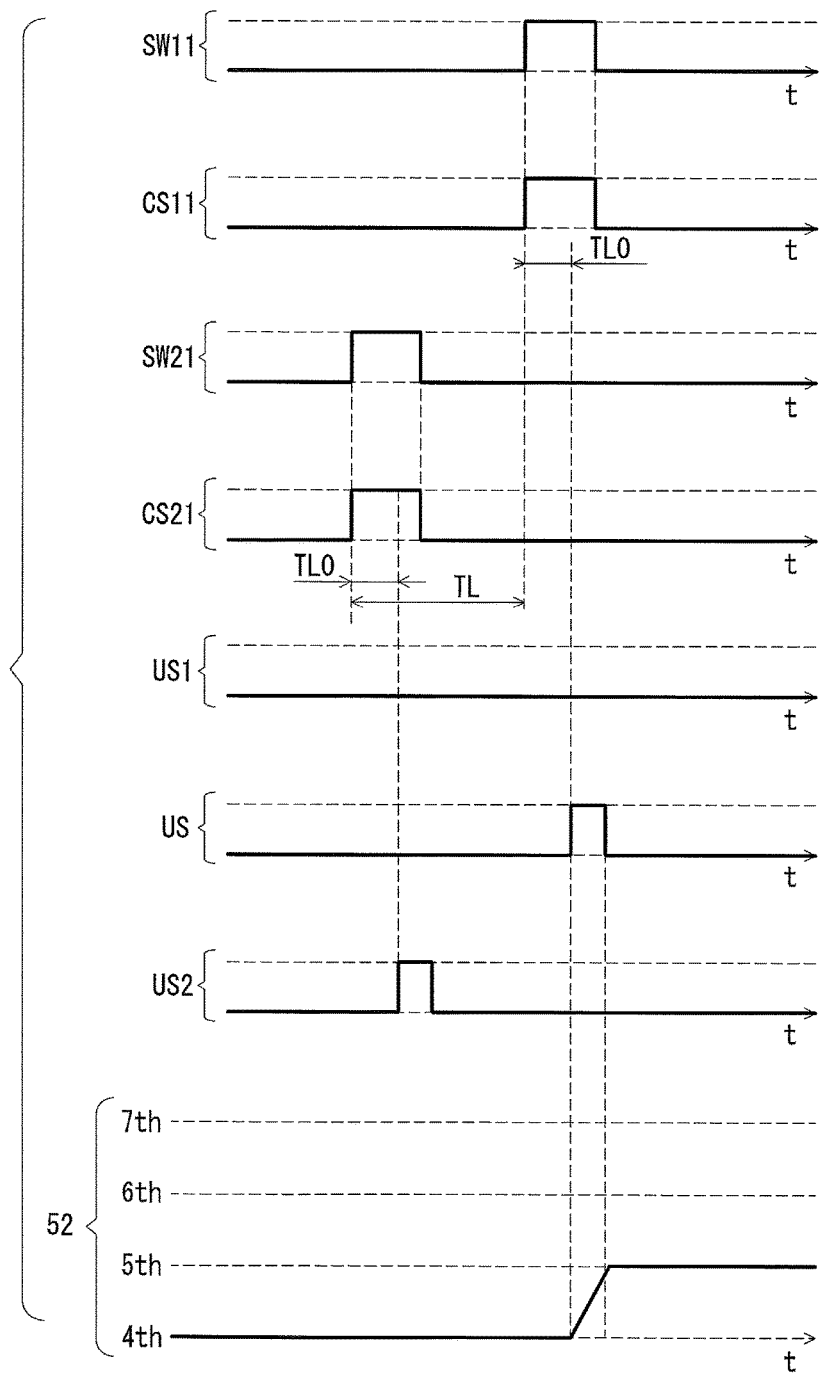

As seen in FIGS. 57 and 58, the control unit 14 controls the rear derailleur 52 provided as the electrical bicycle shifting device to upshift when the first upshift switch SW11 is operated without operation of the second switch SW2. The control unit 14 controls the rear derailleur 52 to downshift when the first downshift switch SW12 is operated without operation of the second switch SW2.

In this embodiment, as seen in FIG. 57, the control unit 14 generates the upshift command signal US to perform upshifting in the electrical rear derailleur 52 by one shift stage when the control unit 14 does not receive the second transmission control signal CS2 (the second upshift signal CS21) within the operation time lag TL0 after receipt of the first transmission control signal CS1 (the first upshift signal CS11). The electrical rear derailleur 52 upshifts by one shift stage in response to the upshift command signal US. In this embodiment, the electrical rear derailleur 52 downshifts by one shift stage in response to the first downshift signal CS12 generated by the first downshift switch SW12.

As seen in FIG. 58, the control unit 14 generates the upshift command signal US to perform upshifting in the electrical rear derailleur 52 by one shift stage when the control unit 14 does not receive the first transmission control signal CS1 (the first upshift signal CS11) within the operation time lag TL0 after receipt of the second transmission control signal CS2 (the second upshift signal CS21). The electrical rear derailleur 52 upshifts by one shift stage in response to the upshift command signal US.

As seen in FIGS. 57 and 58, the control unit 14 controls the front derailleur 752 provided as the electrical bicycle shifting device to upshift when the second upshift switch SW21 is operated without operation of the first switch SW1. The control unit 14 controls the front derailleur 752 to downshift when the second downshift switch SW22 is operated without operation of the first switch SW1.

In this embodiment, as seen in FIG. 57, the control unit 14 generates a front upshift command signal US2 to perform upshifting in the electrical front derailleur 752 by one shift stage when the control unit 14 does not receive the second transmission control signal CS2 (the second upshift signal CS21) within the operation time lag TL0 after receipt of the first transmission control signal CS1 (the first upshift signal CS11). The electrical front derailleur 752 upshifts by one shift stage in response to the front upshift command signal US2. In this embodiment, the electrical front derailleur 752 downshifts by one shift stage in response to the second downshift signal CS22 generated by the second downshift switch SW22.

As seen in FIG. 58, the control unit 14 generates the front upshift command signal US2 to perform upshifting in the electrical rear derailleur 52 by one shift stage when the control unit 14 does not receive the first transmission control signal CS1 (the first upshift signal CS11) within the operation time lag TL0 after receipt of the second transmission control signal CS2 (the second upshift signal CS21). The electrical front derailleur 752 upshifts by one shift stage in response to the front upshift command signal US2.

In this embodiment, as seen in FIG. 53, the control unit 14 generates the third signal CS3 to operate only the electrical bicycle seatpost assembly 16 when both the first downshift switch SW12 and the second downshift switch SW22 are operated concurrently. Unlike the control unit 14 of the seventh embodiment, the control unit 14 uses the first downshift switch SW12 instead of the upshift signal CS11. The control unit 14 has substantially the same configuration as that of the control unit 14 of the seventh embodiment regarding the third signal CS3 except that the control unit 14 uses the upshift signal CS11 and the second transmission control signal CS2 to generate the third signal CS3. Thus, it will not be described and/or illustrated in detail here for the sake of brevity. The third signal CS3 can be omitted from the control unit 14 of this embodiment. The third signal CS3 can also be referred to as an operation signal CS3.

The control unit 14 generates an operation signal to operate a bicycle component when both the first switch SW1 and the second switch SW2 are operated concurrently, the control unit 14 selecting one of an electrical bicycle seatpost assembly, an electrical suspension, a driving unit, and an electrical bicycle shifting device as the bicycle component in accordance with a user input. In this embodiment, the control unit 14 generates the operation signal US1 to operate the rear derailleur 52 provided as the bicycle component when both the first upshift switch SW11 and the second upshift switch SW21 are operated concurrently. The control unit 14 selects one of the electrical bicycle seatpost assembly, the electrical suspension, the driving unit, and the electrical bicycle shifting device as the bicycle component in accordance with the user input.

Specifically, the control unit 14 selects one of the electrical bicycle seatpost assembly 16, the electrical suspension, the driving unit, and the electrical bicycle shifting device 52 as the bicycle component in accordance with the user input transmitted from a personal computer via software installed in the personal computer. The user input indicates one of the electrical bicycle seatpost assembly, the electrical suspension, the driving unit, and the electrical bicycle shifting device. For example, the control unit 14 can store different signal patterns of the operation signal respectively corresponding to the electrical bicycle seatpost assembly, the electrical suspension, the driving unit, and the electrical bicycle shifting device in the memory 14B. The control unit 14 selects one of the different signal patterns stored in the memory 14B based on the user input. The control unit 14 generates the operation signal having a signal pattern selected from among the different signal patterns.

Similarly, the control unit 14 generates the operation signal CS3 to operate the rear derailleur 52 provided as the bicycle component when both the first switch SW1 and the second switch SW2 are operated concurrently. The control unit 14 selects one of the electrical bicycle seatpost assembly 16, the electrical suspension, the driving unit, and the electrical bicycle shifting device 52 as the bicycle component in accordance with the user input.

Specifically, the control unit 14 selects one of the electrical bicycle seatpost assembly 16, the electrical suspension, the driving unit, and the electrical bicycle shifting device 52 as the bicycle component in accordance with the user input transmitted from the personal computer via the software. The control unit 14 selects one of the different signal patterns stored in the memory 14B based on the user input. The control unit 14 generates the operation signal having a signal pattern selected from among the different signal patterns.

In this embodiment, the control unit 14 selects the electrical bicycle shifting device 52 as the bicycle component corresponding to concurrent operation of the first upshift switch SW11 and the second upshift switch SW21. The control unit 14 selects the electrical bicycle shifting device 52 as the bicycle component corresponding to concurrent operation of the first downshift switch SW12 and the second downshift switch SW22. Namely, the control unit 14 is configured to select two of the electrical bicycle seatpost assembly 16, the electrical suspension, the driving unit, and the electrical bicycle shifting device 52. However, the control unit 14 can be configured to select only one of the electrical bicycle seatpost assembly 16, the electrical suspension, the driving unit, and the electrical bicycle shifting device 52. The control unit 14 can be configured to select three of the electrical bicycle seatpost assembly 16, the electrical suspension, the driving unit, and the electrical bicycle shifting device 52.

With the electrical bicycle operating system 1212, it is possible to obtain substantially the same effects as those of the electrical bicycle operating systems 12 to 1112. The above modifications of the above embodiments can be applied to the electrical bicycle operating system 1212 of the twelfth embodiment.

Furthermore, the electrical bicycle operating system 1212 has the following features.

(1) The electrical bicycle operating system 1212 comprises the control unit 14 to generate the operation signal to operate the bicycle component when both the first switch SW1 and the second switch SW2 are operated concurrently. The control unit 14 selects one of the electrical bicycle seatpost assembly, the electrical suspension, the driving unit, and the electrical bicycle shifting device as the bicycle component in accordance with a user input. Accordingly, it is possible to select a bicycle component which can be operated using the first switch SW1 and the second switch SW2. This improves convenience of the electrical bicycle operating system 1212.

(2) The electrical bicycle operating system 1212 comprises the control unit 14 to control the electrical bicycle shifting device to continuously change the shift position of the electrical bicycle shifting device by at least two shift stages when both the first switch SW1 and the second switch SW2 are operated concurrently. Accordingly, it is possible to automatically continuously change the shift position of the electrical bicycle shifting device in response to operation of the first switch SW1 and the second switch SW2. This improves operability of the electrical bicycle operating system 1212.

(3) The control unit 14 controls the electrical bicycle shifting device to continuously upshift by the at least two shift stages when both the first switch SW1 and the second switch SW2 are operated concurrently. Accordingly, it is possible to quickly increase a speed of a bicycle using concurrent operation of the first switch SW1 and the second switch SW2.

(4) The control unit 14 controls the rear derailleur 52 provided as the electrical bicycle shifting device to continuously change the rear shift position of the rear derailleur 52 by the at least two shift stages when both the first switch SW1 and the second switch SW2 are operated concurrently. Accordingly, it is possible to quickly increase a speed of a bicycle using concurrent operation of the first switch SW1 and the second switch SW2.

(5) The control unit 14 sets a predetermined number of shift stages as the at least two shift stages in accordance with the user input. The control unit 14 controls the electrical bicycle shifting device to continuously change the shift position by the predetermined number of shift stages when both the first switch SW1 and the second switch SW2 are operated concurrently. Accordingly, it is possible to change the predetermined number of shift stages in accordance with specification of the electrical bicycle shifting device.

(6) The control unit 14 controls the rear derailleur 52 provided as the electrical bicycle shifting device to upshift when the first upshift switch SW11 is operated without operation of the second switch SW2. The control unit 14 controls the rear derailleur 52 to downshift when the first downshift switch SW12 is operated without operation of the second switch SW2. Accordingly, it is possible to control the rear derailleur 52 to upshift and downshift in addition to continuously changing the rear shift position of the rear derailleur 52.

(7) The control unit 14 controls the rear derailleur 52 to continuously change a rear shift position of the rear derailleur 52 by the at least two shift stages when both the second switch SW2 and one of the first upshift switch SW11 and the first downshift switch SW12 are operated concurrently. Accordingly, it is possible to control the rear derailleur 52 to upshift, to downshift, and to continuously change the rear shift position of the rear derailleur 52 using the first upshift switch SW11, the first downshift switch SW12, and the second switch SW2.

(8) The control unit 14 controls a front derailleur 752 provided as the electrical bicycle shifting device to upshift when the second upshift switch SW21 is operated without operation of the first switch SW1. The control unit 14 controls the front derailleur 752 to downshift when the second downshift switch SW22 is operated without operation of the first switch SW1. Accordingly, it is possible to perform upshifting and downshifting of the front derailleur 752 in addition to the rear derailleur 52.

(9) The control unit 14 controls the rear derailleur 52 to continuously change the rear shift position by the at least two shift stages when both one of the first upshift switch SW11 and the first downshift switch SW12 and one of the second upshift switch SW21 and the second downshift switch SW22 are operated concurrently. Accordingly, it is possible to control the rear derailleur 52 and the front derailleur 752 using the first upshift switch SW11, the first downshift switch SW12, the second upshift switch SW21, and the second downshift switch SW22.

In the electrical bicycle operating system 1212, wireless communication can be applied to at least part of the control unit 14, the first switch SW1, the second switch SW2, the front derailleur 752, the rear derailleur 52, the electrical bicycle seatpost assembly 16, the electrical suspension 70, and the driving unit 80 instead of the PLC.

It will be apparent to those skilled in the bicycle field from the present disclosure that the above embodiments can be at least partly combined with each other.

In the present application, the term "comprising" and its derivatives, as used herein, are intended to be open ended terms that specify the presence of the stated features, elements, components, groups, integers, and/or step, but do not exclude the presence of other unstated features, elements, components, groups, integers and/or step. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. An electrical bicycle operating system comprising:
   a first switch to generate a first transmission control signal;
   a second switch to generate a second transmission control signal; and
   a control unit to electrically operate at least one of an electrical bicycle seatpost assembly, an electrical suspension, and a driving unit configured to output an assist force when both the first switch and the second switch are operated concurrently, wherein
   the control unit generates a third signal to operate only the electrical bicycle seatpost assembly when both the first switch and the second switch are operated concurrently.

2. The electrical bicycle operating system according to claim 1, wherein
   the control unit generates the third signal when the control unit receives both the first transmission control signal and the second transmission control signal concurrently.

3. The electrical bicycle operating system according to claim 1, wherein
   the control unit generates the third signal having a third width corresponding to a time period during which both the first switch and the second switch are operated concurrently.

4. The electrical bicycle operating system according to claim 3, wherein
   the first switch generates the first transmission control signal having a first width corresponding to a time period during which the first switch is operated,
   the second switch generates the second transmission control signal having a second width corresponding to a time period during which the second switch is operated, and
   the control unit generates the third signal having the third width corresponding to a time period during which the control unit receives both the first transmission control signal and the second transmission control signal.

5. The electrical bicycle operating system according to claim 1, wherein
   the control unit generates the third signal when the control unit receives one of the first transmission control signal and the second transmission control signal within an operation time lag after receipt of the other of the first transmission control signal and the second transmission control signal.

6. The electrical bicycle operating system according to claim 5, wherein
   the control unit is configured to operate an electrical bicycle shifting device to perform one of upshifting and downshifting in response to the first transmission control signal when the control unit does not receive the second transmission control signal within the operation time lag after receipt of the first transmission control signal, the control unit is configured to operate the electrical bicycle shifting device to perform the other of upshifting and downshifting in response to the second transmission control signal when the control unit does not receive the first transmission control signal within the operation time lag after receipt of the second transmission control signal, and the control unit is configured to keep a shift position of the electrical bicycle shifting device when the control unit receives one of the first transmission control signal and the second transmission control signal within the operation time lag after receipt of the other of the first transmission control signal and the second transmission control signal.

7. The electrical bicycle operating system according to claim 6, wherein the control unit is configured to operate the electrical bicycle shifting device to upshift in response to the first transmission control signal, and the control unit is configured to operate the electrical bicycle shifting device to downshift in response to the second transmission control signal.

8. The electrical bicycle operating system according to claim 6, wherein the control unit is configured to operate an electrical rear derailleur provided as the electrical bicycle shifting device in response to one of the first transmission control signal and the second transmission control signal.

9. The electrical bicycle operating system according to claim 8, wherein the control unit is integrally provided with the electrical rear derailleur as a single unit.

10. The electrical bicycle operating system according to claim 5, wherein the control unit is configured to continuously generate the third signal having a constant width regardless of a width of each of the first transmission control signal and the second transmission control signal in response to both the first transmission control signal and the second transmission control signal.

11. The electrical bicycle operating system according to claim 1, wherein the control unit is configured to generate the third signal to perform a first operation of the electrical bicycle seatpost assembly, and the control unit is configured to generate a fourth signal to perform a second operation of the electrical bicycle seatpost assembly, the second operation being different from the first operation.

12. The electrical bicycle operating system according to claim 1, wherein the first switch is mounted to one of a right part and a left part of a handlebar, and the second switch is mounted to the other of the right part and the left part of the handlebar.

13. An electrical bicycle operating system comprising:

a first switch to generate a first transmission control signal;

a second switch to generate a second transmission control signal; and a control unit to electrically operate at least one of an electrical bicycle seatpost assembly, an electrical suspension, and a driving unit configured to output an assist force when both the first switch and the second switch are operated concurrently, wherein the control unit generates a third signal to operate the at least one of the electrical bicycle seatpost assembly, the electrical suspension, and the driving unit when both the first switch and the second switch are operated concurrently, and the first switch does not output the first transmission control signal when both the first switch and the second switch are operated concurrently.

14. The electrical bicycle operating system according to claim 13, wherein the second switch does not output the second transmission control signal when both the first switch and the second switch are operated concurrently.

15. The electrical bicycle operating system according to claim 13, wherein the control unit generates the third signal to operate only the electrical bicycle seatpost assembly when both the first switch and the second switch are operated concurrently.

16. An electrical bicycle operating system comprising:

a first switch to generate a first transmission control signal;

a second switch to generate a second transmission control signal; and a control unit to electrically operate at least one of an electrical bicycle seatpost assembly, an electrical suspension, and a driving unit configured to output an assist force when both the first switch and the second switch are operated concurrently, wherein the control unit generates a third signal to operate the at least one of the electrical bicycle seatpost assembly, the electrical suspension, and the driving unit when both the first switch and the second switch are operated concurrently, and the second switch does not output the second transmission control signal when both the first switch and the second switch are operated concurrently.

17. An electrical bicycle operating system comprising:

a first switch to generate a first transmission control signal;

a second switch to generate a second transmission control signal; and a control unit to electrically operate at least one of an electrical bicycle seatpost assembly, an electrical suspension, and a driving unit configured to output an assist force when both the first switch and the second switch are operated concurrently, wherein the control unit is configured to generate a third signal to operate the at least one of the electrical bicycle seatpost assembly, the electrical suspension, and the driving unit when the control unit receives both the first transmission control signal and the second transmission control signal during more than an operation time period.

18. An electrical bicycle operating system comprising:

a first switch;

a second switch; and a control unit to generate an operation signal to operate a bicycle component when both the first switch and the second switch are operated concurrently, the control unit selecting one of an electrical bicycle seatpost assembly, an electrical suspension, and a driving unit, as the bicycle component in accordance with a user input, wherein the control unit is configured to generate the operation signal to operate that at least one of the electrical bicycle seatpost assembly, the electrical suspension, and the driving unit, when the control unit receives both the first transmission control signal and the second transmission control signal during more than an operation time period.

* * * * *